US012793713B1

(12) United States Patent
Khare et al.

(10) Patent No.: US 12,793,713 B1
(45) Date of Patent: Nov. 10, 2026

(54) LANGUAGE MODEL-BASED CONVERSATIONAL MODELING

(71) Applicant: Amazon Technologies, Inc., Seattle, WA (US)

(72) Inventors: Aparna Khare, San Jose, CA (US); Anirudh Raju, Mountain View, CA (US); Gautam Tiwari, Fremont, CA (US); Grant Strimel, Presto, PA (US); Di He, Kirkland, WA (US); Pranav Dheram, Sunnyvale, CA (US); Ariya Rastrow, Seattle, WA (US); Leif Raedel, Herten (DE); Bjorn Hoffmeister, Seattle, WA (US); Veerdhawal Pande, Walpole, MA (US)

(73) Assignee: Amazon Technologies, Inc., Seattle, WA (US)

( * ) Notice: Subject to any disclaimer, the term of this patent is extended or adjusted under 35 U.S.C. 154(b) by 125 days.

(21) Appl. No.: 18/824,385

(22) Filed: Sep. 4, 2024

(51) Int. Cl.

| | |
|---|---|
| ***G10L 15/22*** | (2006.01) |
| ***G10L 13/02*** | (2013.01) |
| ***G10L 25/30*** | (2013.01) |
| ***G10L 25/78*** | (2013.01) |

(52) U.S. Cl.
CPC .............. *G10L 15/22* (2013.01); *G10L 13/02* (2013.01); *G10L 25/30* (2013.01); *G10L 25/78* (2013.01)

(58) Field of Classification Search
None
See application file for complete search history.

(56) References Cited

U.S. PATENT DOCUMENTS

| | | | | |
|---|---|---|---|---|
| 2022/0093101 | A1* | 3/2022 | Krishnan | G06V 40/20 |
| 2022/0115001 | A1* | 4/2022 | Bratt | G10L 13/10 |
| 2022/0157314 | A1* | 5/2022 | Varshney | G06F 16/90332 |
| 2024/0054995 | A1* | 2/2024 | Levy | G10L 25/78 |
| 2024/0241624 | A1* | 7/2024 | Klein | G06F 3/0484 |
| 2025/0029632 | A1* | 1/2025 | Park | G10L 17/04 |
| 2025/0118298 | A1* | 4/2025 | Muntasir | H04M 3/4936 |
| 2025/0225986 | A1* | 7/2025 | Kennedy | G10L 15/222 |
| 2025/0322820 | A1* | 10/2025 | Chao | G10L 13/00 |
| 2025/0349294 | A1* | 11/2025 | Marelus | G10L 15/183 |

* cited by examiner

*Primary Examiner* — Douglas Godbold
(74) *Attorney, Agent, or Firm* — Pierce Atwood LLP

(57) ABSTRACT

A speech-processing system may include a language model configured to interact with a user in a dual mode in which the system processes an input while continuing to generate an output, or vice versa. Dual-mode operation may allow the user and system to engage in backchannel communication in which the user and/or system interjects speech while the other is speaking, but without an intent to interrupt or take a turn. For example, if the system is outputting speech and detects user speech, the system may continue generating/outputting speech while it processes the user speech to determine whether it likely represents backchanneling or an interruption. If the user speech likely represents backchanneling, the system may continue generating speech without yielding the turn. Similarly, the system may receive user speech and identify an opportunity for backchanneling before the user has finished speaking. The system may generate backchannel speech without taking a turn.

20 Claims, 20 Drawing Sheets

LANGUAGE MODEL-BASED CONVERSATIONAL MODELING

BACKGROUND

Natural language processing systems have progressed to the point where humans can interact with computing devices using their voices and natural language textual input. Such systems employ computing techniques to identify words spoken and written by a human user based on the various qualities of received input data. Speech recognition combined with natural language understanding processing techniques enable speech-based user control of computing devices to perform tasks based on the user's spoken or other natural language inputs. Such processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1A:
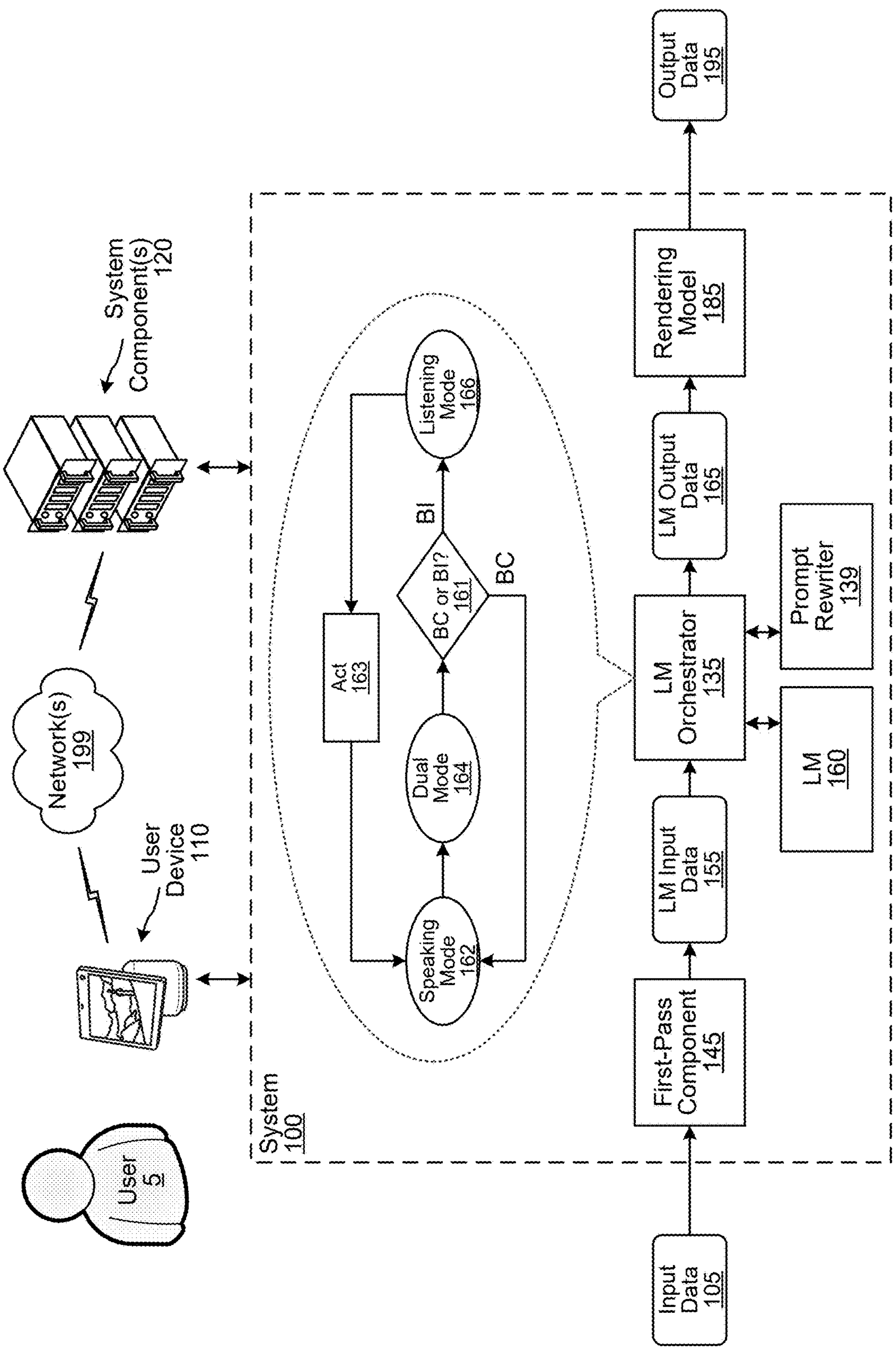
FIG. 1A is a conceptual diagram illustrating example operations of a conversational modeling system in which a language model processes an input while continuing to generate an output, according to embodiments of the present disclosure.

Natural language processing (NLP) is a field of computer science, artificial intelligence, and linguistics concerned with processing a user command input in the form of a natural human language (e.g., English, Chinese, etc.). Such a natural language command may come in the form of audio, text, image, multi-modal, or other format. Natural language processing may involve a number of different specific processing techniques such as those discussed below. Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Speech synthesis generation (SSG) (including legacy technology sometimes referred to as text-to-speech or TTS) is a field of computer science concerning transforming textual and/or other data into audio data that is synthesized to resemble human speech. Natural language generation (NLG) is a field of artificial intelligence concerned with automatically transforming data into natural language (e.g., English) content. Speech-to-speech (S2S) is a field of computer science, artificial intelligence, and linguistics in which embedding data is generated to represent human speech in audio data and, using one or more models, the embedding data is processed to generate audio data (synthetic speech) and/or a system (e.g., API) command responsive to the input human speech. Language modeling is the use of various statistical and probabilistic techniques to determine the probability of a given sequence of words occurring next to each other and with proper grammatical syntax (e.g., proper sentence formation). Language modeling can be used to perform various tasks including understanding a natural language input and performing generative tasks that involve generating natural language output data. These and other technologies may be used individually and/or in combination as part of a speech-processing system such as a virtual assistant or chatbot.

Language modeling may be performed by a language model ("LM") such as a large language model. An LM is an advanced artificial intelligence system designed to process, understand, and generate human-like text (and/or other data types) based on relatively large amounts of data. An LM may be built using deep learning techniques, such as neural networks, and may be trained on extensive datasets that include content from a broad range of sources, such as old/permitted books and websites authorized for training, for natural language processing. An LM may be trained using an expansive training dataset and may include a large number of parameters (in the range of billions, trillions, or more); hence, LMs may sometimes be referred to as "large" language models.

In some implementations, an LM may be based on a transformer architecture having an encoder and/or decoder. The LM may operate in a sequence-to-sequence manner in which it processes an input sequence to generate an output sequence. The LM can extract information from tokens (or other data type) of the input sequence as well as their positions relative to each other. Likewise, the model can reflect the extracted information in both the selection and ordering of tokens in the output sequence. In some implementations, an LM may operate autoregressively. For example, a transformer decoder may generate a sequence of output tokens based on the input data (e.g., a prompt) and previously predicted output tokens.

As LMs increase in complexity and improve in function, they may become capable of performing complex tasks (e.g., made up of sequential subtasks that may call upon external resources). For example, a user may pose a question using natural language (e.g., normal human speech), and a computer system may draw upon an LM to process the question, leverage resources to obtain information and/or to perform an action, and generate a natural language response to the user. A computer system, or a software component executing on a computer system, that accepts text and/or natural language inputs, draws upon an LM to process the inputs and perform a function, and responds via text and/or natural language outputs, may be referred to as an "agent." A user may interact with an agent via natural language text and/or speech, and the agent may respond in kind. Interactions may occur in a single turn in which the user asks a question, and the agent provides an answer. Interactions may occur over multiple turns in which the user asks follow-on questions, and the agents provides additional answers and/or perform additional actions. Multiturn interactions may become conversational. For example, each output (answer) generated by the agent may take into account not only the most recent question but the interaction history (and, in some cases, additional information about the user, context, and/or data retrieved by the agent).

Offered herein are techniques for conversational modeling using a language model. Typically, LM processing is synchronous in the sense that the LM may receive an input and generate a response output in discrete steps. In synchronous operation, the system may receive an input and predict an endpoint (e.g., indicating that a user has finished speaking), then process the input to generate an output (e.g., a response to the input), which it then presents to the user. In this sense, the system has two modes: a listening mode and a speaking mode. In contrast, human conversation often involves additional asynchronous speech such as backchanneling. Backchanneling refers to a conversation participant interjecting while the other participant is speaking. The interjection may be verbal and/or non-verbal. Such interjections are not necessarily, however, an interruption. Rather, the interjecting party may use the backchannel speech to encourage the speaker, show interest, indicate agreement, express sympathy, etc. Backchanneling is distinct from an interruption, which is when the interrupting party takes a turn (or attempts to take a turn) speaking (perhaps before the other party has finished speaking). Because backchanneling is a natural feature of human communication, configuring an LM agent system to process and/or engage in backchannel speech may provide a more natural and pleasing user experience with the agent.

Enabling an LM to engage in asynchronous communication via backchanneling may involve one or more improvements to the LM system. First, the system may be configured to process an input using the LM while the LM continues to generate an output. This represents a "dual-mode" in which the LM is "listening" while also "rendering." For example, an LM orchestrator may process portions of the input (e.g., one or a few tokens at a time) while generating the output (e.g., one or a few tokens at a time). Thus, the LM orchestrator may interleave input processing stages and output generation stages until, for example, the LM determines that the user was backchanneling, in which case the LM may continue generating the current output, or that the user is barging in, in which case the LM may cease generating the current output in lieu of generating a new output responsive to the latest input.

A second improvement may include maintaining an accurate conversation history that reflects actual inputs and outputs of the system including, in some cases, user and/or system-generated backchannel speech. In a multi-turn interaction, the system may generate prompts for processing by the LM that include not only the latest input, but previous inputs and outputs from the interaction. In some implementations, the system may include a prompt history rewriter that can determine whether a previous response generated by the LM was presented to the user. For example, if the user interrupts the system before the system has finished rendering/outputting a response, the prompt history rewriter may exclude unrendered portions of the LM output from future LM prompts for the interaction. This may prevent the LM from generating an output based on an inaccurate representation of the conversation history.

A third improvement may include adding a system backchannel model in which the LM generates an output (e.g., system backchannel speech) while continuing to receive and process an input (e.g., a user input). In other words, the system may render an output to the user without taking a turn. Thus, the system may return to the listening mode after rendering the system backchannel output.

The timing of backchannel speech (which may include natural language or non-language sounds) may be important. For example, if there is an opportunity for the system to render backchannel speech, the user experience would be better served if the opportunity were predicted and acted upon with minimal latency. Similarly, if the user has finished speaking and awaits a system response, the system should predict the endpoint and generate the response quickly. The system may therefore include one or more features for improving the responsiveness of the system in detecting and/or generating backchannel speech.

Thus, a fourth improvement may include implementing a first-pass model or component that can process input audio data, detect speech, and predict opportunities for system backchanneling and/or predict an endpoint of user speech. The first-pass component may include, for example, an acoustic model, voice activity detector (VAD), classifier, and/or logic. The first-pass component may be much smaller (e.g., in terms of number of parameters and/or computing resources used) than the LM, enabling it to detect speech, predict backchannel opportunities, and/or predict speech endpoints more efficiently than the LM. For example, if the input data is audio (e.g., speech), the first-pass component may process every frame of the audio data (or batches of several frames) relatively inexpensively. In contrast, processing data at this rate with the LM would be impractical in most cases.

To further reduce latency, the first-pass component may, in some implementations, perform "chunking" of the input data to provide segments (e.g., chunks) of the input data to the LM. The first-pass component may send a segment of input data to the LM for processing if one or more of several conditions are met. For example, in the listening mode, the first-pass component may send a segment of the input data to the LM for processing if the first-pass component predicts an opportunity for the system to render backchannel speech, if the first-pass component predicts an endpoint (e.g., indicating the agent should take a turn), and/or if the first-pass component has buffered an amount of input data corresponding to a certain segment size (e.g., corresponding to one or several seconds of speech). When one or more of these conditions are met, the first-pass component may send the buffered input data to the LM for processing. This portion-wise processing of the input data may enable the LM to make a final decision regarding backchanneling, turn-taking, etc., sooner than if processing were delayed until a final endpoint decision by an upstream component.

A fifth improvement may include a streamlined content moderation process. LMs and/or agents may include guardrails and/or content filters to prevent the system from outputting personal, confidential, illegal, potentially harmful, and/or otherwise inappropriate content. Content moderation may be accomplished using additional trained models configured to detect and block/remove inappropriate content from the outputs. A content moderation model may introduce additional latency to the system. Because backchannel speech tends to be limited in content/vocabulary relative to substantive agent outputs, the system may be configured with a lighter weight content moderation process for system-generated backchannel speech. For example, backchannel content moderation may be configured into the LM itself by restricting the vocabulary available for backchannel speech. Additionally or alternatively, a lighter weight content moderation component may be configured with policies corresponding to permitted/forbidden words, content length, etc.

In some implementations, the LM may be a speech-to-speech (S2S) LM. A speech-to-speech LM may be a multimodal LM that can process and/or generate both text and acoustic representations of natural language (and, in some cases, additional modes of data as well). The S2S LM may act as a front end (e.g., providing a voice user interface (VUI)) via which a user can access external resources such as other LMs, tools, knowledge basses, etc. For example, the S2S LM may receive user speech and generate a prompt for processing by a second LM. The second LM may be, for example, a specialized LM configured to handle requests related to a particular domain of knowledge. The second LM may return a response in the form of, for example, text and/or other content. The S2S LM may process the text/content data to generate speech, which the system may output to the user. Thus, the benefits of the conversational modeling may be extended to the use of such a delegate LM and/or other resources as described herein.

These techniques may be implemented alone or in combination with each other and/or other features of the systems and methods described herein. The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1A is a conceptual diagram illustrating example operations of a conversational modeling system 100 in which a LM 160 processes an input while continuing to generate an output, according to embodiments of the present disclosure. The system 100 may act as an agent that a user 5 may interact with to, for example, ask questions and/or command the system 100 to perform actions for or on behalf of the user 5. As used herein, the term "agent" refers a software component that encapsulates a function, has a text-in/text-out interface, and draws upon an LM.

The system 100 may include a user device 110, such as speech-detection device with display 110*f* pictured, and one or more system components 120 in communication via one or more computer networks 199. In some implementations, the functions of the system 100 may be divided and/or duplicated between multiple system components 120 and/or the user device 110. The user 5 may interact with the user device 110 by various means including by using natural language speech and/or text. In various implementations, the user device 110 may be any one of the user device illustrated in FIG. 10, and may include hardware components as described below with reference to FIG. 8. In some implementations, the user device 110 may operate in conjunction with one or more of the system components 120. A system component 120 may include hardware components as described below with reference to FIG. 9.

The user 5 may provide various input data 105 to the system 100, and the system 100 may respond with various output data 195. The input data 105 may include a natural language user command in the form of text and/or audio (e.g., representing user speech). In some cases, the input data 105 may include other forms of data such as a menu selection, other user-provided data such as an uploaded file, context data representing the user's environment and/or a state of the user device 110. The output data 195 may include natural language generated by the system 100 in the form of text and/or audio (e.g., representing synthesized speech). In some cases, the output data 195 may include other data such as a requested file, device directive (e.g., instructing the user device 110 to perform an action), etc.

The system 100 may act as an agent with which the user 5 can interact in a conversational manner in which the user 5 speaks to the system 100 and the system 100 responds with synthesized speech. The system 100 may be configured with conversational modeling capabilities that enable backchanneling by the user 5 and/or the LM 160. The system 100 may include a first-pass component 145. The first-pass component 145 may include software and/or hardware configured to detect speech in the input data 105 and predict a potential backchannel or barge-in event. The first-pass component 145 may be further configured to process the input data 105 into a different form for processing by the LM 160; for example, the first-pass component 145 may include one or more encoders (e.g., neural network encoders) configured to convert text into content tokens, audio into acoustic tokens, etc.

The LM 160 may be a neural network model trained to process and generate natural language. The LM 160 may be a computer model such as a deep neural network. The LM 160 may be described by a set of parameters (e.g., weights determined during training) and hyperparameters (e.g., configured by one or more developers). The hyperparameters may describe an architecture of the model, a number of layers, a number of nodes in a layer, connections between nodes, activation functions of nodes, etc. The hyperparameters may include additional information about the architecture including skip connections, recurrent connections, normalization layers, pooling operations, softmax operations, etc. The model may include one or more components. The components may include, for example, smaller models within the larger acoustic model such as convolutional neural networks (CNNs), recurrent neural networks (RNNs), transformers, etc. The parameters may be determined via training using one or more training datasets.

In some implementations, the LM 160 may be a decoder-only transformer architecture. The LM 160 may be a multi-modal LM. A multi-modal LM is a model that can process data of different types; for example, audio data, video data, sensor data, content data, etc. An example of a multi-modal LM is a speech-to-speech multi-modal LM. A speech-to-speech LM may process audio data and/or content data (e.g., representing a transcript of speech) and generate audio data and/or content data. In various implementations, a speech-to-speech LM may be used to perform speech recognition (e.g., receiving speech audio and generating a text transcription), natural language understanding (e.g., semantic interpretation of the content), natural language command processing and/or output generation, speech synthesis (e.g., receiving a text transcription and generated speech audio), machine translation (e.g., receiving speech audio and/or text in a first language and generating speech audio and/or text in a second language), voice conversion (e.g., receiving speech audio having first voice characteristics and generating speech audio having different voice characteristics), etc. In other implementations, the LM 160 may additionally or alternatively process and generate other modes of data such image/video data, sensor data, API calls/responses, continuous or discrete control signals for actuating physical devices (e.g., servos, motors, lights, etc.), and the like. Multi-modal operation of the LM 160 is described in further detail below with reference to FIG. 4A.

The LM 160 may be based on an LM pretrained on content (e.g., text) only. The "vocabulary" of the LM may be expanded to account for tokens of other modalities including acoustic tokens and/or other modalities of data as described herein. Token data corresponding to other modalities that are introduced to the LM may be viewed as tokens from a new language; for example, speech-to-text (e.g., speech recognition) and text-to-speech (e.g., speech synthesis) tasks become analogous to translation, such as between two different natural languages (e.g., English and French).

The system 100 may include a rendering model 185. The rendering model 185 may include software and/or hardware configured to convert the LM output data 165 into a form for presentation to the user 5. For example, if the LM output data 165 includes acoustic tokens indicated for output to the user, the rendering model 185 may upsample the acoustic tokens into frames of audio data. The first-pass component 145, LM 160, and the rendering model 185 are described in further detail below with reference to FIG. 3B.

The LM 160 may be configured to operate in multiple modes. In a speaking mode 162, the LM 160 may generate LM output data 165. The LM output data 165 may represent, for example, responsive content (e.g., text), responsive speech (e.g., audio), messages to other components of the system 100 or other system(s) (e.g., for the purpose of delegation as described in further detail below with reference to FIGS. 3C and 3D). In some cases, the LM output data 165 may include intermediate determinations by the LM 160 when handling a complex task; for example, as described further below with reference to FIG. 3D.

In a listening mode 166, the LM 160 may receive and process LM input data 155. The LM input data 155 may represent, for example, a user command or other user input, a response from an external resource such as another LM or tool, and/or configuration data representing instructions for how the LM 160 is to handle the input.

The LM 160 may be configured with a dual mode 164 in which the LM 160 can process LM input data 155 while continuing to generate LM output data 165. For example, an LM orchestrator 135 may process LM input data 155 representing portions of the input data 105 (e.g., one a few tokens at a time) while generating LM output data 165 (e.g., one or a few tokens at a time). Thus, the LM orchestrator 135 may interleave stages of input processing and output generation until, for example, the LM 160 generates a token or other output indicating that the user 5 was backchanneling (in which case the LM orchestrator 135/LM 160 may continue generating the current output) or that the user 5 is barging in (in which case the LM 160 may cease generating the current output in lieu of generating a new output responsive to the latest input).

FIG. 1A illustrates example operations of the system 100 handling user 5 speech while generating an output. The operations may begin with the system 100 operating in the speaking mode 162, in which the LM 160 is generating an output to the user 5 (e.g., in response to a previous user input and/or proactively based on detection of an event). In some cases, the LM 160 may generate an output in multiple steps; for example, a speech-to-speech LM may generate output content (e.g., tokens representing text/content) and then convert the output content to generate output speech (e.g., acoustic tokens). The LM 160 may operate autoregressively such that the LM 160 generates each output token (e.g., content or acoustic) based the input data as well as previously generated tokens. Thus, the LM 160 may generate the LM output data 165 in a series of processing steps occurring over a finite period of time.

At some point, the system 100 may receive some input data 105. The first-pass component 145 may process the input data 105, detect speech, and predict a potential backchannel or barge-in event. If the first-pass component 145 predicts one of these events, it may send LM input data 155 representing the input data 105 to the LM 160. In some implementations, the first-pass component 145 may include features to enable portion-wise processing of the input data 105. For example, a user utterance may include several seconds of speech. To improve the responsiveness of the system (e.g., reduce user-perceived latency), the first-pass component 145 may be configured with a maximum segment size. The first-pass component 145 may buffer received input data 105 until it receives the maximum segment size, at which point the first-pass component 145 may send LM input data 155 representing the buffered input data 105 to the LM 160, even if the first-pass component 145 has not predicted a backchannel event, barge-in event, or an end of the user's speech (e.g., endpoint).

The LM orchestrator 135 may receive the LM input data 155 and enter the dual mode 164. In the dual mode 164, the LM 160 may process the LM input data 155 while continuing to generate the LM output data 165. The LM orchestrator 135 and LM 160 may continue to process the LM input data 155 while generating the LM output data 165.

The system 100 may, at a stage 161, determine whether the user speech represented in the LM input data 155 likely corresponded to a backchannel ("BC") event or a barge-in ("BI") event. The LM 160 may identify the backchannel or barge-in event based on the content of the user's speech. The LM 160 may generate a token indicating the determination; for example, a backchannel event token ("<BC>") or a barge-in event token ("<BI>"). The LM orchestrator 135 may receive the token and act accordingly.

If the LM 160 determines that the user speech represents a backchannel event ("BC" at 161), it may generate a <BC> token or, in some cases, simply continue generating LM output data 165 corresponding to the current operation. Accordingly, the system 100 may return to the speaking mode 162 (e.g., and continue generating the previous response). In some cases, the LM 160 may include the user's backchannel speech as context/history for generating subsequent outputs. For example, the LM 160 may determine that the backchannel speech represents approval of the system 100 output and/or a positive or negative sentiment in reaction to the content of the output. The LM 160 may use this information as a feedback signal (e.g., that the LM 160 is providing a reasonable response to the input) and/or to adjust the delivery of the output (e.g., increasing or decreasing the emphasis and/or enthusiasm of synthesized speech and/or the vocabulary used).

Figure 1B:
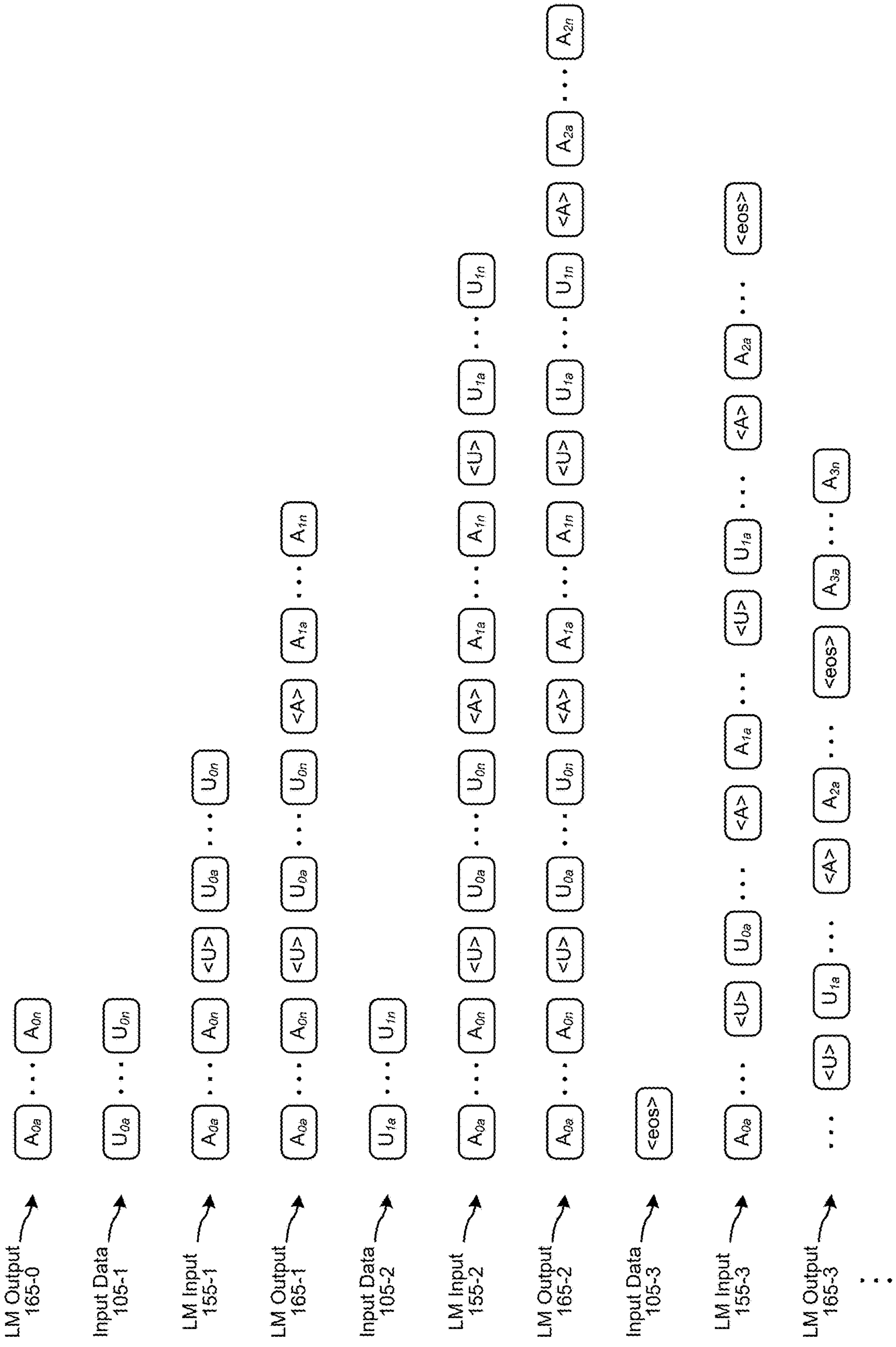
FIG. 1B is a conceptual diagram illustrating example LM inputs and outputs of the system entering dual mode, detecting backchanneling, and continuing in speaking mode, according to embodiments of the present disclosure.

FIG. 1B is a conceptual diagram illustrating example LM inputs and outputs of the system 100 entering dual mode 164, detecting backchanneling, and continuing in speaking mode 162, according to embodiments of the present disclosure. The system 100 may generate LM output data 165-0 (e.g., including tokens $A_{0a}$-$A_{0n}$) representing a system response to a previous input. The system 100 may receive input data 105-1 representing, for example user speech. The first-pass component 145 may generate LM input data 155-1 including tokens $U_{0a}$-$U_{0n}$ representing the user input. Although the system 100 is in the speaking mode 162, the LM orchestrator 135 may enter the dual mode 164 and add the user input $U_{0a}$-$U_{0n}$ to LM input data 155-1. The LM 160 may process the LM input data 155-1 including the user input tokens $U_{0a}$-$U_{0n}$ while continuing to generate tokens $A_{1a}$-$A_{1n}$ (e.g., in the LM output data 165-1) corresponding to the current output.

The system 100 may continue operating in the dual mode 164 as it receives further input data 105-2 and adds additional user input tokens $U_{1a}$-$U_{1n}$ to LM input data 155-2. The LM 160 may process the LM input data 155-2 to generate LM output data 165-2 including tokens $A_{2a}$-$A_{2n}$ corresponding to the current output. The system 100 may continue processing input tokens U corresponding to the new user input and generating output tokens A corresponding to the current response.

At some point, the first-pass component 145 may predict an end-of-speech, and include an <eos> token in input data 105-3. The LM orchestrator 135 may add the <eos> token to LM input data 155-3. The LM 160 may process the LM input data 155-3 and generate LM output data 165-3. The LM 160 may make a final decision regarding the end-of-speech (e.g., confirm, based on the content of the user input U, that the user had likely finished speaking). The example inputs and output shown in FIG. 1B represent an example operation in which the LM 160 determines that the user input represents backchannel speech ("BC" at 161 in FIG. 1A). (e.g., the user 5 does not intend to interrupt the current output). Accordingly, the system 100 return to the speaking mode, and the LM 160 may continue generating tokens $A_{2a}$-$A_{2n}$ corresponding to the current output until it completes the response and/or until it is interrupted by a subsequent input.

Returning to FIG. 1A, if the LM 160 determines that the user speech represented in the LM input data 155 likely corresponds to an intent to barge-in ("BI" at 161) the LM orchestrator 135 and/or LM 160 may halt generation of the LM output data 165 and/or presentation of the corresponding output, and enter the listening mode 166.

The system 100 may receive the LM input data 155 and process it to generate a new response. The user input may represent a continuation of and/or refer back to previous turns in the interaction between the user 5 and the system 100. Thus, the system 100 may prompt the LM 160 with previous LM input data 155 and/or LM output data 165 from the interaction. In the case of a barge-in, however, a portion of the LM output data 165 may not have been rendered and/or presented to the user 5. To prevent the LM 160 from generating an output based on an inaccurate representation of the conversation history, the system 100 may include a prompt history rewriter 139.

The prompt history rewriter 139 may include software and/or hardware configured to exclude unrendered portions of LM output data 165 from future prompts to the LM 160. The prompt history rewriter 139 may be a component of the LM orchestrator 135 and/or may be a separate component that interfaces with the LM orchestrator 135. If the LM 160 confirms a barge-in prediction and the system 100 switches to the listening mode 166, the prompt history rewriter 139 may note the most recent LM output data 165, and determine what portion of a response has been rendered (e.g., output to the user) and what portion has not yet been rendered. In some cases, the prompt history rewriter 139 may receive additional data regarding presentation of output audio data 351 from the system 100 (e.g., by timestamp, frame number, or the like). In cases where the prompt history rewriter 139 does not have access to information about what output was actually presented, it may factor in a margin by determining the portion of output rendered by the LM 160 and removing N number of tokens, where N corresponds to an estimated latency between token generation and presentation of the corresponding output by the system 100. When the prompt history rewriter 139 determines (or estimates) the portion of the LM output data 165 was not presented, it may remove those tokens from subsequent prompts to the LM 160 for that conversation.

Figure 1C:
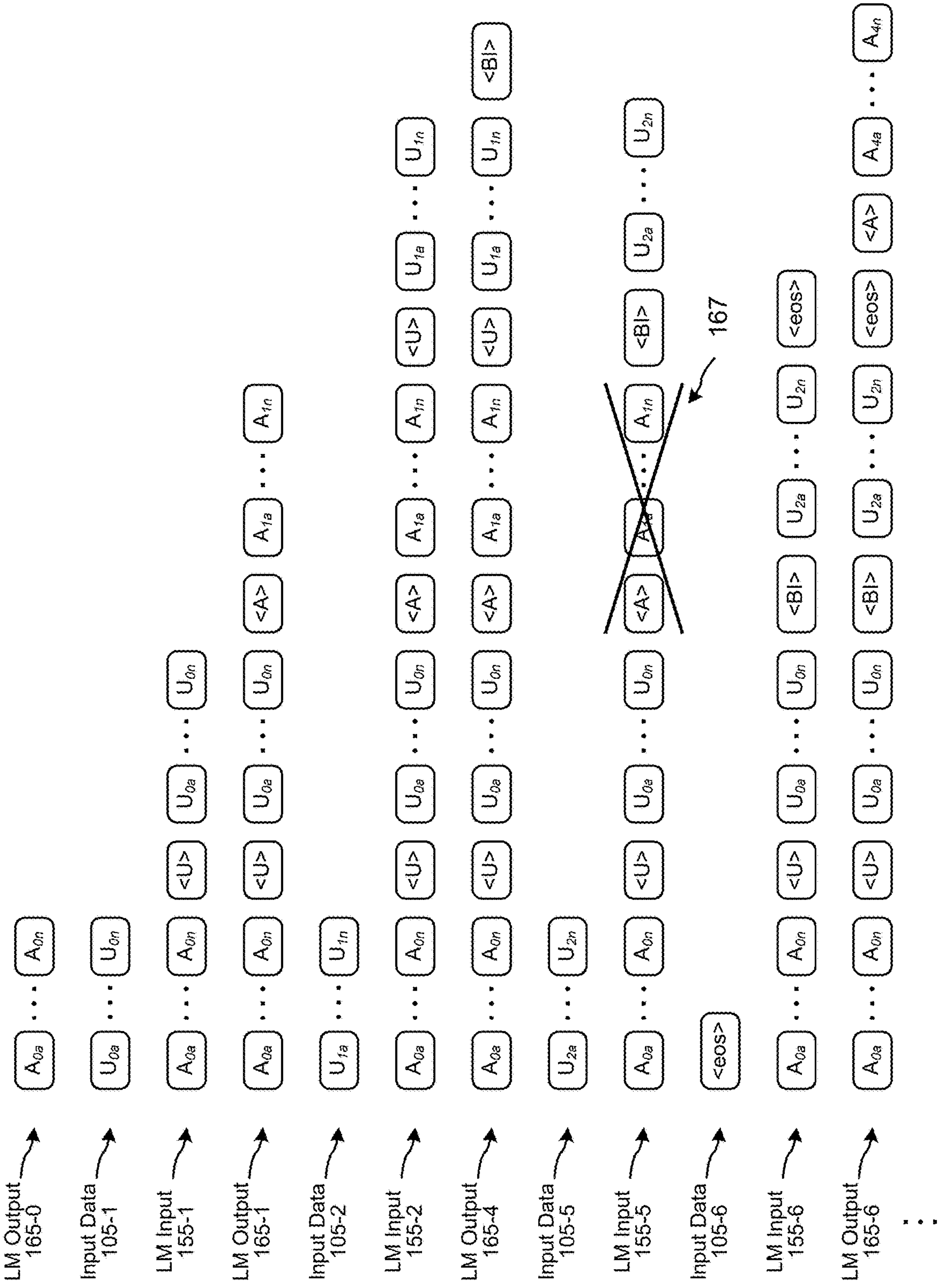
FIG. 1C is a conceptual diagram illustrating example LM inputs and outputs of the system entering dual mode, detecting a barge-in, and transitioning to listening mode, according to embodiments of the present disclosure.

FIG. 1C is a conceptual diagram illustrating example LM inputs and outputs of the system 100 entering dual mode 164, detecting a barge-in, and transitioning to listening mode 166, according to embodiments of the present disclosure. The inputs/outputs and operations are similar to those shown in FIG. 1B until the LM 160 generates LM output data 165-4. The LM output data 165-4 includes a <BI> token indicating that the LM 160 has determined that the user input $U_{1a}$-$U_{1n}$ represents an intent to interrupt the current system 100 output ("BI" at 161 in FIG. 1A). Accordingly, the system 100 may transition to the listening mode 166. In the listening mode, the system 100 may receive further input data 105-5 representing user input $U_{2a}$-$U_{2n}$. The LM orchestrator 135 may add the user input $U_{2a}$-$U_{2n}$ to LM input data 155-5. To ensure the LM 160 has the correct context for processing the user input $U_{2a}$-$U_{2n}$, the prompt history rewriter 139 may exclude portions of the LM output data 165-4 that the system 100 had not yet presented to the user 5 when the LM 160 detected the barge-in and switched to the listening mode 166. Accordingly, the prompt history rewriter 139 may exclude unrendered tokens 167 (e.g., representing the LM output $A_{1a}$-$A_{1n}$, or a portion of that output) from the LM input data 155-5.

The first-pass component 145 may predict an end of speech in the input data 105-6 and send it to the LM orchestrator 135; for example, as an "<eos>" token. The LM orchestrator 135 may generate LM input data 155-6 that includes the <eos> token but that excludes the unrendered tokens 167. The LM 160 may process the LM input data 155-6 to generate LM output data 165-6, which may include LM output $A_{4a}$-$A_{4n}$ based on the correct context.

Figure 2A:
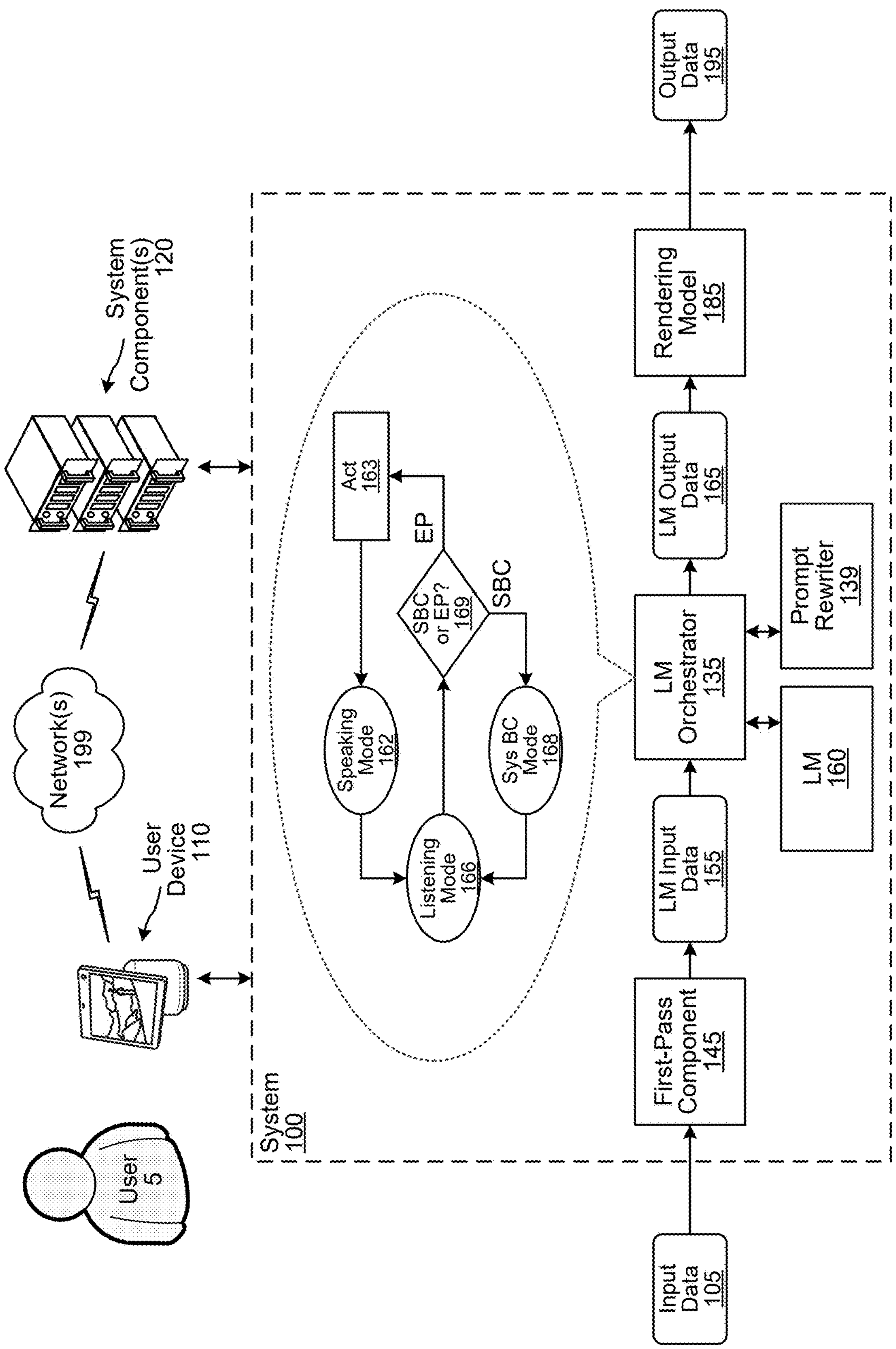
FIG. 2A illustrates example operations of the system in which the language model generates an output while continuing to process an input, according to embodiments of the present disclosure.

FIG. 2A illustrates example operations of the system 100 in which the language model generates an output while continuing to process an input, according to embodiments of the present disclosure. The LM 160 may be configured with a system backchannel mode 168 in which the LM 160 can generate LM output data 165 representing backchannel speech while continuing to process LM input data 155. In some implementation, the system backchannel mode 168 may be similar to the dual mode 164 described above for FIG. 1A. In some implementations, the system backchannel mode 168 may be a distinct but similar mode; for example, the dual mode 164 and the system backchannel mode 168 may involve different techniques for interleaving input processing and output generating stages. In either case, the system backchannel mode 168 may represent an operational condition in which the LM 160 may both process an input and generate an output corresponding to the same user interaction, without one of the operations halting or interrupting the other (unless/until a final determination is made with respect to barge-in or turn-taking).

In an example operation, the system 100 may operate in the listening mode 166. In the listening mode 166, the LM 160 may process LM input data 155 representing input data 105 that the system 100 is currently receiving. The first-pass component 145 may predict an opportunity for backchanneling, turn taking, and/or a potential speech endpoint. The first-pass component 145 may then publish LM input data 155 to the LM 160 for processing.

The LM 160 may process the LM input data 155. The system 100 may, at a stage 169, determine whether the LM input data 155 likely represents an opportunity for backchanneling. If the LM 160 determines that the LM input data 155 likely represents an opportunity for backchanneling ("SBC" at 169), the LM 160 may enter the system backchannel mode 168. In the system backchannel mode 168, the LM 160 may continue receiving and processing LM input data 155. During a same period of time, the LM 160 may generate LM output data 165 representing backchannel speech.

Figure 2B:
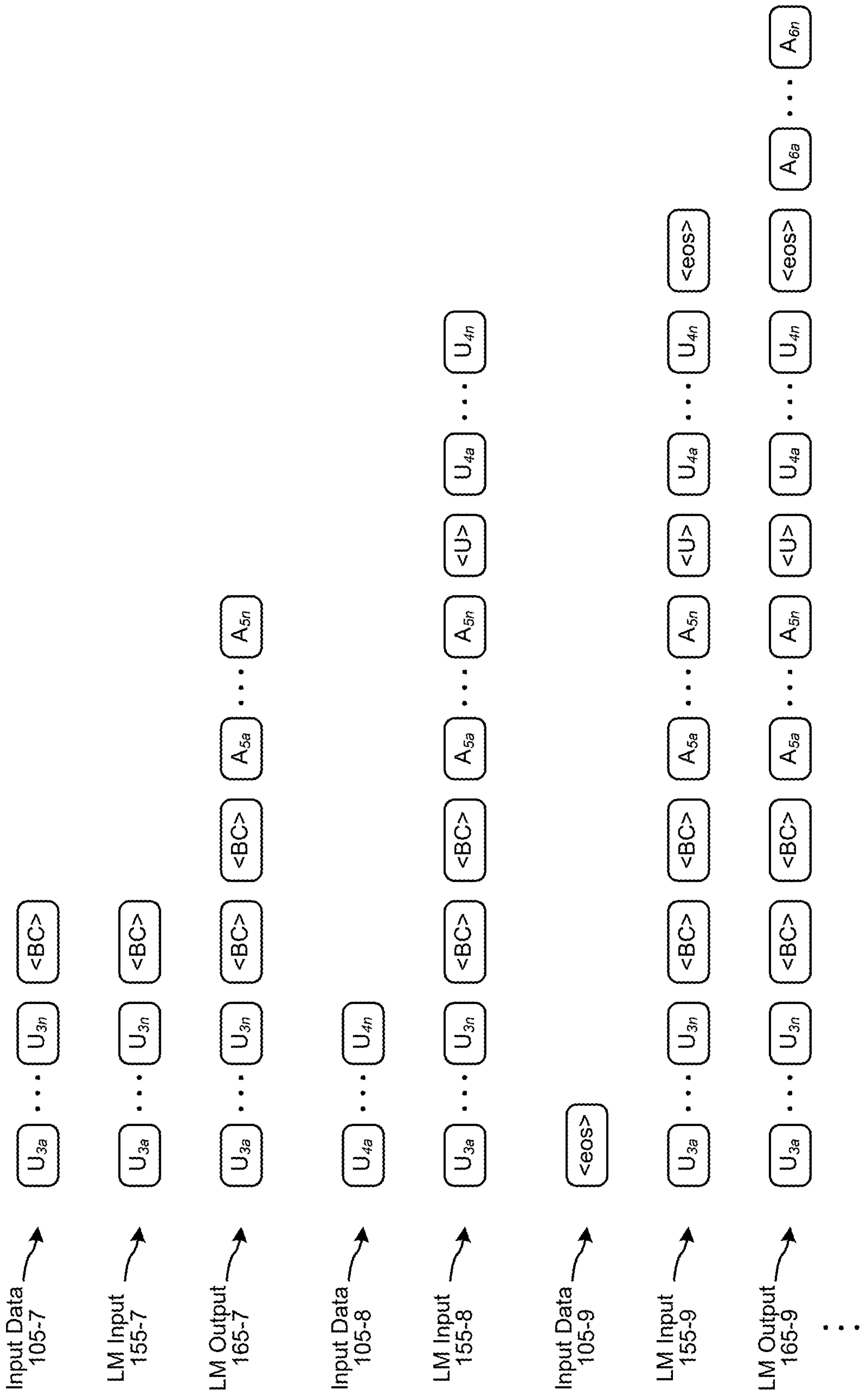
FIG. 2B is a conceptual diagram illustrating example LM inputs and outputs of the system operating in the system backchannel mode, according to embodiments of the present disclosure.

FIG. 2B is a conceptual diagram illustrating example LM inputs and outputs of the system 100 operating in the system backchannel mode 168, according to embodiments of the present disclosure. The operations illustrated in FIG. 2B may begin while the system 100 is in the listening mode 166. The system 100 may receive input data 105-7 representing, for example, user 5 speech. The first-pass component 145 may detect an opportunity for system backchanneling. In some implementations, the first-pass component 145 may make a prediction that represents one or more of an opportunity for system backchanneling, an opportunity for the system 100 to take a turn, and/or a speech endpoint. The first-pass component 145 may publish the input data 105-7 received thus far, and include a token indicating the predicted backchannel/turn-taking opportunity/potential endpoint; for example, a "<BC>" token as shown in FIG. 2B. The LM orchestrator 135 may determine LM input data 155-7 including the user input tokens $U_{3a}$-$U_{3n}$ and the <BC> token. The LM 160 may process the LM input data 155-7 and determine that the <BC> token does indeed represent an opportunity for system backchanneling ("SBC" at 169). Accordingly, the LM 160 may generate LM output data 165-7 including output tokens $A_{5a}$-$A_{5n}$ representing system backchannel speech. Following generation/output of the system backchannel speech, the system 100 may return to the listening mode 166 and continue processing user input.

The system 100 may receive input data 105-8 representing a continuation of the user 5 speech. The LM orchestrator 135 may add the continuation of the user speech to LM input data 155-8 as user input tokens $U_{4a}$-$U_{4n}$. The first-pass component 145 may detect an end of speech and send input data 105-9 to the LM orchestrator 135 including an "<eos>" token representing the predicted end of speech. The LM orchestrator 135 may add the <eos> token to LM input data 155-9. The LM 160 may process the LM input data 155-9 and determine that the <eos> token indeed represents a speech endpoint (and/or determine that the system 100 should take a turn). Accordingly, the LM 160 may perform an action 163 for or on behalf of the user, and/or enter the speaking mode 162 to generate a substantive response to the user 5. The LM 160 may generate LM output data 165-9 including output tokens $A_{6a}$-$A_{6n}$. The system 100 may perform an action indicated by the output tokens $A_{6a}$-$A_{6n}$ and/or render the output tokens $A_{6a}$-$A_{6n}$ as an output to the user 5.

Returning to FIG. 2A, in some implementations, the system-generated backchannel speech may be relatively terse and/or include a limited vocabulary. The backchanneling may include non-verbal vocalizations and/or paralinguistic signals such as "um", "ah", sighs, laughter, etc. In some cases, the backchanneling may include simple interjections, words, and/or phrases such as, "Okay", "Yes", "I see", etc. After rendering the backchannel speech, the LM 160 may return to the listening mode 166.

The LM 160 may include guardrails and/or content filters to prevent the system 100 from outputting certain types of content (e.g., confidential and/or potentially harmful/obscene). Content moderation may be imposed on substantive content/speech generated by the LM 160. The content moderation may be accomplished using additional trained models configured to detect and block/remove inappropriate content from the outputs; however, such models may introduce additional latency to the system. Thus, to improve the responsiveness of the system 100 when rendering backchannel speech, the system 100 may be configured with different content moderation processes depending on whether the LM 160 is outputting substantive content or backchannel speech.

If the LM 160 determines that the user speech represented in the LM input data 155 likely corresponds to a speech endpoint ("EP" at 169) (e.g., indicating that the system 100 is to take a turn and render a response), the LM 160 may perform an action 163 for or on behalf of the user, and/or enter the speaking mode 162 to generate a substantive response to the user 5.

Figure 3A:
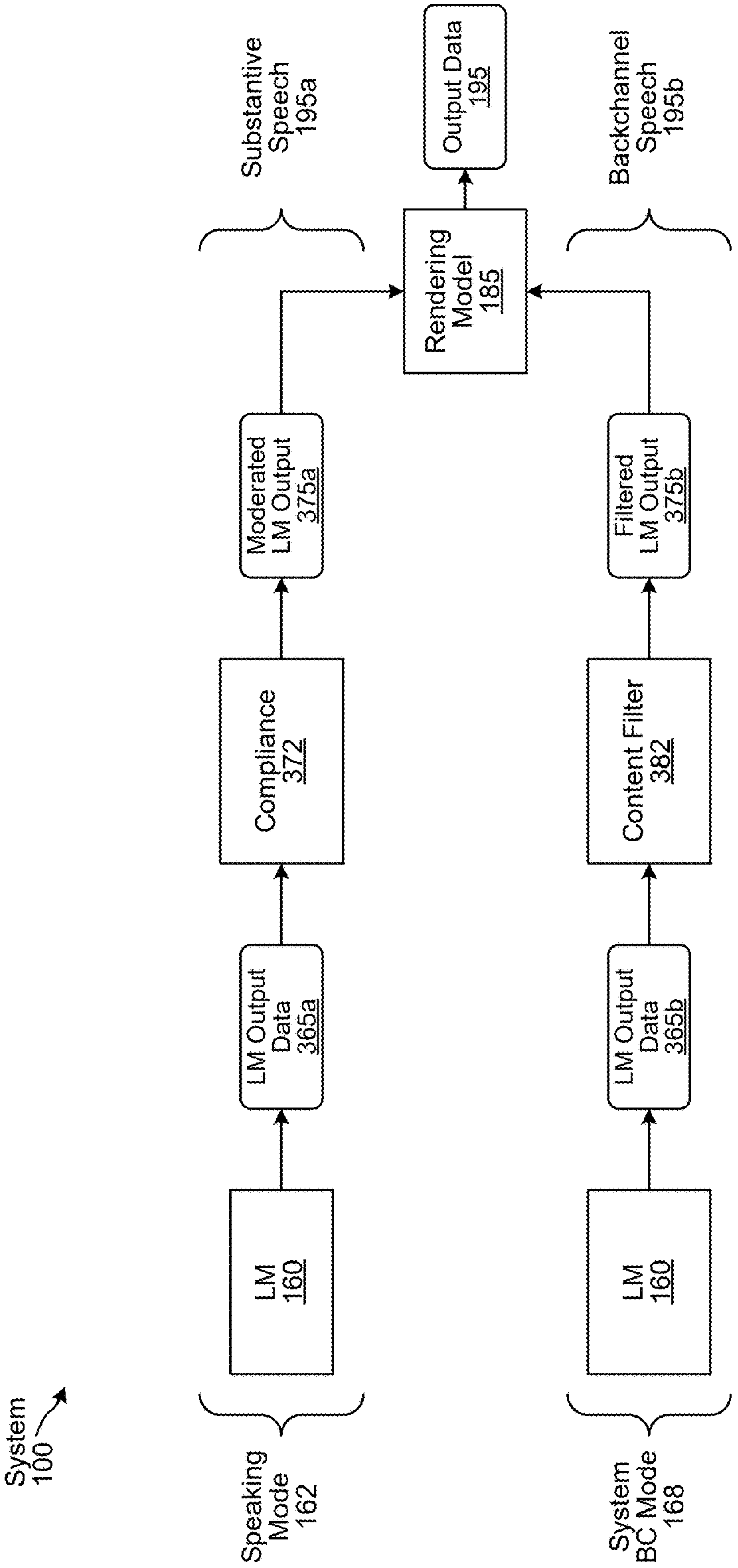
FIG. 3A is a conceptual diagram illustrating different content moderation processes for substantive system-generated speech and backchannel system-generated speech, according to embodiments of the present disclosure.

FIG. 3A is a conceptual diagram illustrating different content moderation processes for substantive system-generated speech and backchannel system-generated speech, according to embodiments of the present disclosure. The conversational modeling system 100 may generate two or more different types of output including substantive speech 195*a* and backchannel speech 195*b*. In some implementations, the system 100 may implement streamlined content moderation for the backchannel speech 195*b* to decrease user-perceived latency. Streamlined content moderation may be practical due to the brevity and/or limited vocabulary used for system-generated backchannel speech 195*b*.

Figure 5:
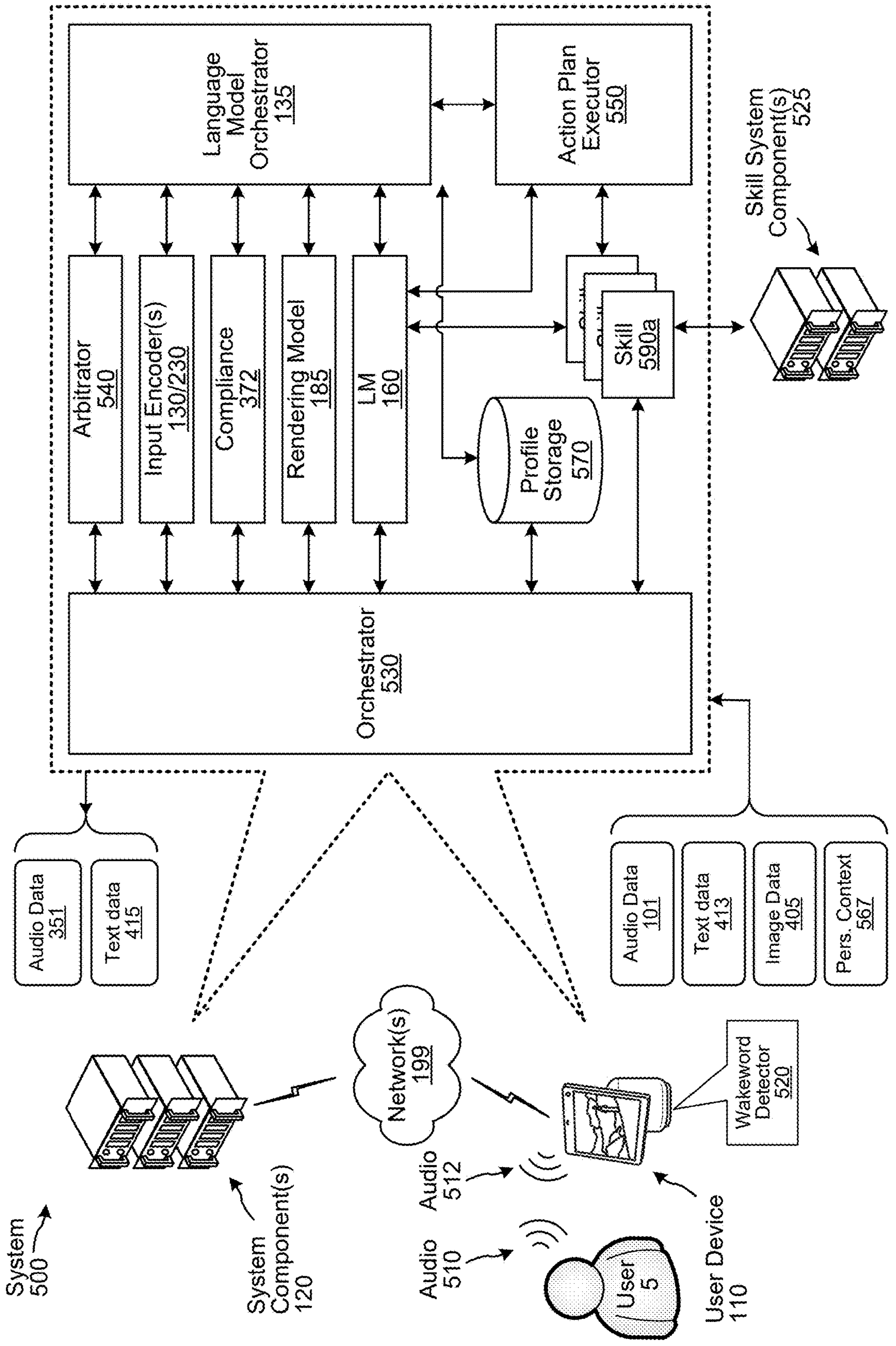
FIG. 5 is a conceptual diagram illustrating components of a natural language processing system, according to embodiments of the present disclosure.

In the speaking mode 162, the LM 160 may generate LM output data 365*a* representing substantive speech 195*a*. The substantive speech 195*a* may represent a response to a user input and include information embodied in the LM 160 and/or obtained from an external resource such as an API, tool, delegate LM, etc., as described herein. The substantive speech 195*a* may include natural language conveyed in complete sentences. The system 100 may include a full content moderation and compliance component 372 configured to process the LM output data 365*a* and block, delete, and/or otherwise prevent output of prohibited content in the LM output data 365*a* from the system 100. The compliance component 372 may include software and/or hardware to analyze the content of the LM output data 365*a* and detect prohibited content such as personally identifying information, healthcare or financial data, potentially harmful or hurtful content, content related to potentially illegal acts, etc. In some implementations, the compliance component 372 may process LM input data 155 as well to prevent the LM 160 from being prompted with prohibited requests or instructions. In some embodiments, the compliance component 372 may process other data (e.g., context data, user profile data, system configuration/policy data, etc.) to determine whether the generated response and/or the input is appropriate. In some embodiments, the compliance component 372 may be included in the LM orchestrator 135 and/or the orchestrator component 530 (described below with reference to FIG. 5). In other embodiments, the compliance component 372 may be a separate component; for example, as shown in FIG. 5.

In some embodiments, the compliance component 372 may determine whether the LM output data 365*a* (and, in some cases, LM input data 155 as well) corresponds to training data used to configure the LM 160 (e.g., the model output or user input is semantically or lexically similar to the training data, the model output or user input corresponds to functionality (e.g., topics, categories, actions, etc.) that the model is trained for, etc.). Additionally or alternatively, the compliance component 372 may determine whether the LM output data 365*a* (and, in some cases, LM input data 155 as well) corresponds to one or more words or phrases determined to be confidential, sensitive, or offensive. Additionally or alternatively, the compliance component 372 may determine whether the user input or the model output corresponds to an inappropriate content category, which may include biased content (e.g., biased toward protected classes including gender, race, age, etc.), harmful content (e.g., violent content, self-harm, etc.), profanity, etc.

In some cases, the compliance component 372 may include one or more trained models such as another LM configured with an understanding of human language that can allow it to detect prohibited content in, for example, long-form content in which the prohibited content may be indicated or implied by several sentences or paragraphs of text or speech. In some implementations, the compliance component 270 may include a trained model such as an encoder configured to encode the LM output data 365*a* into vectors. The compliance component 372 may be configured to determine a vector for each word, phrase, clause, sentence, and/or paragraph of the LM output data 365*a* (e.g., as delineated by tokens corresponding to punctuation). The vectors may be compared to vectors in a look-up table, key-value store, database, and/or other structure. The compliance component 372 may determine a match for the vector in the storage and/or may determine a distance between the vector and stored vectors representing prohibited content. If the compliance component 372 determines a match and/or determines that a vector representing the LM output data 365*a* is below a threshold distance to a vector representing prohibited content, the compliance component 372 may block/remove a portion or all of the LM output data 365*a* from being presented by the system 100. In some implementations, the compliance component 372 may replace the blocked/removed content with an error message stating that content has been withheld for violating a content moderation policy. Due to the sophistication of the content moderation process and/or model(s), the compliance component 372 may consume significant computational resources and/or introduce a significant latency into the response. The compliance component 372 may output moderated LM output data 375*a*, which may be rendered (e.g., into system speech) by the rendering model 185 as described further below with reference to FIGS. 3A and 5.

The full content moderation provided by the compliance component 372 may not be necessary for the system-generated backchannel speech 195*b*, due to its limited vocabulary and shorter length. Thus, in the system backchannel mode 168, a lightweight content filter component 382 may process LM output data 365*b* representing the backchannel speech 195*b*. The content filter component 382 may include software and/or hardware configured to filter the LM output data 365*b* to remove prohibited words and/or phrases. The content filter component 382 may be a simple policy-based process that uses a look-up table, key-value store, and/or other structure to identify prohibited content and remove/block it from the LM output data 365*b*. The flagged words/phrases may be stored in token form for easy matching to the tokens of the LM output data 365*b*. Similar to the compliance component 372, in some implementations, the content filter component 382 may include a trained model such as an encoder configured to encode the LM output data 365*b* into vectors. The content filter component 382 may be configured to determine a vector for each word or phrase of the LM output data 365*b*. The vectors may be compared to vectors in a look-up table, key-value store, database, and/or other structure. The content filter component 382 may determine a match for the vector in the storage and/or may determine a distance between the vector and stored vectors representing prohibited content. If the content filter component 382 determines a match and/or determines that a vector representing the LM output data 365*b* is below a threshold distance to a vector representing prohibited content, the content filter component 382 may prevent the backchannel speech 195*b* from being presented by the system 100.

In some implementations, the light content moderation process may be performed by the LM 160 itself. For example, the LM 160 may be trained and/or configured to restrict itself to a limited vocabulary and/or length of backchannel speech 195*b* (e.g., in terms of numbers of words) when operation in the system backchannel mode 168. Thus, content moderation of the backchannel speech 195*b* may be accomplished without the use of additional components/processes. The content filter component 382 may output filtered LM output data 375*b*, which may be rendered (e.g., into system speech) by the rendering model 185.

Figure 3B:
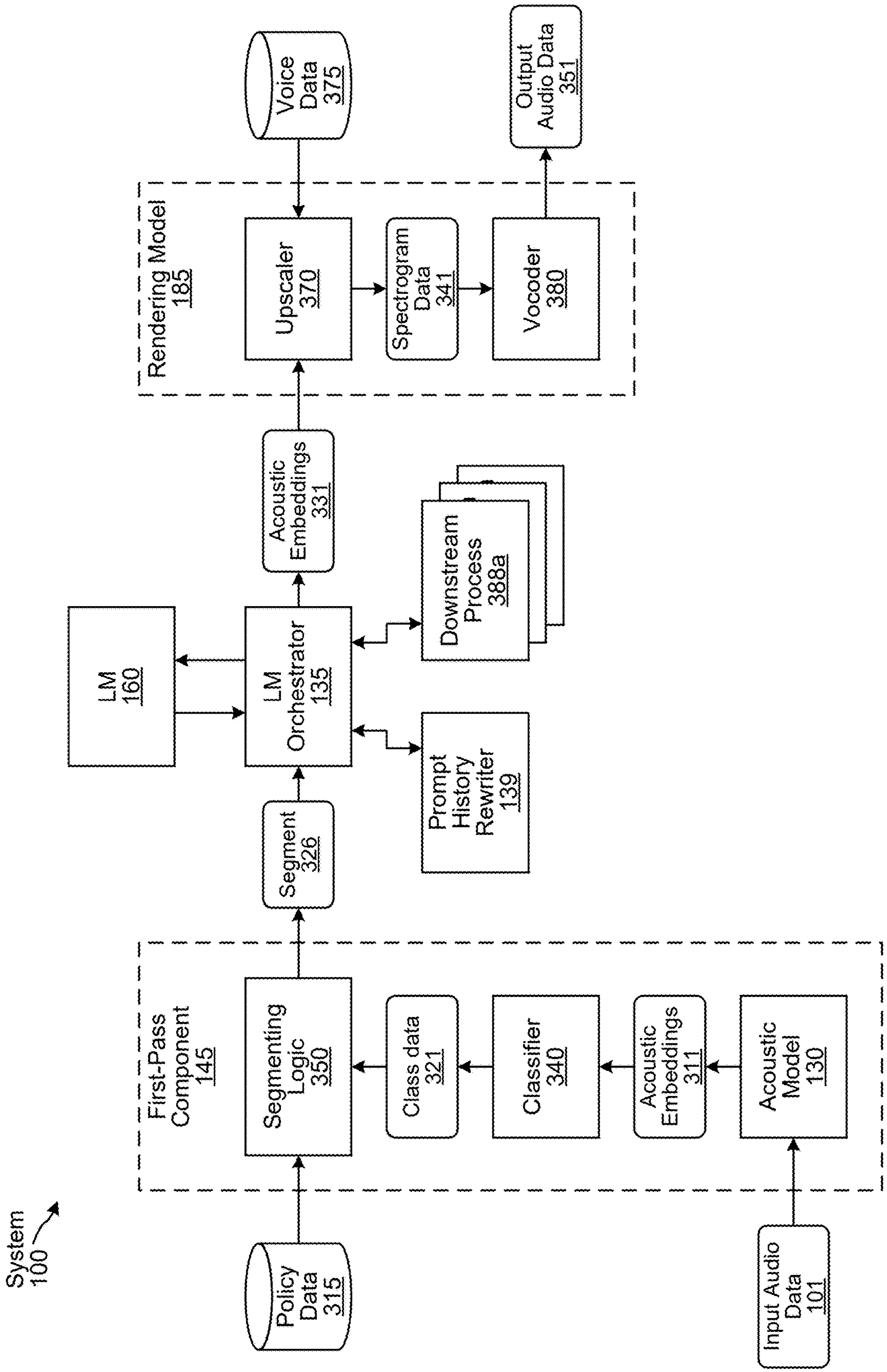
FIG. 3B illustrates components of the system in further detail, according to embodiments of the present disclosure.

FIG. 3B illustrates components of the system 100 in further detail, according to embodiments of the present disclosure. The first-pass component 145 may include one or more components configured to detect speech in the input data 105 and predict a potential backchannel or barge-in event. The first-pass component 145 may include an acoustic model 130. The acoustic model 130 may be a computer model such as a deep neural network. The acoustic model 130 may be described by a set of parameters (e.g., weights determined during training) and hyperparameters (e.g., configured by one or more developers). The hyperparameters may describe an architecture of the model, a number of layers, a number of nodes in a layer, connections between nodes, activation functions of nodes, etc. The hyperparameters may include additional information about the architecture including skip connections, recurrent connections, normalization layers, pooling operations, softmax operations, etc. The model may include one or more components. The components may include, for example, smaller models within the larger acoustic model such as convolutional neural networks (CNNs), recurrent neural networks (RNNs), transformers, etc. The parameters may be determined via training using one or more training datasets. In some implementations, the acoustic model 130 may be trained in a self-supervised model using 5-10 million hours or more of raw, multilingual speech data. In some implementations, the acoustic model 130 may be configured similarly to a Hidden-Unit Bidirectional Encoder Representations from Transformers (HuBERT) model. In some implementations, the acoustic model 130 may be a 1-2 billion parameter model configured to receive audio data (e.g., spectrogram data) having a frame size of 20-40 ms. A frame of audio data may refer to a segment of audio data representing 10, 20, 30, 40 ms, etc. of audio. The frame of audio data may be in the form of, for example, a spectrogram representing the energy content of that portion of audio at various frequency bands. In some implementations, the spectrogram may be, for example, a Mel-spectrogram. Spectrogram data may be generated from waveform audio data using a component such as an acoustic front end (AFE). Thus, a microphone (such as the microphone 820) may receive audio and generate an analog electrical signal, an analog-to-digital converter may convert the analog electrical signal into waveform audio data, and the AFE may convert the waveform audio data into spectrogram data. In some implementations, the analog-to-digital converter may be a component of the AFE. In some implementations, the AFE may perform other processing on the audio data including echo cancelation, noise reductions, beamforming from multiple microphones, etc. As used herein, unless otherwise specified, "audio data" may refer to waveform audio data, spectrogram audio data, and/or tokenized audio data such as acoustic tokens or higher-fidelity audio tokens.

The acoustic model 130 may receive the input audio data 101 in spectrogram form (e.g., as produced by the AFE as described above). The input audio data 101 may include a command and/or request spoken by a user. In some cases, the input audio data 101 may include additional audio data to be processed by the acoustic model 130. The acoustic model 130 may encode the audio data into a tokenized acoustic representation such as acoustic embeddings 311. In some implementations, the acoustic model 130 may be trained to encode the audio data into acoustic embeddings 311 in a manner that emphasizes characteristics of the audio data that relate to content (e.g., by jointly training the acoustic model 130 with a content encoder configured to tokenize a text input into a semantic space). The acoustic embeddings 311 may therefore represent points in an acoustic space, a semantic space, or a joint acoustic-semantic space. In some implementations, the acoustic model 130 may be trained end-to-end with the LM 160 such that the acoustic model 130 and LM 160 learn a shared token space. In some implementations, the content token space may represent a vocabulary shared by the acoustic model 130 and LM 160.

In some implementations, the acoustic model 130 may include a quantizer. The quantizer may process encoded acoustic data and generate acoustic embeddings 311 in the form of speech tokens. The encoded audio data may be continuous or discrete data that represents speech in the input audio data 101 and/or other input data. The quantizer may the quantize the continuous or discrete data into a finite set of discrete, representative vectors (e.g., centroids). The representative vectors may make up the speech tokens. Quantizing the speech representations into speech tokens in this manner may reduce the computing resources required by the LM 160 and/or other models of the system 100 when processing speech. In some implementations, the quantizer may be configured and/or trained in a manner similar to a vector quantized variational autoencoder (VQ-VAE). In various implementations, a speech token may correspond to a portion of audio; for example, 1, 2, 4, 8, 16 frames of audio data, etc. (e.g., where each frame of audio data corresponds to approximately 40 ms of audio; however, a spectrogram may represent a frame of audio having a longer or shorter duration). In various implementations, a speech token may be an integer having a value between zero and 2,047, 4,095, 16,383, 32,767, etc. Hyperparameters such as these may be selected to achieve a desired balance between speed, computing resources, and accuracy of the reconstruction. The speech token data learned through these training operations may represent the vocabulary of content and pronunciation that the LM 160 may model.

The first-pass component 145 may include a classifier 340. The classifier 340 may include software and/or hardware configured to assign an acoustic token (or sequence of consecutive acoustic tokens) corresponds to a particular class (e.g., speech, non-speech, etc.). In some implementations, the classifier 340 may include a voice-activity detector (VAD). A VAD may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In some implementations, the classifier 340 may implement a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. In some implementations, the classifier 340 may include one or more neural networks such as a CNN and/or RNN. The recurrent neural network may include, for example, one or more long short-term memory (LSTM) blocks, gated recurrent units (GRUs), transformer blocks, etc.

The classifier 340 may be a multi-class classifier that can process acoustic tokens output by the acoustic model 130 and determine whether a token or sequence of consecutive tokens represents speech or an absence of speech. The classifier 340 may output classification data 321 indicating whether a particular acoustic embedding 311 likely represents speech, an absence of speech, silence, an acoustic event, etc. Additionally or alternatively, the classifier 340 may modify the acoustic embeddings 311 by inserting a token indicating, for example, a potential end of user speech, opportunity for system backchanneling, etc. The classifier 340 may predict a potential opportunity for backchanneling by the system 100 (e.g., recognize a point in user speech where a system-generated interjection may be appropriate). The classifier 340 may predict a potential endpoint (e.g., where it may be appropriate for the system 100 to present a substantive response). Determining an end of speech may be referred to as "speech endpointing." Endpointing may involve waiting for a period of time after the user has finished speaking and/or processing speech received to determine whether such speech likely represents a complete utterance (e.g., includes information sufficient to identify and execute a requested operation) or whether the user has paused mid-sentence (e.g., to think of the right word, due to an interruption, or otherwise) with intent to resume speaking. In some implementations, an endpoint prediction may be made by the classifier 340 based on the acoustic embeddings 311 and a final endpoint decision may be made the LM 160 based on the content of the speech. In some cases, the endpoint decision may lead to other actions by the system such as turning off a microphone, changing an indicator (e.g., a light), executing a command, outputting a response, entering a sleep mode, etc. The classifier 340 may insert a token into the acoustic embeddings 311 that indicates the potential opportunity for backchanneling and/or endpoint. In some implementations, the classifier 340 may insert a generic event token (e.g., "<E>") to the acoustic embeddings 311 to indicate a potential opportunity. In some implementations, the classifier 340 may insert a specific token indicating the type of event it has predicted; for example, a <BC> token indicating a potential for backchanneling or a <EUS> token indicating a potential end of user speech. If the classifier 340 has not predicted a potential event, but the first-pass component 145 has determined (e.g., with the segmenting logic described below) to send a segment 326 to the LM 160 anyway, the classifier 340 and/or the segmenting logic 350 may terminate the segment 326 with an <EOS> token indicating an end of segment. The LM 160 may process the acoustic embeddings 311 and make a final determination regarding whether to generate backchannel speech 195*b* or take a turn, or neither. Likewise, when the LM 160 generates output speech, whether backchannel speech or otherwise, it may indicate the corresponding LM output data 165 as such using tokens such as <SBC> for start of backchannel and <EBC> for end of backchannel. Such tokens may indicate to an LM orchestrator 135, described below, to output the system-generated backchannel speech.

The first-pass component 145 may include segmenting logic 350 that may determine when to send a segment 326 of acoustic embeddings 311 to the LM 160 for processing. In some implementations, the LM 160 may be configured for portion-wise processing of inputs. This may allow the LM 160 several advantages. For example, the LM 160 may determine an endpoint of input speech more accurately than the first-pass component 145. In another example, the LM 160 may determine an opportunity for backchanneling, and render backchannel speech 195*b* prior to the user's end-of-speech. The segmenting logic 350 may buffer acoustic embeddings 311 and, when one or more conditions are satisfied, publish a segment 326 of the acoustic embeddings 311 to the LM 160 for processing. At runtime/inference, each segment 326 (e.g., representing a series of frames of audio data) may be shuttled to the LM 160 and added to the LM input data 155 (e.g., which may also contain previously predicted LM output data 165). The LM 160 may decode the transcript represented in the segment 326. The LM 160 may predict words or word pieces iteratively until reaching an end-of-segment token representing the end of the segment 326. At this point, a decoding algorithm of the LM 160 may halt prediction until the LM 160 receives the next segment 326. Portion-wise processing may be used to improve the latency of certain operations of the LM 160 when processing data received over a period of time that is relatively long compared to the processing time of the LM 160 such as speech received over several seconds.

In various implementations, the segments 326 may vary in size from a few frames (e.g., where a frame of audio data represents 10, 20, 30, or 40 ms, etc. of audio) to a few seconds. The LM 160 may be trained using an aligned dataset in which the beginnings and endings of words are precisely labeled. The labels may allow the training to correlate a segment with the word(s) it represents. The training may teach the LM 160 to predict the end of a segment 326. The end-of-segment prediction may be used to request the next segment 326. For example, in a speech-to-speech implementation, the end-of-segment prediction may be sent to the segmenting logic 350 to request the next segment 326 corresponding to a new segment of the input audio data 101. The LM 160 may be trained using segments of random length. This may allow the system 100 to be post-configured for whatever segment size is appropriate for the given task. For example, larger segment sizes may improve accuracy while smaller segment sizes may reduce latency.

The conditions for publishing a segment 326 may be stored in a policy data storage component 315. The conditions may include, for example, a maximum size for a segment 326. Thus, if the segmenting logic 350 has buffered a number of acoustic embeddings 311 corresponding to the maximum segment size, the segmenting logic 350 may combine the embeddings 311 into a segment 326, and publish the segment 326 for processing by the LM 160. The conditions may include a threshold value for a potential opportunity for backchanneling. The classifier 340 may indicate a potential opportunity for backchanneling with a score representing a likelihood that a point in time (e.g., relative to the input audio data 101 or acoustic embedding 311 representation) represents an appropriate opportunity for the system 100 to interject backchannel speech. If the score exceeds the threshold, the segmenting logic 350 may publish a segment 326 with the buffered acoustic embeddings 311 leading up to the predicted opportunity. The conditions may include a threshold value for potential turn taking. Similar to the condition related to backchanneling, the segmenting logic 350 may publish a segment 326 if a score associated with the turn-taking opportunity exceeds this threshold.

In some implementations, the policy data storage component 315 may include conditions related to particular tasks; for example, a first maximum size may be used for low-latency tasks such as speech recognition for real-time close captioning, a second maximum size larger than the first may be used for natural language command processing and/or chatbot applications, and a third maximum size larger than the second maximum size may be used for machine translation tasks where more lookahead information may increase the accuracy of the translation. In some cases, the segmenting logic 350 may determine an appropriate segment size automatically based on the task (which may, in some cases, include processing some amount of input speech or text to identify the task to be performed). In some cases, the segmenting logic 350 may determine an appropriate segment size depending on the modality(ies) involved; for example, depending on whether the modality is speech-to-text, text-to-speech, or speech-to-speech. In some cases, the segmenting logic 350 may select an appropriate segment size based on characteristics of the input (e.g., based on the number of speakers, the volume of the speaker(s) and/or background noise, whether a speaker is whispering, etc.). In some cases, the segment size may be specified by the user; for example, for the particular task or as a global preference setting. In some cases, the segmenting logic 350 may determine segment size based on a combination of some or all of the above factors. In any case, the segmenting logic 350 may generate a segment 326 and return it to the LM 160 prior to an end of the input speech.

During inference, segment size may be selected by the user, preset for the requested task (e.g., as stored in the policy data storage component 315), and/or configured dynamically by the system based on context. The system 100 may use different segment sizes depending on the constraints for a given task. For example, performing ASR for real-time closed captioning of audio and/or video may benefit from low-latency transcription. Accordingly, the segment size may be set to a relatively short duration such as 0.5s to 2s. Thus, the system 100 may be able to generate subtitles for a movie or TV show such that the words appear on screen only a short time after being spoken or while being spoken (if audio data buffering is available).

A longer segment size may be appropriate in, for example, a machine translation implementation. Due to rules of grammar and/or common usage, the order of words in one language may be different from the order of words in another language. Accordingly, the segment size may be set to a relatively high duration such as 2s to 10s. This may give the LM 160 adequate "lookahead" information for processing the input and generating an output in which words and/or phrases appear in different positions within the output sequence relative to the positions of corresponding words and/or phrases in the input sequence.

Intermediate segment sizes may be appropriate in, for example, natural language command processing and/or chatbot applications. When the system 100 is acting as a virtual assistant or conversational agent, segment size may be configured to balance accuracy and latency. Accordingly, the segment size may be set to a relatively moderate duration such as 1s to 3s. This may allow the system to effectively extract meaning from the input while keeping latency acceptable for generating replies in a conversational context and/or performing commands for the user without excessive delay.

In some uses cases, the system may dynamically change segment sizes to process different segment of an input and/or successive inputs from a multi-turn interaction. For example, the system 100 may default to an intermediate segment length suitable for natural language processing. A user may speak to a device of the system and request a task for which a different segment size may be better suited. For example, the user may say, "Alexa, please provide live transcription of the following speech." The system 100 may process this segment of the input using the intermediate segment size and then switch to a smaller segment size to reduce the user-perceived latency associated with the live transcription. In another example, the user may say, "Alexa, please translate the following speech into English." The system may again begin with the default segment size before switching to a larger segment size that may provide a more accurate translation.

To enable portion-wise processing of segments 326 representing less than a complete user utterance, the LM 160 may be trained to include in its vocabulary one or more types of separator tokens (e.g., representing an end-of-segment and/or separations between tokens of different modalities). In addition, the LM 160 may be trained to predict the end of a portion. The LM 160 may operate in an autoregressive manner in which it receives LM input data 155 predicts LM output data 165, where the LM 160 predicts each successive token of the LM output data 165 using the LM input data 155 and previously predicted tokens of the LM output data 165. The LM 160 may be trained to determine when it has generated of the LM output data 165 representing all tokens of the current segment 326. The end-of-segment token may serve as (and/or trigger) a request for the next segment 326 from the segmenting logic 350.

In implementations where the LM 160 processes a stream of input data in a portion-wise manner, the LM 160 may use a separator token as an indication of an end-of-segment, either as received from the acoustic model 130 or predicted by the LM 160. In some cases, the <M> or <O> token may serve to indicate to the LM 160 that the tokens that follow correspond to the next segment of input. If the LM 160 outputs an end-of-segment token, that may trigger the segmenting logic 350 to send the next segment 326 for processing. A separator token at the end of that segment 326 may indicate to the LM 160 to begin predicting LM output data 165 corresponding to that segment 326, and so on.

The components of the first-pass component 145 may operate similarly when the system 100 is in the speaking mode 162. In the speaking mode 162, the acoustic model 130 may generate acoustic embeddings 311 representing input audio data 101. The classifier 340 or analogous component may process the acoustic embeddings 311 to determine whether they represent speech. The classifier 340 may determine class data 321 indicating whether a particular acoustic embedding 311 corresponds to speech, non-speech, or some other category (e.g., noise, silence, an acoustic event, etc.). If the classifier 340 and/or the segmenting logic 350 detects speech in a threshold number of acoustic embeddings 311—for example, either consecutively or within a time window—the classifier 340 may determine that the acoustic embeddings 311 represent potential user backchannel speech or barge-in. The first-pass component 145 may buffer the acoustic embeddings 311 and, in response to determining that the acoustic embeddings 311 represent a potential backchannel or barge-in, the first-pass component 145 may send a segment 326 to the LM 160 for processing. In some implementations, the classifier 340 may insert a generic event token (e.g., "<E>") to the acoustic embeddings 311 to indicate the potential event to the LM 160. In some implementations, the classifier 340 may insert a specific token indicating the type of event it has predicted; for example, a <UBC> token indicating potential user backchanneling or a <BI> token indicating a potential barge-in.

The backchannel or barge-in token may trigger the LM 160 to switch from the speaking mode 162 to the dual mode 164. The LM 160 may process the segment 326 and confirm that the speech represented a backchannel, in which case the LM 160 may return to the speaking mode 162 and continue rendering the current output, or that the segment 326 represents a barge-in, in which case the LM 160 may switch to the listening mode 166 and halt generation, rendering, and or presentation of the current output. In some cases, the LM 160 may determine that the segment 326 represents neither backchanneling nor a barge-in, and thus return to the speaking mode 162.

The system 100 may include an LM orchestrator 135. The LM orchestrator 135 may include components for receiving segments 326, generating prompts (e.g., LM input data 155) for processing by the LM 160, and routing LM output data 165 to various downstream processes 388*a*, 388*b*, 388*c*, etc. (collectively "downstream processes 388") such as a delegate LM 360 as shown in FIG. 2A and/or the other external resources shown in FIG. 7A. In some implementations, the segmenting logic 350 may be component of the LM orchestrator 135 in addition to or alternatively to being a component of the first-pass component 145. In some implementations, the LM orchestrator 135 may receive input audio data (e.g., such as the input audio data 101) and route it to the appropriate encoder (e.g., the acoustic model 130) for conversions into tokens for processing by the LM 160. Operation of the LM orchestrator 135 is described in further detail below with reference to FIGS. 5 and 6.

When the LM 160 renders an output (e.g., LM output data 165 representing synthesized speech), the LM orchestrator 135 may receive the output and send it to the rendering model 185 for rendering as output speech. The LM 160 may render the synthesized speech as acoustic embeddings 331, which may be the same as or similar to the acoustic embeddings 311 generated by the acoustic model 130. The LM orchestrator 135 may identify a responsive output in the LM output data 165, and route it to the rendering model 185 for conversion to output audio data 351.

In some implementations, the rendering model 185 may include an upsampler 370 and/or a vocoder 380. The upsampler may upsample the relatively coarse acoustic embeddings 331 (e.g., speech tokens) into a higher-fidelity representation (e.g., frame-level spectrogram data 341) suitable for conversion, by a vocoder 380, to output audio data 351 that may be presented to the user 5. In some cases, the upsampler 370 may apply certain voice characteristics to the speech based on speaker embedding data (e.g., representing a target speaker's voice such as the voice corresponding to a virtual assistant) retrieved from a voice data storage component 375. The speaker profile information may include an embedding generated by an audio encoder, such as a neural network encoder, trained to identify different speakers (e.g., by using contrastive learning to extract unique voice characteristics from speech samples corresponding to different speakers). In some implementations, the upsampler may include a neural network configured to upsample the relatively "coarse" acoustic embeddings 331 (e.g., as output by the acoustic model 130 and/or LM 160) into higher-fidelity audio tokens and/or frame-level spectrogram data 341, which may be used for high-quality audio rendering. In some implementations, the upsampler 370 may additionally use the content tokens (e.g., representing text and/or semantic meaning) generated by the LM 160 to produce the output speech.

The vocoder 380 may convert the upsampled audio data to waveform audio data (e.g., the output audio data 351). The system 100 may send the output audio data 351 to a user device 110 for output to a user.

Figure 3C:
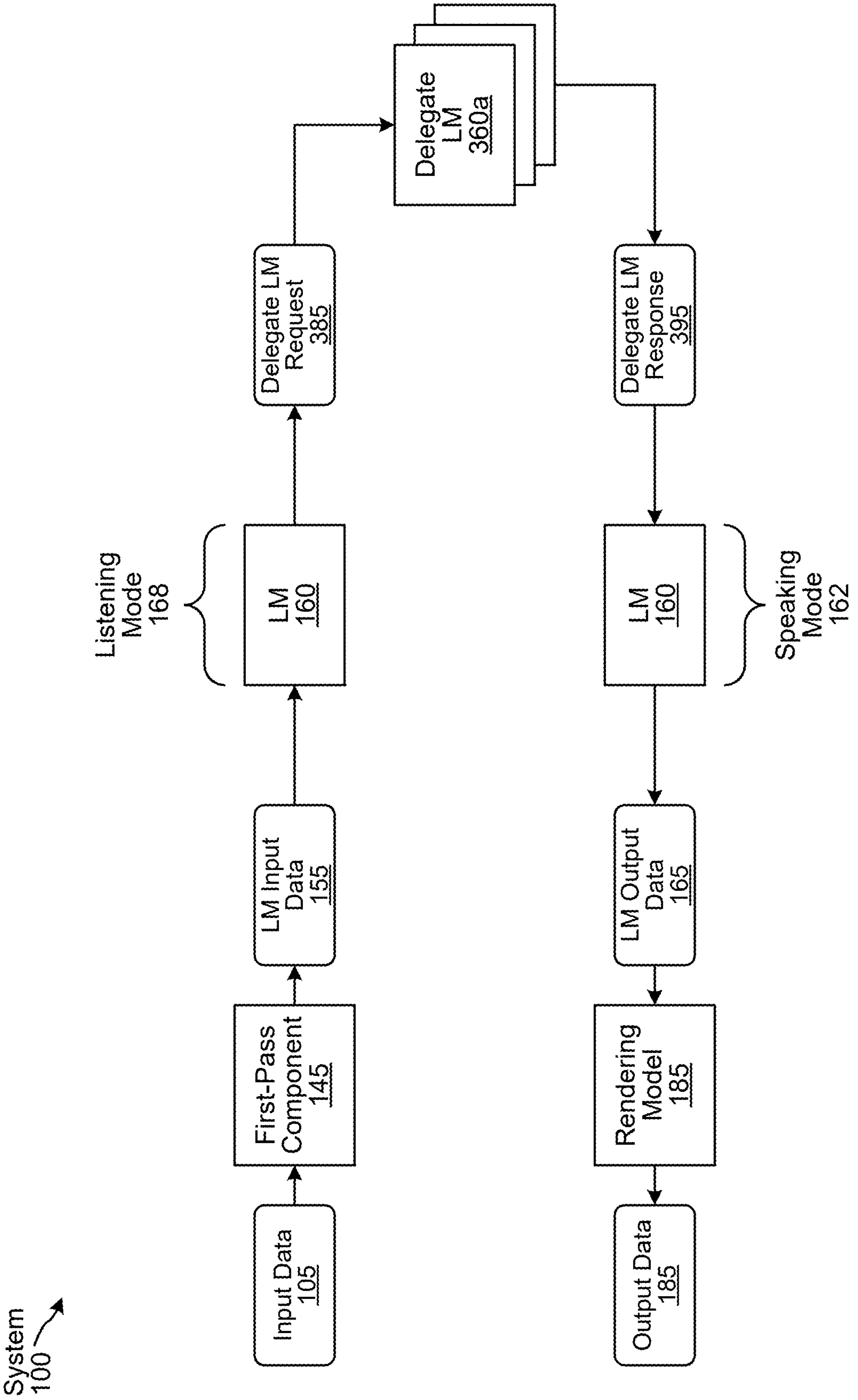
FIG. 3C is a conceptual diagram illustrating use of the system as a speech-to-speech interface for an external resource such as a delegate language model, according to embodiments of the present disclosure.
Figure 7A:
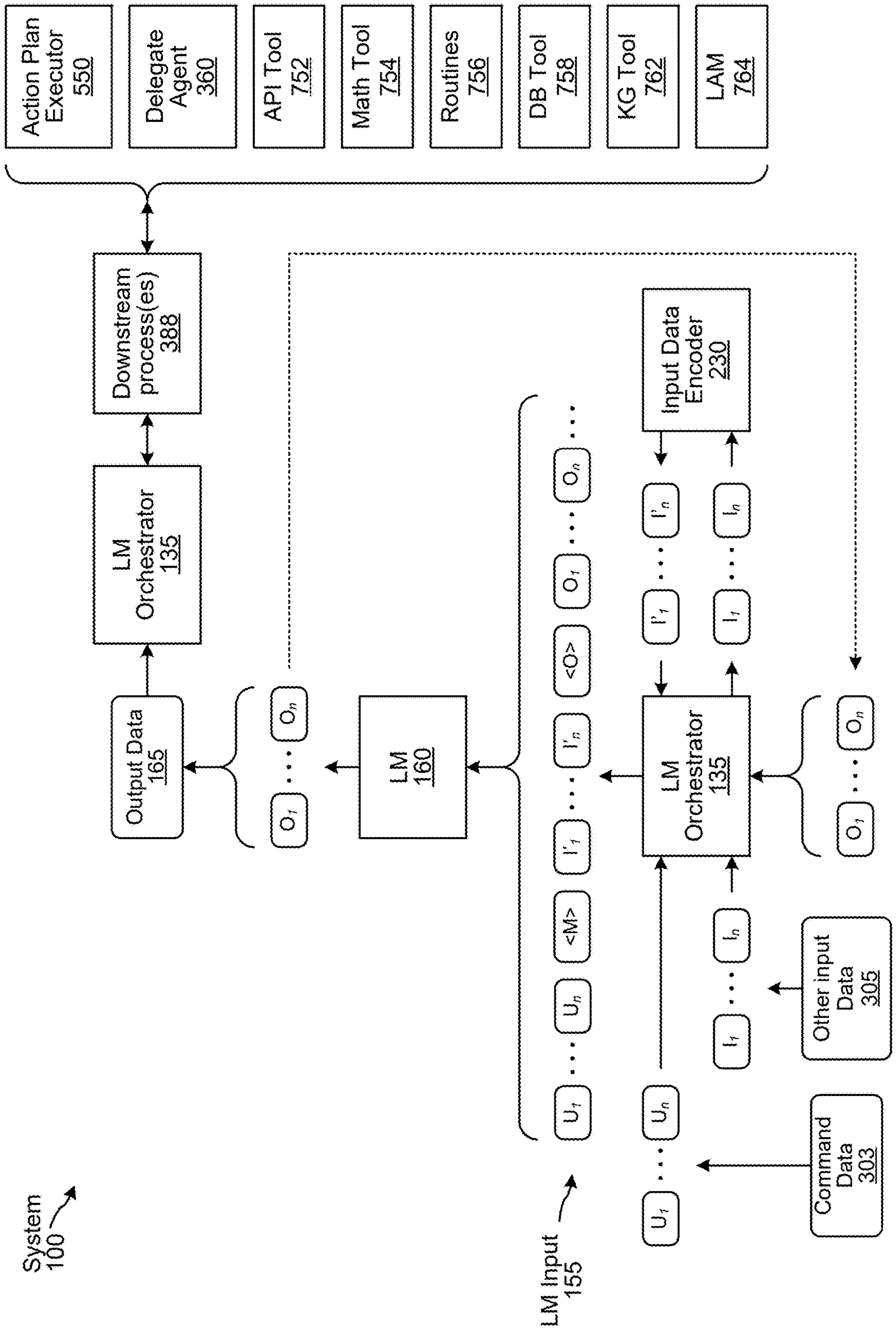
FIG. 7A illustrates example operations of prompt generation in an LM system, according to embodiments of the present disclosure.

FIG. 3C is a conceptual diagram illustrating use of the system 100 as a speech-to-speech interface for an external resource such as a delegate LM 360, according to embodiments of the present disclosure. In some implementations, the system 100 may be able to delegate requests to multiple delegate LMs 360*a*, 360*b*, 360*c*, etc. (collectively "delegate LMs 360"). Such a delegate LM 360 may be used to augment the capabilities of the system 100 by providing information and/or effecting actions that the LM 160 or other components of the system 100 do not have or cannot handle. In addition to the delegate LM(s) 360 shown in FIG. 3C, the LM 160 may also leverage other resources as shown in FIG. 7A and described below.

For example, the user 5 may invoke the LM 160 with a spoken request or command (e.g., input data 105). The LM 160 may process the corresponding LM input data 155 and determine to leverage a delegate LM 360 to obtain additional information and/or perform a requested action. The LM 160 may generate a delegate LM request 385 representing a request for information from and/or performance of an action by the delegate LM 360. The delegate LM 360 may generate a delegate LM response 395 responsive to the request, and return it to the LM 160. The LM 160 may use the delegate LM response 395 to generate a response to the user 5. The response may be in the form of synthesized speech. In some cases the LM 160 may leverage additional resources and/or perform additional processing; for example, using chain-of-though processing as described in further detail below with reference to FIG. 3D.

In some implementations, the LM 160 and delegate LM 360 may act as agents and communicate using messages that include a combination of structured and unstructured language. As used herein, the term "agent" refers a software component that encapsulates a function, has a text-in/text-out interface, and draws upon an LM. The concept of an agent does not have a predefined scope—an agent may be general purpose or may correspond to a niche specialty (e.g., configured to answer questions about a particular area of knowledge). For example, the LM 160 and delegate LM 360 may communicate using messages that include a combination of one or more predefined parameters and information (such as a question, answer, request, response, etc.) conveyed in natural language. In some cases, the LM 160 may receive and generate other modes of data such as speech audio. Cooperating agents may exchange messages that include a combination of structured and unstructured portions. For example, a message may contain certain parameters representing, for example, the requesting entity (e.g., user or agent), the nature of the message (e.g., whether an initial request, a request for more information, a response to previous message, etc.), and other parameters described herein. An unstructured portion of a message may include a natural language command, question, answer, request, response, etc. Thus, an agent may communicate with another agent using natural language similar to the way a human would communicate with an agent; for example, using natural language and without a need for a purpose-built API. This may promote the scalability of a system that includes many and/or frequently changing agents and resources.

The LM 160 and the delegate LM(s) 360 may correspond to different knowledge, capabilities, responsibilities, etc. In some cases, inter-agent cooperation may occur between a general-purpose agent (e.g., the LM 160) and multiple purpose-built or specialty agents (e.g., the delegate LMs 360. For example, the LM 160 may correspond to the Alex agent. A user may interact with Alexa for a variety of purposes corresponding to, for example, different domains of knowledge, different online systems (e.g., banking, shopping, apps, etc.), and/or different systems in the physical world (e.g., household robots, appliances, smart-home or smart-vehicle devices, smart speakers or televisions, etc.). In such cases, Alexa may act as a mediator agent. The mediator agent may receive a user command, identify a task, decompose the task into subtasks, delegate one or more of the subtasks to other resources (e.g., other agents or tools), observe the results, and generate a response to the user.

As used herein, when an agent delegates a task or subtask, the delegating agent may be referred to as a mediator agent and the delegee may be referred to as the delegate agent. These labels are used merely to indicate the role of a particular agent in a particular scenario. The roles need not be static or strictly defined and in fact may change from one user interaction to another and even during a single user interaction. For example, the user may invoke a first agent, who delegates the task to a second agent. In delegating the task, the first agent may retain control (e.g., such that it handles further communication with the user including providing a response) or relinquish control (e.g., such that the delegate agent handles further communications with the user). In some cases, the second agent may ask the first agent for information needed to perform the task; thus, the role of mediator and delegate may reverse for purposes of obtaining that information. In some implementations, one or more agents may be configured with a mechanism to prevent a delegation loop in which a first agent delegates to a second agent who delegates back to the first, and so on. Furthermore, in some cases, either the mediator or the delegate may be a non-LM-based computer system or software component. For example, a software module or component may generate a message to delegate a task to an agent.

Similarly, an agent may generate API calls (or other type of communication) to interact with a non-LM-based resource such as a database, knowledge graph, calculator, etc. An agent (either a mediator, delegate, or otherwise) may leverage various other tools to perform tasks and subtasks including, but not limited to, a large action model (LAM), robotic process automation (RPA), API tool, math tool, SQL tool, routines tool, etc., as described further herein.

In some cases, an agent may be configured to operate proactively. For example, a proactive agent may initiate an interaction with a user (and/or another resource) upon detection of a particular event. In some cases, such a proactive agent may detect a trigger and notify the user and/or perform some predetermined/pre-requested action. In some cases, the proactive agent may automatically scan for the occurrence of an event and/or presence of a condition periodically or occasionally, and act accordingly.

In some cases, the user may ask an agent to perform complex tasks (e.g., involving multiple steps). For example, the user may ask the agent to perform speaker-attributed speech recognition. The user may provide the agent with audio data representing a conversation between two or more speakers and audio data representing speech samples of the speaker(s). The agent may generate a transcript of the dialog with labels indicating who said what. In another example, the user may ask the agent a question, then ask the agent to identify one or more scholarly publications on the topic, and evaluate its previous answer against the substance of the publication(s). The user may ask the agent to perform automated tasks; that is, potentially without contemporaneous user control. The user may request the agent to perform one or more actions at a specified future time and/or in response to a triggering event. For example, the user may ask the agent to watch for an item to go on sale, and purchase a particular quantity if a threshold discount is reached. The user may ask the agent may interact with a voice user interface (VUI) on the user's behalf. The agent may generate synthesized speech for input to the VUI and/or may transcribe speech outputs of the VUI. For example, the user could ask the LAM to navigate an automated telephone system. The LAM may allow an individual who is hearing impaired to interact with the VUI using text.

Although LMs include combinations of computer models and computer software, some LMs 160 have the capability to perform processing analogous to reflection and reasoning. For example, reflection involves asking the LM 160 to evaluate its own output or the output of another LM (e.g., a delegate LM 360). This may improve the quality of the output of the LM 160 if the LM 160 identifies weaknesses or errors its previous answer. Reasoning involves prompting the LM 160 being to consider what to do in response to a question or command. The LM 160 may perform such reasoning to determine whether and how to act to handle an input, whether by leveraging an external agent or tool, taking some other action, or generating a user response immediately. This may break the overall task down into subtasks that the LM 160 can perform (or cause to be performed by leveraging resources) sequentially. A framework for prompting an LM to decompose a task into a sequence of subtasks is chain-of-though prompting. A framework for prompting an LM to identify resources to leverage to perform subtasks is the ReAct framework (a portmanteau of "reason" and "act"). A ReAct prompt may instruct an LM to analyze an input to identify a question, and step through the process of generating an answer. An example ReAct prompt may have the following structure:

Answer the following questions as best you can. You have access to the following tools:

Calculator: Useful for when you need to answer questions about math.

Stock DB: Useful for when you need to answer questions about stocks and their prices.

Use the following format:

Question: the input question you must answer

Thought: you should always think about what to do

Action: the action to take, should be one of [Calculator, Stock DB]

Action input: the input to the action

Observation: the result of the action . . .

. . . (this Thought/Action/Action Input/Observation can repeat N times)

Thought: I know the final answer

Final Answer: the final answer to the original input question

Begin!

The ReAct prompt may be followed by a question: "Question: what is two to the power of seventeen?" The LM may produce (e.g., in the form of tokens representing text) a "thought." The thought may be: "Thought: This is a simple mathematical calculation. I can use the Calculator to calculate this." The LM may produce an action: "Action: Calculator," and an input to that action: "Action Input: calculate 2^17."

In absence of providing the prompt prior to the question, the LM may begin generating tokens representing a response (e.g., "The answer to your question is . . . ") without engaging the Calculator, and thus generate a numerical answer that would likely be incorrect. The prompt, however, causes the LM to stop generating tokens and determine to delegate the calculation to the Calculator resource. When the Calculator returns the Observation (e.g., the numerical answer to the calculation: 331,072), the LM may be invoked again to complete generating the response using the number returned by the Calculator. The user may receive the response as an output of the computer system (e.g., text on a display and/or speech output by a loudspeaker). If the question originated from another agent, the LM may generate a message to send to the other agent.

In some cases, the task may include repeating reasoning and action steps, as indicated in the example prompt above. In some cases, the agent may determine that it needs more information to answer the question. In another example, the prompt above may be followed by a question: "What was the average stock price over the past week, month, and quarter?" The LM 160 may produce a "thought." The thought may be: "Thought: This is a mathematical calculation based on a time-series of stock prices. I can retrieve the stock prices from Stock DB. To retrieve the stock prices, I need to know the company name." The LM 160 may produce an action: "Action: Ask User for the company name." Upon receiving an answer from the user, the agent may prompt the LM 160 again with the company name. The LM 160 may produce an action leveraging Stock DB for the stock prices. As in the previous example, the LM 160 may produce an action leveraging Calculator to determine the requested averages, and generate a response to the user with the result.

The prompt above may be expanded by giving the agent further information about the resources available to it and how to use them. For example, in a dynamic multi-agent environment, new agents and/or resources may come online. In addition, existing agents and/or resources may undergo updates that expand their capabilities. Thus, in some cases, the prompt may include a listing of available resources and their respective capabilities. In some cases, the prompt may include instructions for how an agent can obtain a current listing of available resources/capabilities. In some cases, the prompt may include instructions for how to discover new resources and how to communicate with a new resource to obtain its capabilities.

The prompt may be expanded to specify schema for incoming and outgoing messages. For example, the prompt may inform an agent that an incoming message may include a parameter indicating whether the message originated from a user or another agent. The prompt may instruct the agent how to format outgoing messages. The outgoing message may include a parameter indicating the sending and/or receiving agent. If the message delegates a task, the message may include a parameter indicating whether the delegating agent wishes to retain or relinquish control of the interaction. If the message is in response to receiving a delegated task, the message may include a parameter indicating that the delegate is responding with a direct answer, by delegating to a different agent, requesting more information, unable to answer, etc. Further message schema may be provided for additional message types, such as responding to a response received from a delegate (e.g., to accept/reject the response, obtain more information from the delegate, etc.). In each case, a message may include one or more natural language portions that convey information. Thus, the prompt may include instructions for how the natural language portion(s) should be phrased (e.g., "thought": "<explain your reasoning>", "answer": "<your answer>").

Although in various example operations described herein an agent may be described as "mediator" or "delegate," such labels are used merely to indicate the role of a particular agent in a particular scenario. The roles need not be static or strictly defined, and in fact may change from one user interaction to another and even during a single user interaction. Furthermore, when an agent acts as a mediator, it may delegate a task or subtask to a non-LM resource (e.g., an API, tool, service, etc.). Similarly, when an agent acts as a delegate, it may receive a delegated task or subtask from a non-LM actor (e.g., a computer and/or software component).

Figure 3D:
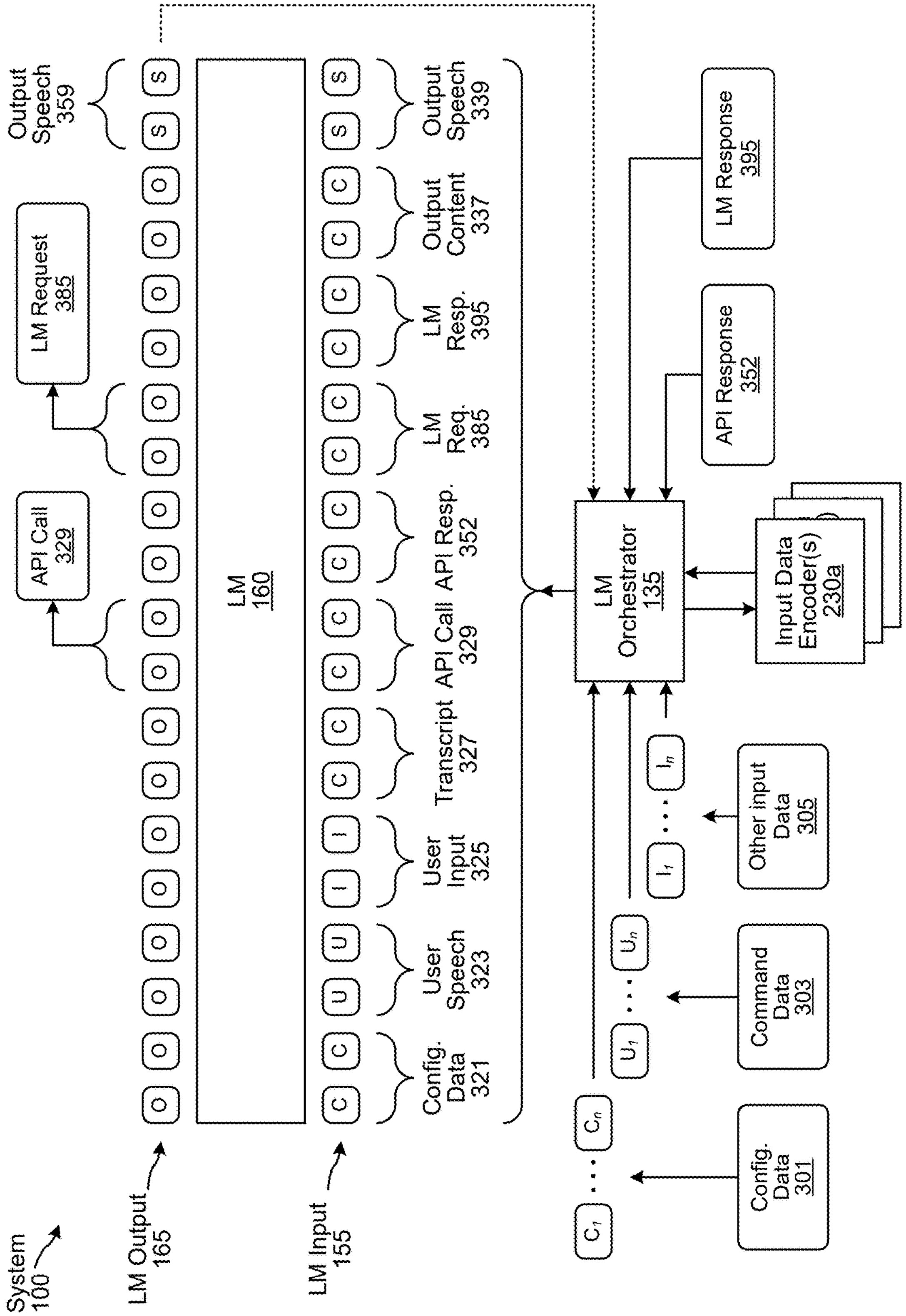
FIG. 3D is a conceptual diagram illustrating example operations of an LM orchestrator of the system, according to embodiments of the present disclosure.

FIG. 3D is a conceptual diagram illustrating example operations of the LM 160 and LM orchestrator 135 of the system 100, according to embodiments of the present disclosure. The system 100 may also include one or more input data encoders 230*a*, 230*b*, 230*c*, etc. (collectively "input data encoders 230"). Each input data encoder 230 may be configured to encode or "tokenize" a data of a particular modality into tokens to be processed by the LM 160.

The LM 160 may be a computer model such as a deep neural network. The LM 160 may be described by a set of parameters (e.g., weights determined during training) and hyperparameters (e.g., configured by one or more developers). The hyperparameters may describe an architecture of the model, a number of layers, a number of nodes in a layer, connections between nodes, activation functions of nodes, etc. The hyperparameters may include additional information about the architecture including skip connections, recurrent connections, normalization layers, pooling operations, softmax operations, etc. The model may include one or more components. The components may include, for example, smaller models within the larger acoustic model such as convolutional neural networks (CNNs), recurrent neural networks (RNNs), transformers, etc. The parameters may be determined via training using one or more training datasets.

In some implementations, the LM 160 may be a decoder-only transformer architecture. The LM 160 may be a multi-modal LM. A multi-modal LM is a model that can process data of different types; for example, audio data, video data, sensor data, content data, etc. An example of a multi-modal LM is a speech-to-speech multi-modal LM. A speech-to-speech LM may process audio data and/or content data (e.g., representing a transcript of speech) and generate audio data and/or content data. In various implementations, a speech-to-speech LM may be used to perform speech recognition (e.g., receiving speech audio and generating a text transcription), natural language understanding (e.g., semantic interpretation of the content), natural language command processing and/or output generation, speech synthesis (e.g., receiving a text transcription and generated speech audio), machine translation (e.g., receiving speech audio and/or text in a first language and generating speech audio and/or text in a second language), voice conversion (e.g., receiving speech audio having first voice characteristics and generating speech audio having different voice characteristics), etc. In other implementations, the LM 160 may additionally or alternatively process and generate other modes of data such image/video data, sensor data, API calls/responses, continuous or discrete control signals for actuating physical devices (e.g., servos, motors, lights, etc.), and the like. Multi-modal operation of the LM 160 is described in further detail below with reference to FIG. 4A.

The LM 160 may be based on an LM pretrained on content (e.g., text) only. The "vocabulary" of the LM may be expanded to account for tokens of other modalities including those discussed above. Token data corresponding to other modalities that are introduced to the LM may be viewed as tokens from a new language; for example, speech-to-text (e.g., speech recognition) and text-to-speech (e.g., speech synthesis) tasks become analogous to translation, such as between two different natural languages (e.g., English and French).

The input data encoders 230 can convert input data of different modalities into input tokens for processing by the LM 160. A first input data encoder 230*a* may be an acoustic model 130 as previously described.

The acoustic model 130 may receive audio data in spectrogram form. The audio data may include command data 303 spoken by a user. In some cases, the other input data 305 may include additional audio data to be processed by the acoustic model 130. The acoustic model 130 may encode the audio data into acoustic tokens into a tokenized acoustic representation. In some implementations, the acoustic model 130 may be trained to encode the audio data into acoustic token data in a manner that emphasizes characteristics of the audio data that relate to content (e.g., by jointly training the acoustic model 130 with a content encoder 230*b* configured to tokenize a text input into a semantic space as described below). The acoustic token data may therefore represent points in an acoustic space, a semantic space, or a joint acoustic-semantic space. In some implementations, the acoustic model 130 may be trained end-to-end with the LM 160 such that the acoustic model 130 and LM 160 learn a shared token space. In some implementations, the content token space may represent a vocabulary shared by the acoustic model 130 and LM 160.

A second input data encoder 230*b* may include a content encoder 230*b* such as a text tokenizer. The content encoder 230*b* may include software and/or hardware configured to convert input text data into text tokens for processing by the LM 160. In some implementations, the content encoder 230*b* may generate text token data representing the content and/or pronunciation of the input text data (e.g., words and/or phonemes, etc.). The content encoder 230*b* may include a machine learning component such as a neural network encoder and/or a quantizer. In some implementations, the content encoder 230*b* may be trained in concert with the LM 160 to generate content tokens and/or acoustic tokens. In an example implementation, the content encoder 230*b* may tokenize the input text data for example using byte-level, byte-pair encoding (BBPE) of 2051 tokens. This number may allow the content encoder 230*b* and/or LM 160 to be flexible for unseen characters and/or character combinations. The input text data may be encoded using an embedding layer to generate an embedding with a dimension D=1024. This embedding may be summed with a learnable positional embedding. A mask token may be used to mask parts of the input text data for training (e.g., to cause the LM 160 to predict and/or replace this portion of the input text data).

A third input data encoder may include a reference encoder 230*c*. The reference encoder 230*c* may generate a reference embedding used by the LM 160 to, for example, correlate target audio with a particular speaker's voice characteristics (e.g., for voice recognition. A reference embedding (e.g., as stored in the voice data storage component 375) may also be used by the LM 160 and/or rendering model 185 to generate output speech having certain voice characteristics. The reference encoder 230*c* may be a machine learning component such as a neural network. The reference encoder 230*c* may be configured to encode audio data (e.g., voice samples) into reference embedding data in a latent space that represents a range of various voice characteristics corresponding to different users (e.g., timbre, accent, etc.) In some implementations, the reference encoder 230*c* may be trained using, for example, contrastive learning such that the reference encoder 230*c* generates reference embeddings that are close (e.g., as measured using cosine similarity) for voice samples corresponding to a same speaker, but that are distant for voice samples corresponding different speakers. In some implementations, the reference encoder 230*c* (or a different input data encoder) may be configured to operate analogously to correlate an image with a particular user's facial characteristics (e.g., for face recognition), etc.

In some implementations, the reference encoder 230*c* may be a transformer neural network such as a vision transformer (ViT). A vision transformer may receive a sequence of vectors generated from fixed-size patches of an image and predict a classification. A position embedding may be added to the vectors, and a classification token may be added to the sequence to cause the reference encoder 230*c* to output a classification of the input data. Rather than processing images, however, the reference encoder 230*c* may process spectrogram data (e.g., Mel-spectrograms) representing frequency content of an audio waveform over time. In some implementations, the reference encoder 230*c* may be a component of the LM 160 or LM orchestrator 135; in other implementations, it may be a separate component.

The LM orchestrator 135 may be configured to receive the various input data, encode the input data using the appropriate input data encoder 230, and generate LM prompts for the LM 160. The LM prompt may be represented by the LM input data 155. Thus, the LM orchestrator 135 may act as (or include) a prompt generation component. The LM input data 155 will grow as the system 100 generates data by performing various subtasks of a complex task; e.g., using the LM 160 to perform inferences as well as delegating subtasks to other agents and other resources. The LM orchestrator 135 may begin an LM input data 155 with tokens representing instructions for how the LM 160 should operate, as represented by the configuration data 301. The configuration data 301 may include instructions for how to handle the command data 303, as well as information for use in performing those instructions. In some cases, the instructions may include a framework for chain-of-thought and/or ReAct processing as described previously. In some cases, the instructions may relate to delegation (e.g., either to or by the agent associated with the LM 160). In some cases, the information may relate to the identity and capabilities of other resources, as well as message formats to use when communicating with the other resources.

Thus, the LM orchestrator 135 may generate the LM input data 155 using the tokenized configuration data 321, the tokenized user speech 323 (e.g., representing the command data 303), and user input data 325 (e.g., representing any other input data 305 provided for handling the command data 303). The LM orchestrator 135 may cause the LM 160 to process the LM input data 155 to generate LM output data 165. The LM output data 165 may represent tokens predicted, inferred, and/or generated by the LM 160 processing of the LM input data 155. The LM 160 may generate LM output data 165 in stages as the LM orchestrator 135 operates the LM 160 through various subtasks of a complex task. The LM 160 may operate autoregressively such that it predicts a next token of the LM output data 165 based on the LM input data 155 and previously predicted tokens of the LM output data 165. As a first subtask, the LM orchestrator 135 may cause the LM 160 to generate a transcript 327 of the tokenized user speech 323. The LM 160 may process the transcript 327 and parse the task being asked of it by the user (e.g., as represented by the command data 303). Speech-to-text (e.g., ASR) operations of the system 100 are described in further detail below with reference to FIG. 7D.

In the example shown in FIG. 3C, the LM 160 may determine a first subtask to delegate to a resource corresponding to a particular API. The LM 160 may generate an API call 329 (e.g., using a format specified by the configuration data 301). The system 100 may send the API call 329 to the API endpoint. The resource may generate an API response 352, which the system 100 may send back to the agent. The LM orchestrator 135 may add the API call 329 and the API response 352 to the LM input data 155 for further processing by the LM 160.

The LM 160 may determine a second subtask to delegate another agent. The LM 160 may generate a delegate LM request 385 (e.g., using a format specified by the configuration data 301). The system 100 may send the delegate LM request 385 to the other agent. The other agent may process the delegate LM request 385 and return a delegate LM response 395. The delegate LM response 395 may also conform to a format specified by the configuration data 301; thus, the LM 160 may readily process the delegate LM response 395 even if it includes unstructured elements such as a natural language answer (and/or request for additional information). The LM orchestrator 135 may add the delegate LM request 385 and the delegate LM response 395 to the LM input data 155 for further processing by the LM 160.

The LM 160 may process the LM input data 155 including the API and LM responses and determine that it has the information it needs to generate a response to the command data 303. The LM 160 may therefore generate output content data 337, which may represent text of a responsive message to output to the user. The LM 160 may process the output content data 337 to generate output speech 359. The LM 160 may generate the output speech 359 autoregressively by processing previously predicted output speech tokens 339. When the LM 160 predicts and end-of-speech, the LM orchestrator 135 may route the output speech 359 to, for example, a rendering model 185 and/or vocoder 380 for conversion to audio data that may be output to the user (e.g., via a loudspeaker 812 of the user device 110). Text-to-speech and speech-to-speech operations of the system 100 are described in further detail below with reference to FIGS. 7C and 7D, respectively.

Figure 4A:
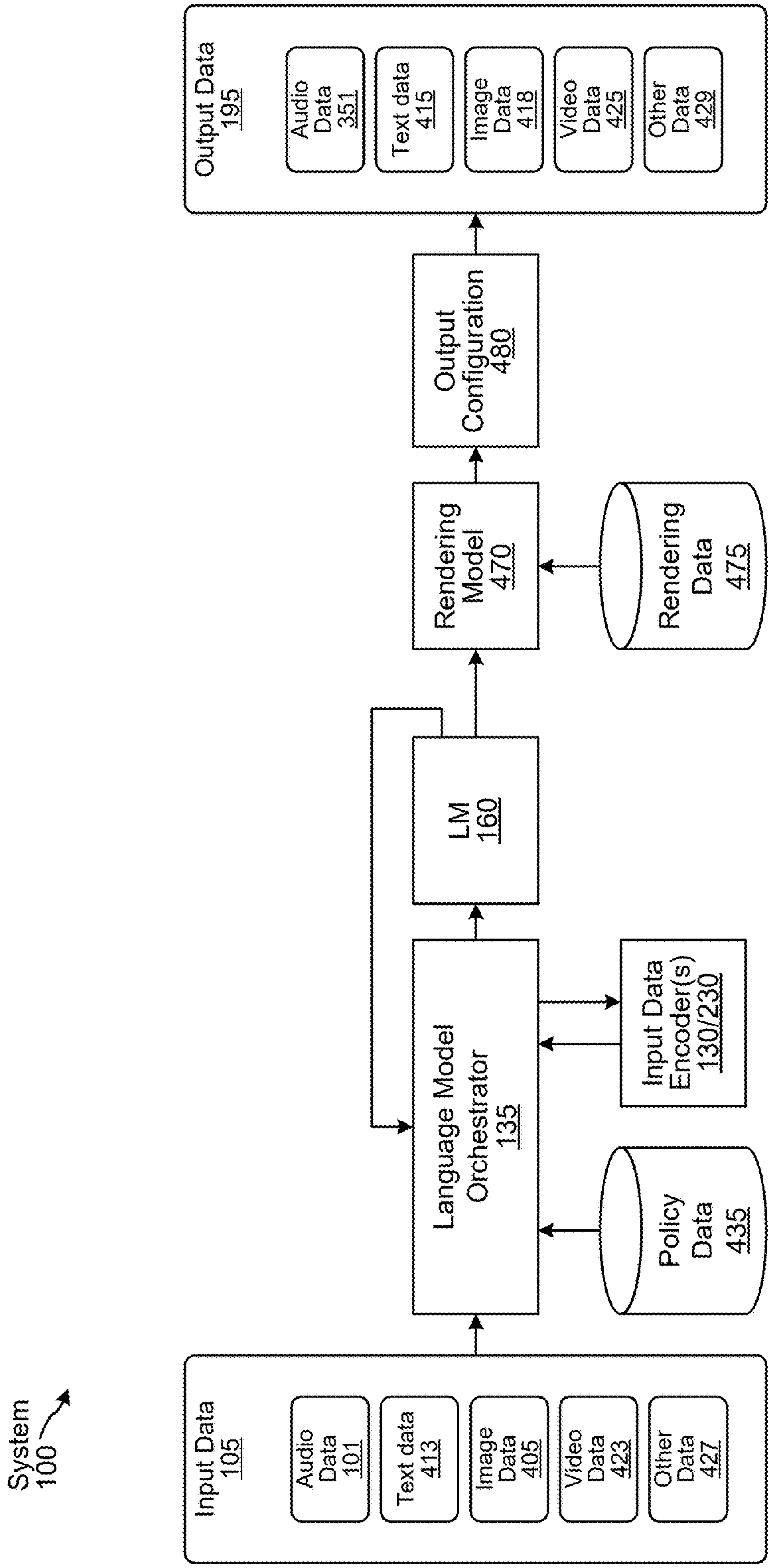
FIG. 4A is a conceptual diagram of the system performing multi-modal processing, according to embodiments of the present disclosure.

FIG. 4A is a conceptual diagram of the system 100 performing multi-modal processing, according to embodiments of the present disclosure. As shown in FIG. 4A, the system 100 may receive input data 105 (e.g., input data 105 and/or other input data 305). The input data 105 may include one or more types of multi-modal data. For example, input data 105 may include audio data 101, text data 413, image data 405, video data 423, and/or other data 427. The input data 105 may be processed by one or more input data encoders 230 (and/or the acoustic model 130), which may configure the data in a form usable by the downstream component(s). In some implementations, the LM orchestrator 135 may receive the input data 105 and determine whether and/or which portions of the input data 105 is to be encoded prior to inputting into the LM 160. In some implementations, the acoustic model 130 and/or input data encoder(s) 230 may execute on an upstream component (e.g., on a user device 110) to tokenize and/or encoder the input data 105 prior to receipt by the LM orchestrator 135. The one or more input data encoder(s) 230 may be configured depending on the type of input data 105 that is to be processed. For example, for input data 105 that includes audio data 101, the input data encoder 230 may be an acoustic model 130 such as that discussed above with reference to FIG. 3C. For input data 105 that includes image data 405, the input data encoder 230 may be a model configured to process image data into tokens representing image information, into feature data representing image characteristics, and/or into another form. For input data 105 that includes video data 423, the input data encoder 230 may include a model configured to process video data into tokens representing video information, into feature data representing video characteristics, and/or into another form. The input data encoder(s) 230 may take other forms as well, for example to process other data 427. The input data encoder(s) 230 may use information from policy data storage component 435 to coordinate processing in a manger that segments/chunks data into a form usable by the LM orchestrator 135. The LM orchestrator 135 may operate in a similar manner to that described above, only with multi-modal data instead of/in addition to audio data.

The LM 160 may process the multi-modal data to determine output data to pass to the rendering model 470. The output data sent from the LM 160 to the rendering model 470 may be text, audio, image, video, and/or other multi-modal data depending on system configuration. For example, the rendering model 470 may include an audio speaking model (such as the rendering model 185 discussed above), an image speaking model (such as a diffusion model or the like), a video speaking model, etc. The rendering model 470 may rely on data from a rendering data component 475 which may provide data to the rendering model 470 to assist in the rendering of data for eventual configuration and output. For example, the rendering data component 475 may indicate style, resolution, time, or other characteristics corresponding to an ultimate output. Data from the rendering model 470 may be sent to an output configuration component 480 which may configure output data 195 for ultimate output/presentation. For example, in the case of rendered audio data, the output configuration component 480 may include a vocoder 380. In the case of rendered image data, the output configuration component 480 may include an image configuration component, in the case of rendered video data, the output configuration component 480 may include a video configuration component, etc. The ultimate output data 195 may thus include output audio data 351, text data 415, image data 418, video data 425, and/or other data 429 depending on the system configuration and operation. The system 100 may thus use the multi-modal LM 160 of FIG. 4A to perform processing discussed herein (for example discussed with regards to FIGS. 7A through 7D, etc.) which may operate in the context of system 100, for example as described with regards to FIGS. 5 and 6.

Figure 4B:
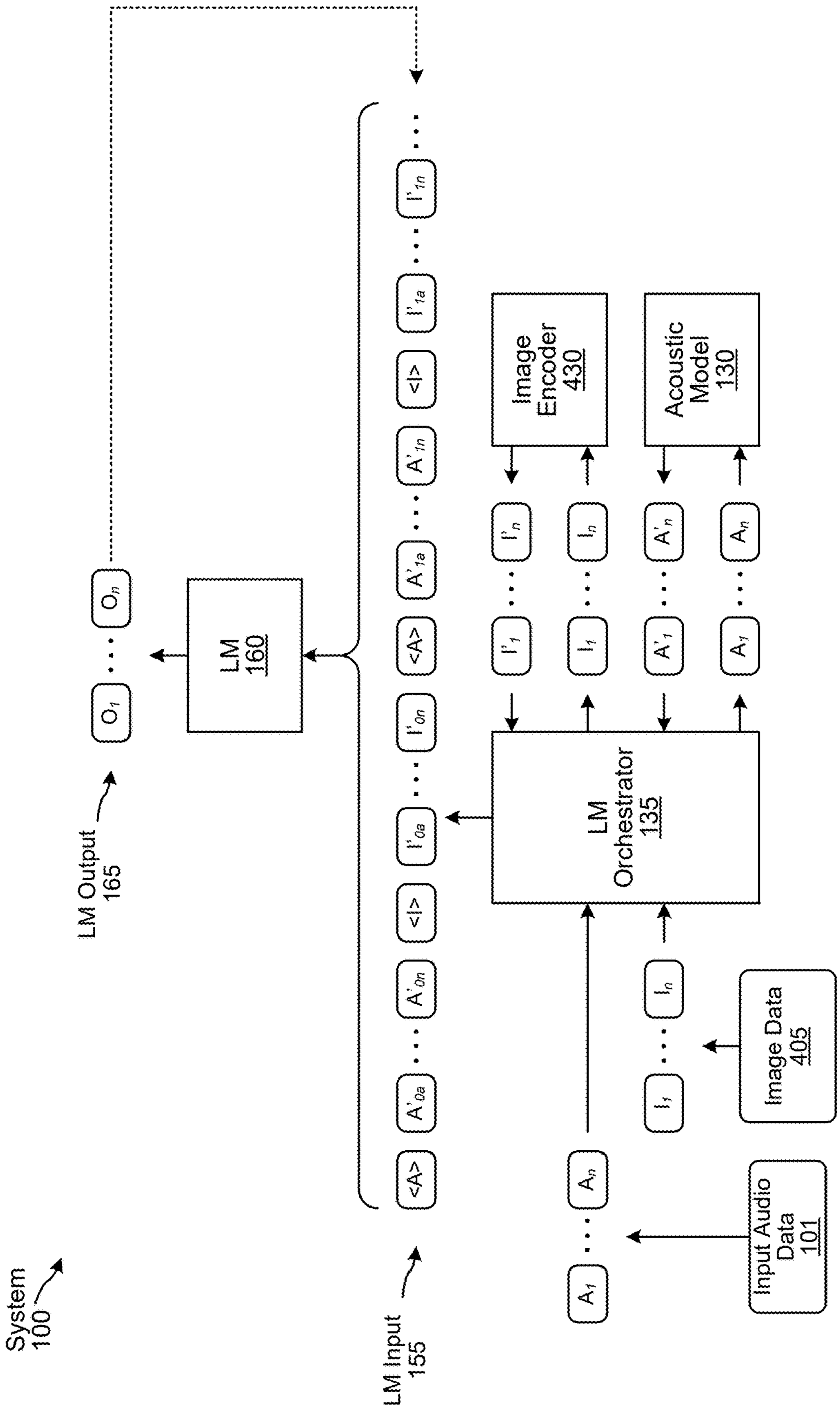
FIG. 4B is a conceptual diagram illustrating example operations of multi-modal processing by the system, according to embodiments of the present disclosure.

FIG. 4B is a conceptual diagram illustrating example operations of multi-modal processing by the system 100, according to embodiments of the present disclosure. The figure illustrates how the LM orchestrator 135 may interleave data of different modalities into an LM input data sequence for processing by the LM 160. In the example shown, the system 100 may receive input audio data 101 (e.g., frames of audio data $A_1$-$A_n$). The LM orchestrator 135 may determine to encode the frames of audio data using the acoustic model 130 to generate acoustic tokens $A'_1$-$A'_n$. The acoustic model 130 may be configured to encode information from the input audio data 101 most relevant to speech processing in token data that require less processing by the LM 160. In some implementations, however, the LM 160 may process the raw audio data (e.g., in waveform or spectrogram form).

The system may also receive image data 405 (e.g., as image frames $I_1$-$I_n$). The LM orchestrator 135 may determine to encode the image frames using an image encoder 430. Similar to the acoustic model 130, the image encoder 430 may be configured to encode information from the image data 405 relevant to speech processing. For example, the image encoder 430 may extract features of one or more faces recognized in the image data. The features may relate to recognizable features (e.g., for performing face recognition) and/or may relate to expression and/or movement of facial features. Example visual cues may include head nods, eyebrow position, lips moving, gaze direction, etc. Additional information may be extracted from facial expression; such as emotional state and/or reactions. The image encoder 430 may generate image tokens $I'_1$-$I'_n$. The image tokens may, in some cases, correspond to a same data rate as the acoustic tokens. That is, an image token and an acoustic token may correspond to a same duration of time (e.g., 30 ms, 500 ms, 1s, etc.). In some cases, the image tokens and acoustic tokens may correspond to different data rates.

The image encoder 430 may return the image tokens $I'_1$-$I'_n$ to the LM orchestrator 135. The LM orchestrator 135 may interleave the acoustic tokens $A'_1$-$A'_n$ and the image tokens $I'_1$-$I'_n$ such that acoustic data and image data corresponding to a same or adjacent portion of time are input to the LM 160 together. For example, the LM input data 155 shown in FIG. 4B includes a first portion of acoustic token data $A'_{0a}$-$A'_{0n}$ preceded by an <A> token, a first portion of image token data $I'_{0a}$-$I'_{0n}$ preceded by an <I> token, a second portion of acoustic token data $A'_{1a}$-$A'_{1n}$, a second portion of image token data $I'_{1a}$-$I'_{1n}$, and so on. In some implementations, the system 100 may be configured for portion-wise processing of the input data. The acoustic model 130 may thus provide acoustic tokens to the LM orchestrator 135 in chunks as described herein. The LM orchestrator 135 may align the chunks of acoustic tokens with image tokens that correspond in time. In some implementations, the LM orchestrator 135 may interleave the acoustic tokens and image tokens at a predetermined rate; for example, interleaving tokens one by one, two by two, three by three, etc. In some implementations, the interleaving may be asymmetric; for example, by interleaving one acoustic tokens followed by two or more image tokens, two acoustic tokens followed by one or more image tokens, etc. In any case, the LM orchestrator 135 may determine the LM input data 155 such that tokens corresponding to a same or close point in time are adjacent or close to each other in sequence.

The LM 160 may process and/or generate data having other modalities including, but not limited to, the modalities discussed above with reference to FIG. 4A.

The LM 160 may process the LM input data 155 and generate LM output data 165 (e.g., tokens $O_1$-$O_n$). The LM output data 165 may correspond to a single modality or multiple modalities. In various use cases, the output modality(ies) may be different from the input modality(ies). In some operations, the LM 160 may operate autoregressively by adding output tokens from the LM output data 165 to the LM input data 155 for generating subsequent output tokens.

FIG. 5 is a conceptual diagram illustrating components of a natural language processing system 500, according to embodiments of the present disclosure. The natural language processing system 500 may employ various technologies such as the LM 160 and other models described above to perform ASR, NLU, NLG, TTS, and/or language modeling to function as a virtual assistant system. In some implementations, the LM 160 may be a multi-modal LM as illustrated in FIG. 4A. A user 5 may interact with the virtual assistant system using, for example, voice commands and/or natural language text inputs. The virtual assistant system may respond to user 5 commands using, for example, synthesized speech, natural language text on a display, and/or performing various actions for and/or on behalf of the user 5. For example, the user 5 may ask the natural language processing system 500, and the natural language processing system 500 may use the various natural language and speech processing technologies to process the question, determine response data (e.g., an answer), and output the response data (e.g., as synthesized speech and/or text). For example, the user device 110 may receive a user input in the form of audio data 101 and/or text data 413. The system 500 may process it to determine a response, which the user device 110 may output in the form of output audio 512 and/or text/images on a display 816. In some implementations, the system 500 may process the user input using an LM natural language processing pipeline to generate responsive output data 195 based on input data 105 as described in further detail below with reference to FIG. 6.

Various components of the natural language processing system 500 are shown in FIG. 5. The various components may be located on same or different physical devices. Communication between various components may occur directly or across a network(s) 199. The user device 110 may include audio capture component(s), such as a microphone 820 or array of microphones of a user device 110, captures audio 510 and creates corresponding audio data 101. Once speech is detected in audio data representing the audio 510, the user device 110 may determine if the speech is directed at the user device 110/system component(s) 120. In at least some embodiments, such determination may be made using a wakeword detection component 520. The wakeword detection component 520 may be configured to detect various wakewords. In at least some examples, each wakeword may correspond to a name of a different digital assistant and/or agent. One example wakeword/agent name is "Alexa." Another example wakeword/agent name is "Robot." In another example, input to the system may be in form of text data 413, for example as a result of a user typing an input into a user interface of user device 110. Other input forms may include indication that the user has pressed a physical or virtual button on user device 110, the user has made a gesture, etc. The user device 110 may also capture images using camera(s) of the user device 110 and may send image data 405 representing those image(s) to the system component(s). The image data 405 may include raw image data or image data processed by the user device 110 before sending to the system component(s). The image data 405 may be used in various manners by different components of the system to perform operations such as determining whether a user is directing an utterance to the system, interpreting a user command, responding to a user command, etc. In some implementations, the system 500 may receive and/or generate personalized context data 567, which may be used to process a user input, generate a response thereto, and/or to perform a corresponding action. The command data 303 and/or the other input data 305 may include and/or be determined from one or more of audio data 101, text data 413, image data 405, and/or personalized context data 567.

The wakeword detection component 520 of the user device 110 may process the audio data, representing the audio 510, to determine whether speech is represented therein. The user device 110 may use various techniques to determine whether the audio data includes speech. In some examples, the user device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110 may implement a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 510, is analyzed to determine if specific characteristics of the audio data match preconfigured acoustic waveforms, audio signatures, or other data corresponding to a wakeword.

Thus, the wakeword detection component 520 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 520 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 520 and/or input is detected by an input detector, the user device 110 may "wake" and begin transmitting audio data 101, representing the audio 510, to components of the user device 110 and/or the system component(s) 120 for processing. The audio data 101 may include data corresponding to the wakeword; in other embodiments, the portion of the audio corresponding to the wakeword is removed by the user device 110 prior to sending the audio data 101 to the system component(s) 120. In the case of touch input detection or gesture-based input detection, the audio data may not include a wakeword.

In at least some embodiments, the components of the user device 110 (e.g., on-device components) and the system component(s) 120 may have different processing capabilities. For example, on-device components may be configured to handle natural language user inputs may correspond to local-type natural language user inputs, such as those controlling devices or components associated with a user's home. In such circumstances the on-device components may be able to interpret and respond to a local-type natural language user input without incurring latency associated with sending data to and from the system component(s) 120. If the user device 110 attempts to process a natural language user input for which the on-device components are not necessarily best suited, the language processing results determined by the user device 110 may indicate a low confidence or other metric indicating that the processing by the user device 110 may not be as accurate as the processing done by the system component(s) 120.

In some embodiments, the user device may include a hybrid selector that may handle arbitration of on-device execution versus remote execution on the system component(s) 120. The hybrid selector may send the audio data 101 to the wakeword detection component 520. The wakeword detection component 520 may return an indication, that a wakeword was not detected. In response to receiving such an indication, the hybrid selector may refrain from sending the audio data 101 to the system component(s) 120, and may prevent the ASR component of the user device 110 from further processing the audio data 101. In this situation, the audio data 101 can be discarded.

If the wakeword detection component 520 detects a wakeword in the audio data 101, the wakeword detection component 520 may send an indication of such detection to the hybrid selector. In response to receiving the indication, the hybrid selector may send the audio data 101 to the system component(s) 120 and/or the acoustic model 130 of the user device 110. The hybrid selector (or other component) may associate a unique identifier with each natural language user input. The user device 110 may include the unique identifier when sending the audio data 101 to the system component(s) 120, and the response data from the system component(s) 120 may include the unique identifier to identify which natural language user input the response data corresponds. The hybrid selector may wait for response data from either or both of the system component(s) 120 or the local language processing component(s). The hybrid selector may control execution of local language processing, such as by sending "execute" and "terminate" events/instructions. $A_n$ "execute" event may instruct a component of the user device 110 to continue any suspended execution (e.g., by instructing the component to execute on a previously determined intent in order to determine a directive). Meanwhile, a "terminate" event may instruct the component(s) of the user device 110 to terminate further execution, such as when the user device 110 receives directive data from the system component(s) 120 and the hybrid selector determines to execute the directive. The hybrid selector may thus prevent duplicated and/or erroneous handling of user inputs.

In some implementations, the system 500 may include more than one system component(s) 120. The system component(s) 120 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 520 may result in sending audio data to first system component(s) 120 for processing while detection of the wakeword "Robot" by the wakeword detector may result in sending audio data to second system component(s) 120 for processing. The system may have a separate wakeword and system for different skills/systems (e.g., "Gaming Central" for a game play skill/system component(s)) and/or such skills/systems may be coordinated by one or more skill components 590*a*, 590*b*, 590*c*, etc. (collectively "skill component(s) 590") of the user device 110 and/or system component(s) 120.

Upon receipt by the system 500, the audio data 101 may be sent to an orchestrator component 530 and/or the LM orchestrator 135. The orchestrator component 530 may include memory and logic that enables the orchestrator component 530 to transmit various pieces and forms of data to various components of the system, as well as perform other operations as described herein. In some embodiments, the orchestrator component 530 may optionally be included in the system component(s) 120. In embodiments where the orchestrator component 530 is not included in the system component(s) 120, the audio data 101 may be sent directly to the LM orchestrator 135. Further, in such embodiments, each of the components of the system component(s) 120 may be configured to interact with the LM orchestrator 135, the action plan execution component (action plan executor) 550, the API provider component, and/or other component(s).

The LM orchestrator 135 include memory and logic that enables the LM orchestrator 135 to generate prompts for the LM 160, delegate tasks/subtasks, and perform other actions via an action plan executor 550. The LM orchestrator 135 may transmit various pieces and forms of data to various components of the system 100/500, as well as perform other operations as described herein. The LM orchestrator 135 may receive various inputs corresponding to a user command, and create a prompt for the LM 160 structured such that the LM 160 can identify and parse the command, identify data to be processed, identify data representing parameters for the processing, etc. A complex task may include subtasks. For each subtask, the LM orchestrator 135 may create a new prompt (e.g., by adding new data to a previous prompt). The new prompt may give the LM 160 context for performing the next subtask. For example, a first subtask may involve obtaining information from an external resource. In response to a first prompt, the LM 160 may output a call to an API and receive a response. A second subtask may involve generating a response for output to the user 5. The LM orchestrator 135 may create a second prompt that includes the API response. In response to the second prompt, the LM 160 may generate an output to the user 5 based on the API response.

The LM orchestrator 135 may generate prompts for complex tasks (e.g., a task involving multiple subtasks and/or involving processing data from different sources and/or of different types). The LM orchestrator 135 may insert separator tokens between different segments of data in a prompt. A segment of data may represent an input received from the user 5, an output previously generated by the LM 160, and/or data received by the LM 160 from an external resource. Different segments of data in a prompt may correspond to different data types (e.g., audio or text) or data formats (e.g., raw audio or acoustic tokens). Thus, the LM 160 may be trained to recognize the separator tokens in an LM input data 155 (e.g., a prompt) and/or generate appropriate tokens at the appropriate positions of an LM output data 165 (e.g., a response).

The LM orchestrator 135 may identify other actions indicated by the LM 160, and orchestrate execution of those actions using the action plan executor 550. Operation of the LM orchestrator 135 and the action plan executor 550 are described in further detail below with reference to FIG. 6. The LM orchestrator 135 may identify a responsive output in the LM output data 165, and route it to the rendering model 185 and/or a vocoder 380 for conversion to output audio data 351. The rendering model 185 may upsample the relatively coarse output of the LM 160 (e.g., speech tokens) into a higher-fidelity representation suitable for conversion, by a vocoder 380, to output audio data 351 that may be output to the user. In some cases, the rendering model 185 may apply certain voice characteristics to the speech based on speaker embedding data (e.g., representing a target speaker's voice such as the voice corresponding to a virtual assistant) retrieved from a voice data storage component 375. The rendering model 185 and vocoder 380 are described in further detail below with reference to FIGS. 3B and 7C.

In some embodiments, the system component(s) 120 may include an arbitrator component 540, which may be configured to determine whether the orchestrator component 530 and/or the LM orchestrator 135 is to provide a response to the user 5. In some embodiments, the LM orchestrator 135 may be selected to process with respect to the audio data 101 only if the user 5 associated with the audio data 101 (or the user device 110 that captured the audio 510) has previously indicated that the LM orchestrator 135 may be selected to process with respect to user inputs received from the user 5.

In some embodiments, the arbitrator component 540 may determine the orchestrator component 530 and/or the LM orchestrator 135 are to process with respect to the audio data 101 based on metadata associated with the audio data 101. For example, the arbitrator component 540 may be a classifier configured to process a textual (e.g., content) representation of the audio data 101 (e.g., output by the LM 160) and classify the corresponding user input as to be processed by the orchestrator component 530 and/or the LM orchestrator 135. For further example, the arbitrator component 540 may determine whether the device from which the audio data 101 is received is associated with an indicator representing the audio data 101 is to be processed by the orchestrator component 530 and/or the LM orchestrator 135. As an even further example, the arbitrator component 540 may determine whether the user 5 (e.g., determined using data output from a user recognition component) from which the audio data 101 is received is associated with a user profile including an indicator representing the audio data 101 is to be processed by the orchestrator component 530 and/or the LM orchestrator 135. As another example, the arbitrator component 540 may determine whether the user has invoked (e.g., using a wakeword) a virtual assistant corresponding to the orchestrator component 530 or an agent corresponding to the LM orchestrator 135. As another example, the arbitrator component 540 may determine whether the audio data 101 (or corresponding content data) corresponds to a request representing that the audio data 101 is to be processed by the orchestrator component 530 and/or the LM orchestrator 135 (e.g., a request including "let's chat" may represent that the audio data 101 is to be processed by the LM orchestrator 135).

In some embodiments, the arbitrator component 540 may send the audio data 101 to both of the orchestrator component 530 and the LM orchestrator 135. The arbitrator component 540 may do so if it determines that a confidence score corresponding to whether the orchestrator component 530 and/or the LM orchestrator 135 is to process the input is below a threshold. In such embodiments, the orchestrator component 530 and/or the LM orchestrator 135 may include further logic for determining further confidence scores during processing representing whether the orchestrator component 530 and/or the LM orchestrator 135 should continue processing, as is discussed further herein below.

The arbitrator component 540 may send the audio data 101 to the acoustic model 130. In some embodiments, the component selected to process the audio data 101 (e.g., the orchestrator component 530 and/or the LM orchestrator 135)

may send the audio data 101 to the acoustic model 130. The acoustic model 130 may convert the audio data 101 into input acoustic token data for processing by the LM 160. The LM 160 may transcribe the input acoustic token data into output content token data (e.g., representing text data). The content token data may represent one or more than one (e.g., in the form of an N-best list) ASR hypotheses representing speech represented in the audio data 101.

In some implementations, the audio data 101 may be transcribed using an ASR component (not shown). Such an ASR component may process the audio data 101 using one or more DNN ASR models. $A_n$ ASR model may be, for example, a recurrent neural network such as an RNN-T. The ASR model may predict a probability (y|x) of labels $y=(y_1, \ldots, y_u)$ given acoustic features $x=(x_1, \ldots, x_t)$. During inference, the ASR model can generate an N-best list using, for example, a beam search decoding algorithm. The ASR model may include various neural networks and arithmetic components such as an encoder, a prediction network, a joint network, and a softmax. The encoder may be similar or analogous to an acoustic model and may process a sequence of acoustic input features to generate encoded hidden representations. The prediction network may be similar or analogous to a language model and may process the previous output label predictions, and map them to corresponding hidden representations. The joint network may be, for example, a feed forward neural network (NN) that may process hidden representations from both the encoder and prediction network, and predict output label probabilities. The softmax component may be a function implemented (e.g., as a layer of the joint network and/or a separate arithmetic block) to normalize the predicted output probabilities (e.g., such that the probabilities sum to 1). The ASR component may send the text data to the arbitrator component 540, the orchestrator component 530, and/or the LM orchestrator 135. In instances where the text data is sent to the arbitrator component 540, the arbitrator component 540 may send the text data to the component selected to process the audio data 101 (e.g., the orchestrator component 530 and/or the LM orchestrator 135). The text data sent from the ASR component to the arbitrator component 540, the orchestrator component 530, and/or the LM orchestrator 135 may include a single top-scoring ASR hypothesis or may include an N-best list including multiple top-scoring ASR hypotheses. $A_n$ N-best list may additionally include a respective score associated with each ASR hypothesis represented therein.

In some embodiments, the orchestrator component 530 may cause a NLU component (not shown) to perform processing with respect to the ASR data generated by the ASR component and/or LM 160. The NLU component may attempt to make a semantic interpretation of the phrase(s) or statement(s) represented in the ASR data input therein by determining one or more meanings associated with the phrase(s) or statement(s) represented in the text data. The NLU component may determine an intent representing an action that a user desires be performed and may determine information that allows a device (e.g., the user device 110, the system component(s) 120, a skill component 590, a skill system component(s) 525, etc.) to execute the intent. For example, if the ASR data corresponds to "play the 5th Symphony by Beethoven," the NLU component may determine an intent that the system output music and may identify "Beethoven" as an artist/composer and "5th Symphony" as the piece of music to be played. For further example, if the ASR data corresponds to "what is the weather," the NLU component may determine an intent that the system output weather information associated with a geographic location of the user device 110. In another example, if the ASR data corresponds to "turn off the lights," the NLU component may determine an intent that the system turn off lights associated with the user device 110 or the user 5. However, if the NLU component is unable to resolve the entity—for example, because the entity is referred to by anaphora such as "this song" or "my next appointment"—the system can send a decode request to another speech processing system for information regarding the entity mention and/or other context related to the utterance. The natural language processing system may augment, correct, or base results data upon the ASR data as well as any data received from the system.

The NLU component may return NLU results data (which may include tagged text data, indicators of intent, etc.) back to the orchestrator component 530. The orchestrator component 530 may forward the NLU results data to a skill component(s) 590. If the NLU results data includes a single NLU hypothesis, the NLU component and the orchestrator component 530 may direct the NLU results data to the skill component(s) 590 associated with the NLU hypothesis. If the NLU results data includes an N-best list of NLU hypotheses, the NLU component and the orchestrator component 530 may direct the top scoring NLU hypothesis to a skill component(s) 590 associated with the top scoring NLU hypothesis. The system may also include a post-NLU ranker which may incorporate other information to rank potential interpretations determined by the NLU component.

In some embodiments, after determining that the orchestrator component 530 and/or the LM orchestrator 135 should process with respect to the input data 105, the arbitrator component 540 may be configured to periodically determine whether the orchestrator component 530 and/or the LM orchestrator 135 should continue processing with respect to the input data 105. For example, after a particular point in the processing of the orchestrator component 530 (e.g., after performing NLU, prior to determining a skill component 590 to process with respect to the input data 105, prior to performing an action responsive to the user input, etc.) and/or the LM orchestrator 135 (e.g., after selecting a task to be completed, after receiving the action response data from the one or more components, after completing a task, prior to performing an action responsive to the user input, etc.) the orchestrator component 530 and/or the LM orchestrator 135 may query the arbitrator component 540 has determined that the orchestrator component 530 and/or the LM orchestrator 135 should halt processing with respect to the input data 105. As discussed above, the system 500 may be configured to stream portions of data associated with processing with respect to a user input to the one or more components such that the one or more components may begin performing their configured processing with respect to that data as soon as it is available to the one or more components. As such, the arbitrator component 540 may cause the orchestrator component 530 and/or the LM orchestrator 135 to begin processing with respect to a user input as soon as a portion of data associated with the input data 105 is available (e.g., the ASR data, context data, user recognition, etc.). Thereafter, once the arbitrator component 540 has enough data to perform the processing described herein above to determine whether the orchestrator component 530 and/or the LM orchestrator 135 is to process with respect to the user input, the arbitrator component 540 may inform the orchestrator component 530 and/or the LM orchestrator 135 to continue/halt processing with respect to the user input at one of the logical checkpoints in the processing of the orchestrator component 530 and/or the LM orchestrator 135.

As discussed herein above, in some embodiments, the LM shortlister component 640 (e.g., via an API retrieval component and/or a shortlister language model) may be configured to select the orchestrator component 530 to process with respect to the user input and/or a current task to return action response data (e.g., the action response data 655*a*) representing a response to the user input/current task or a description of an action the orchestrator component 530 may cause to be performed in response to the user input/current task. As such, in some embodiments, although the LM orchestrator 135 is determined to process with respect to a user input, the LM orchestrator 135 may determine, during such processing, that the orchestrator component 530 should process with respect to the user input.

A skill system component(s) 525 may communicate with a skill/app component(s) 590 within the system component(s) 120 directly with the orchestrator component 530 and/or the action plan executor 550, or with other components. A skill system component(s) 525 may be configured to perform one or more actions. $A_n$ ability to perform such action(s) may sometimes be referred to as a “skill.” That is, a skill may enable a skill system component(s) 525 to execute specific functionality in order to provide data or perform some other action requested by a user. For example, a weather service skill may enable a skill system component(s) 525 to provide weather information to the system component(s) 120, a car service skill may enable a skill system component(s) 525 to book a trip with respect to a taxi or ride sharing service, an order pizza skill may enable a skill system component(s) 525 to order a pizza with respect to a restaurant’s online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 590 dedicated to interacting with the skill system component(s) 525. Unless expressly stated otherwise, reference to a skill, skill device, or skill component may include a skill component 590 operated by the system component(s) 120 and/or skill operated by the skill system component(s) 525. Moreover, the functionality described herein as a skill or skill may be referred to using many different terms, such as an action, speechlet, bot, app, or the like. The skill component 590 and or skill system component(s) 525 may return output data to the orchestrator component 530.

The user device 110 may include still image and/or video capture components such as a camera 818 or cameras to capture one or more images. The user device 110 may include circuitry for digitizing the images and/or video for transmission to the system component(s) 120 as image data. The user device 110 may further include circuitry for voice command-based control of the camera, allowing a user 5 to request capture of image or video data. The user device 110 may process the commands locally or send audio data 101 representing the commands to the system component(s) 120 for processing, after which the system component(s) 120 may return output data that can cause the user device 110 to engage its camera.

In at least some embodiments, the system component(s) 120 may receive the audio data 101 from the user device 110, process speech corresponding to a spoken input in the received audio data 101, and perform functions in response to the recognized speech. In at least some embodiments, these functions may involve sending directives (e.g., commands), from the system component(s) to the user device 110 (and/or other user devices 110) to cause the user device 110 to perform an action, such as output an audible response to the spoken input via a loudspeaker(s), and/or control secondary devices in the environment by sending a control command to the secondary devices.

Thus, when the user device 110 is able to communicate with the system component(s) 120 over the network(s) 199, some or all of the functions capable of being performed by the system component(s) 120 may be performed by sending one or more directives over the network(s) 199 to the user device 110, which, in turn, may process the directive(s) and perform one or more corresponding actions. For example, the system component(s) 120, using a remote directive that is included in response data (e.g., a remote response), may direct the user device 110 to output an audible response (e.g., using speech synthesis processing performed by the LM 160 and/or an on-device TTS component) to a user’s question via a loudspeaker(s) of (or otherwise associated with) the user device 110, to output content (e.g., music) via the loudspeaker(s) of (or otherwise associated with) the user device 110, to display content on a display of (or otherwise associated with) the user device 110, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

In at least some embodiments, the user device 110 may include, or be configured to use, one or more skill components that may work similarly to the skill component(s) 590 implemented by the system component(s). The skill component(s) may correspond to one or more domains that are used in order to determine how to act on a spoken input in a particular way, such as by outputting a directive that corresponds to the determined intent, and which can be processed to implement the desired operation. The skill component(s) installed on the user device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the user device 110 may be in communication with one or more skill system component(s) 525. For example, a skill system component(s) 525 may be located in a remote environment (e.g., separate location) such that the user device 110 may only communicate with the skill system component(s) 525 via the network(s) 199. However, the disclosure is not limited thereto. For example, in at least some embodiments, a skill system component(s) 525 may be configured in a local environment (e.g., home server and/or the like) such that the user device 110 may communicate with the skill system component(s) 525 via a private network, such as a local area network (LAN).

In some implementations, the system 500 may include a TTS component (not shown). The TTS component may generate audio data (e.g., synthesized speech) from text data (e.g., content token data) using one or more different methods. Text data input to the TTS component may come from the LM 160, a skill component 590, the orchestrator component 530, or another component of the system. The TTS component may include a preprocessing component for converting text data and/or other input data into a form suitable for processing using various TTS techniques. The preprocessing component may include functionality and/or components for performing text normalization, linguistic analysis, linguistic prosody generation, or other such operations. During text normalization, the preprocessing component may first process the text data and generate standard text, converting such things as numbers, abbreviations (such as Apt., St., etc.), symbols ($, %, etc.) into the equivalent of written out words. During linguistic analysis, a preprocessing component may analyze the language in the normalized text to generate a sequence of phonetic units corresponding to the input text. This process may be referred to as grapheme-to-phoneme conversion. Phonetic units include symbolic representations of sound units to be eventually combined and output by the system as speech.

The output of the preprocessing component may be a symbolic linguistic representation, which may include a sequence of phonetic units. The TTS component may retrieve one or more previously trained and/or configured TTS models from a voice profile storage. A TTS model may be, for example, a neural network model that may be described as interconnected artificial neurons or "cells" interconnected in layers and/or blocks. In general, neural network model architecture can be described broadly by hyperparameters that describe the number of layers and/or blocks, how many cells each layer and/or block contains, what activations functions they implement, how they interconnect, etc. A neural network model includes trainable parameters (e.g., "weights") that indicate how much weight (e.g., in the form of an arithmetic multiplier) a cell should give to a particular input when generating an output. In some implementations, a neural network model may include other features such as a self-attention mechanism, which may determine certain parameters at run time based on inputs rather than, for example, during training based on a loss calculation.

A TTS model may represent a particular speaker identity and may be conditioned based on speaking style, emotion, etc. In some implementations, a particular speaker identity may be associated with more than one TTS model; for example, with a different model representing a different speaking style, language, emotion, etc. in some implementations, a particular TTS model may be associated with more than one speaker identity; that is, be able to produce synthesized speech that reproduces voice characteristics of more than one character. Thus a first TTS model may be used to create synthesized speech for the first natural language processing system component(s) 120 while a second, different, TTS model may be used to create synthesized speech for the second natural language processing system component(s) 120. In some cases, the TTS model may generate the desired voice characteristics based on conditioning data received or determined from the text data and/or the other input data. In some implementations, the TTS component may synthesize speech using method called unit selection. In unit selection, the TTS component may match text data against a database of recorded speech. The TTS component may select matching units of recorded speech and concatenate the units together to form audio data. In some implementations, the TTS component may synthesize speech using method called parametric synthesis, the TTS component may vary parameters such as frequency, volume, and noise to create audio data including an artificial speech waveform. The output of some speech synthesis techniques may include spectrogram data, which represents the energy content at each frequency band with a "frame" of audio data. A frame of audio data may represent several milliseconds (e.g., 10, 20, 30, etc.) of audio data.

The TTS component may convert spectrogram data to waveform data using a computerized voice generator, sometimes called a vocoder. The vocoder may be, for example, a universal neural vocoder based on Parallel WaveNet or related model. The vocoder may take as input audio data in the form of, for example, a Mel-spectrogram with 80 coefficients and frequencies ranging from 50 Hz to 12 kHz. The vocoder may process the spectrogram data and convert it to a time-domain audio format (e.g., pulse-code modulation (PCM), waveform audio format (WAV), μ-law, etc.) that may be readily converted to an analog signal for amplification and output by a loudspeaker. The resulting audio data may consist of, for example, 8-, 16-, or 24-bit audio having a sample rate of 16 kHz, 24 kHz, 44.1 kHz, etc. In some implementations, other bit and/or sample rates may be used. A digital-to-analog convertor (DAC) may convert the audio data to an analog signal suitable for amplification and output as audio by a loudspeaker 812 such as a loudspeaker 812 of the user device 110.

The system 500 may include a compliance component 372 configured to process outputs of the LM 160 and/or other components of the system 500, and block, delete, and/or otherwise prevent output of prohibited content to the user. The compliance component 372 may include software and/or hardware to analyze content and detect prohibited content such as personally identifying information, healthcare or financial data, potentially harmful or hurtful content, content related to potentially illegal acts, etc. In some implementations, the compliance component 372 may process system inputs as well to prevent the system 500 from being prompted with prohibited requests or instructions. In some embodiments, the compliance component 372 may process other data (e.g., context data, user profile data, system configuration/policy data, etc.) to determine whether the generated response and/or the input is appropriate.

The system 500 (either on user device 110, system component(s) 120, or a combination thereof) may include profile storage 570 for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 570 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more internet protocol (IP) addresses, medium access control (MAC) addresses, and/or device identifiers, such as a serial number, of each additional electronic device associated with the identified user account. When a user logs into to an application installed on a user device 110, the user profile (associated with the presented login information) may be updated to include information about the user device 110, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 570 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 570 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 5 may be illustrated as part of system component(s) 120, user device 110, or otherwise, the components may be arranged in other device(s) (such as in user device 110 if illustrated in system component(s) 120 or vice-versa, or in other device(s) altogether) without departing from the disclosure. Furthermore, various components shown in FIG. 5 and/or the functions they perform may be duplicated, divided, and/or shared between the system component(s) 120 and user device 110.

Figure 6:
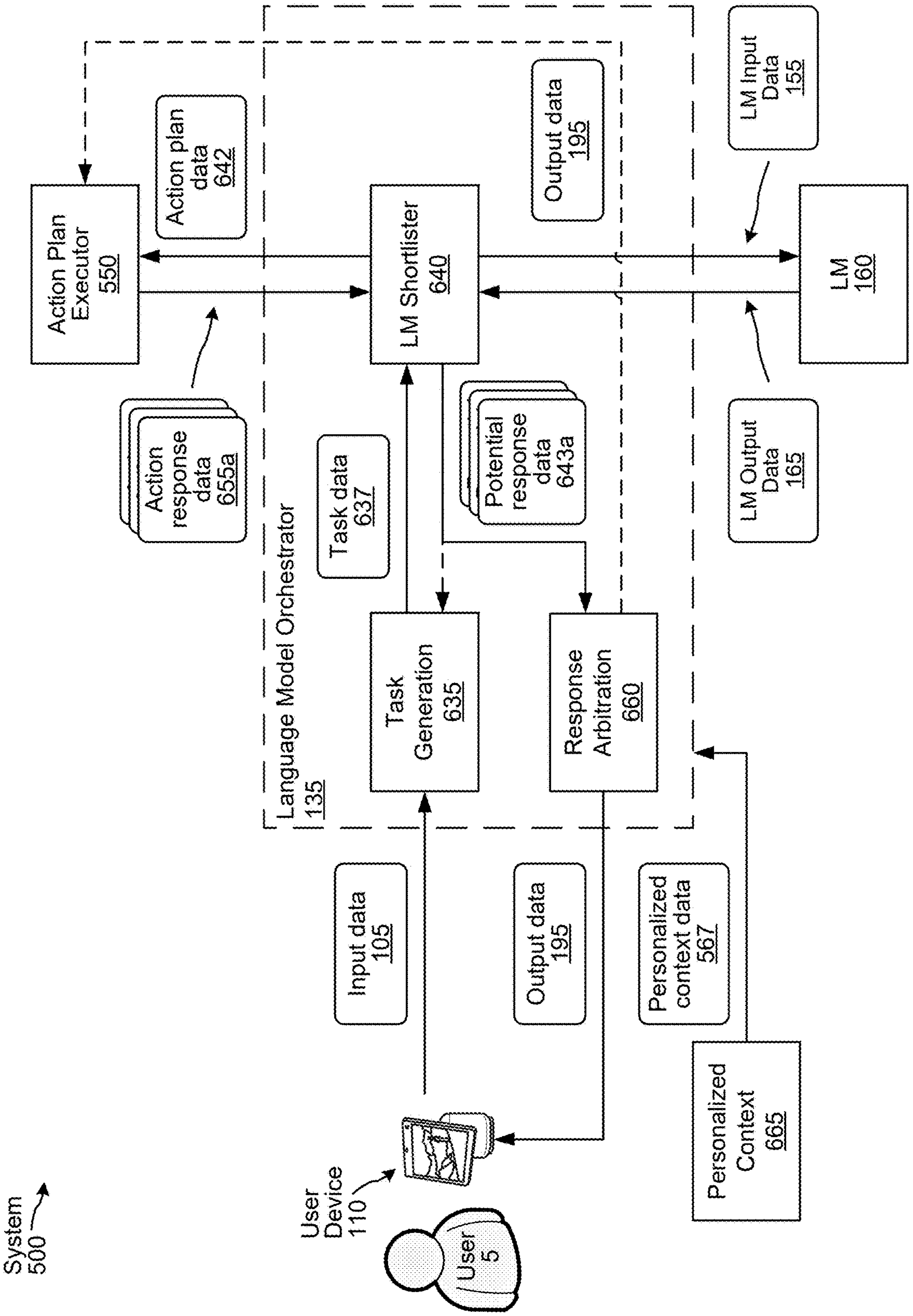
FIG. 6 is a conceptual diagram illustrating LM components of the natural language processing system in further detail, according to embodiments of the present disclosure.

FIG. 6 is a conceptual diagram illustrating LM components of the natural language processing system 500 in further detail, according to embodiments of the present disclosure. The system 500 may include a user device 110, local to a user 5, in communication with a system component(s) 120 via a network(s) 199. The network(s) 199 may include the Internet and/or any other wide- or local-area network, and may include wired, wireless, and/or cellular network hardware. The system component(s) 120 may include various components, such as the LM orchestrator 135, a personalized context component 665, and the action plan executor 550. The LM orchestrator 135 may include a task generation component 635, a LM shortlister component 640, and a response arbitration component 660. In some embodiments, one or more of the LM orchestrator 135, the task generation component 635, the LM shortlister component 640, and/or the response arbitration component 660 may correspond to a trained LM. In some embodiments, one or more of the LM orchestrator 135, the task generation component 635, the LM shortlister component 640, and/or the response arbitration component 660 may call upon the LM 160 to perform inferences with respect to an LM input data 155.

In some embodiments, the LM orchestrator 135 may generate an LM input data 155 representing a prompt for input to the LM 160 (and/or other LMs of the system 100/500). The system component(s) 120 may receive input data 105, which may be provided to the LM orchestrator 135. As discussed above, in some instances, the input data 105 may correspond to various data types, such as text (e.g., a text or tokenized representation of a user input), audio, image, video, etc. For example, the user input data may include input text (or tokenized) data when the user input is a typed natural language user input. For further example, prior to the LM orchestrator 135 receiving the input data 105, another component (e.g., the LM 160 and/or an ASR component) of the system 500 may receive audio data representing the user input. The LM 160 and/or ASR component may perform speech-to-text processing on the audio data to determine ASR data corresponding to the user input, which may correspond to a transcript of the user input. As described above, with respect to FIG. 5, the ASR component may determine ASR data that includes an ASR N-best list including multiple ASR hypotheses and corresponding confidence scores representing what the user may have said. The ASR hypotheses may include text data, token data, ASR confidence score, etc. as representing the input utterance. The confidence score of each ASR hypothesis may indicate the ASR component's level of confidence that the corresponding hypothesis represents what the user said. The ASR component may also determine token scores corresponding to each token/word of the ASR hypothesis, where the token score indicates the ASR component's level of confidence that the respective token/word was spoken by the user. The token scores may be identified as an entity score when the corresponding token relates to an entity. In some instances, the input data 105 may include a top scoring ASR hypothesis of the ASR data. As an even further example, in some embodiments, the user input may correspond to an actuation of a physical button, data representing selection of a button displayed on a graphical user interface (GUI), image data of a gesture user input, combination of different types of user inputs (e.g., gesture and button actuation), etc. In such embodiments, the system 500 may include one or more components configured to process such user inputs to generate the text or tokenized representation of the user input (e.g., the input data 105).

In some embodiments, the LM orchestrator 135 may receive other input data (e.g., other input data 305), which may be processed in a similar manner as the input data 105 as described herein. The input data may be received in response to detection of an event such as change in device state (e.g., front door opening, garage door opening, TV turned off, etc.), occurrence of an acoustic event (e.g., baby crying, appliance beeping, etc.), presence of a user (e.g., a user approaching the user device 110, a user entering the home, etc.). In some embodiments, the system 500 may process the input data and generate a response/output. For example, the input data may be received in response to detection of a user generally or a particular user, an expiration of a timer, a time of day, detection of a change in the weather, a device state change, etc. In some embodiments, the input data may include data corresponding to the event, such as sensor data (e.g., image data, audio data, proximity sensor data, short-range wireless signal data, etc.), a description associated with the timer, the time of day, a description of the change in weather, an indication of the device state that changed, etc. The system 500 may include one or more components configured to process the input data to generate a natural language representation of the input data. The system 500 may process the input data and may perform an action. For example, in response to detecting a garage door opening, the system 500 may cause garage lights to turn on, living room lights to turn on, etc. As another example, in response to detecting an oven beeping, the system 500 may cause a user device 110 (e.g., a smartphone, a smart speaker, etc.) to present an alert to the user. The LM orchestrator 135 may process the input data to generate tasks that may cause the foregoing example actions to be performed.

The input data 105 may be received at the task generation component 635 of the LM orchestrator 135, which may be configured to generate a list (e.g., one or more) of subtasks (e.g., steps/actions) that are to be completed in order to perform an action responsive to the user input and select a task of the list of the tasks that is to be completed first (e.g., in a current iteration of processing by the LM 160). For example, for a user input of "How is today's weather looking," the task generation component 635 may generate a list of subtasks of "(1) determine current outside temperature from thermostat; and (2) determine weather forecast for today" and select the subtask of "determine weather forecast for today" to be completed first. In instances where the task generation component 635 generates more than one subtask to be completed in order to perform the task responsive to the user input, the task generation component 635 may further maintain and prioritize the list of subtasks. In other words, as the system 500 processes to complete the list of subtasks, the task generation component 635 may (1) incorporate the potential responses associated with completed subtasks into data provided to other components of the system 500; (2) update the list of subtasks to indicate completed (or attempted, in-progress, etc.) subtasks; (3) generate an updated prioritization of the subtasks remaining to be completed (or tasks to be attempted again); and/or (4) determine an updated current subtask to be completed. The task generation component 635 may generate and send task data 637 representing the selected subtask to be completed and various other information needed to perform further processing with respect to the task (e.g., the input data 105, an indication of the selected subtask, potential responses associated with previous subtasks, the remaining subtask(s), and context data associated with the input data 105) to the LM shortlister component 640.

The LM shortlister component 640 may be configured to determine one or more components (e.g., responding components and/or external resources such as other agents, tools, APIs, skill component(s) 590, language model agent component(s), TTS component, etc.) configured to perform an action related to the user input or the current subtask. The LM shortlister component 640 may further be configured to generate and cause the execution of a request(s) (e.g., an API call(s), an incomplete API call/API call format, an indication of an action to be performed by a component, etc.) for the one or more components to provide a potential responses(s) to the user input or current subtask (e.g., a response to a user-provided question, a paragraph from a website, etc.), which may further include a potential action (e.g., a description of a potential action, such as turning on a light, booking a flight ticket, ordering a pizza, etc.) the components are configured to/will perform with respect to the user input or the current task. For example, for a current task of "determine weather forecast for today," the LM shortlister component 640 may generate requests of "use Weather Application A to determine weather forecast for today" and "use Weather Application B to determine weather forecast for today," or the like. Such requests may be represented in the action plan data 642 sent to the action plan executor 550. The action plan executor 550 may identify the request(s) in the action plan data 642, generate executable API calls corresponding to the request(s), and cause the corresponding components (e.g., the responding component, such as the API provider component, the language model agent component, the skill component 590, the TTS component, etc.) to generate action response data 655*a*, 655*b*, 655*c*, etc. (collectively "action response data 655"), representing the requested potential response(s), where individual action response data 655*a* may be provided by/correspond to a particular responding component-one of the API provider component, the language model agent component, the skill component 590, and/or the TTS component. In some embodiments, the action response data 655*a-n* may include an identifier (e.g., a component name, an alphanumerical value associated with the component, etc.) for the component providing the data. The LM shortlister component 640 receives and processes the action response data 655*a-n* and generates potential response data 643*a*, 643*b*, 643*c*, etc. (collectively "potential response data 643"), representing the potential response(s) (e.g., relevant potential responses, selected potential responses, ranked potential responses, etc.) for further processing. If the LM shortlister component 640 determines that there are no remaining tasks to generate potential responses for, the LM shortlister component 640 may send the potential response data 643*a-n* to the response arbitration component 660.

The potential response data 643*a-n*, in some embodiments, may be determined based on receiving potential responses from various different components that may be relevant in responding to the input data 105. For example, the potential response data 643*a-n* may include a first potential response from a first component configured to perform a first task determined by the task generation component 635 (e.g., the responding component), a second potential response from a second component configured to perform a second task determined by the task generation component 635 (e.g., the responding component), etc. The potential response data 643*a-n* can include more than one potential response relating to an individual task. In some embodiments, the potential response data 643*a-n* may be natural language data.

The response arbitration component 660 processes the potential response data 643*a-n* to determine whether the potential responses generated for the one or more tasks are responsive to the user input. The response arbitration component 660 processes the potential response data 643*a-n* (representing at least the generated potential responses) and selects one or more of the potential responses that are determined to be responsive to the user input and/or determines that none of the actions are responsive to the user input. For example, the response arbitration component 660 may process the potential response data 643*a-n* to determine if one or more of the potential responses performable by the API(s) (e.g., the potential responses and/or potential actions) are responsive to the current task. In some embodiments, the response arbitration component 660 may generate a natural language summary of one or more of the selected responses and output the natural language summary. For example, for a user input of "what is the weather for today" and potential responses of "The weather for today is a high of 75 and a low of 68" and "The weather for today is mostly sunny with a slight chance of rain in the evening," the response arbitration component 660 may generate a natural language summary of "The weather for today is expected to be mostly sunny with a high of 75 and a low of 68 and a slight chance of rain in the evening," or the like. In some embodiments, where the LM orchestrator 135 determines a personality that is relevant to the user input, the response arbitration component 660 may further generate the natural language summary to be in a style corresponding to the personality.

In some embodiments, the language models (e.g., the LM 160 and/or LMs associated with the LM orchestrator 135, the task generation component 635, the LM shortlister component 640, and the response arbitration component 660) may be fine-tuned to perform a particular task(s). Fine-tuning of the language models (e.g., the LM orchestrator 135, the task generation component 635, the LM shortlister component 640, and the response arbitration component 660) may be performed using one or more techniques. One example fine-tuning technique is transfer learning that involves reusing a pre-trained model's weights and architecture for a new task. The pre-trained model may be trained on a large, general dataset, and the transfer learning approach allows for efficient and effective adaptation to specific tasks. Another example fine-tuning technique is sequential fine-tuning where a pre-trained model is fine-tuned on multiple related tasks sequentially. This allows the model to learn more nuanced and complex language patterns across different tasks, leading to better generalization and performance. Yet another fine-tuning technique is task-specific fine-tuning where the pre-trained model is fine-tuned on a specific task using a task-specific dataset. Yet another fine-tuning technique is multi-task learning where the pre-trained model is fine-tuned on multiple tasks simultaneously. This approach enables the model to learn and leverage the shared representations across different tasks, leading to better generalization and performance. Yet another fine-tuning technique is adapter training that involves training lightweight modules that are plugged into the pre-trained model, allowing for fine-tuning on a specific task without affecting the original model's performance on other tasks.

In some embodiments, one or more components of the system 500 discussed herein above may be configured to begin processing with respect to data as soon as the data or a portion of the data is available to the one or more components. Some components of the system 500 are generative components/models that can begin processing with respect to portions of data as they are available, instead of waiting to initiate processing after the entirety of data is available. In other words, the system 500 may be configured to stream portions of data associated with processing with respect to a user input to the one or more components such that the one or more components may begin performing their configured processing with respect to that data as soon as it is available to the one or more components. For example, if the output of the task generation component 635 and/or the LM shortlister component 640 indicates that additional information is needed to complete a first task associated with a user input, a request for the additional information may be sent to the personalized context component 665 (which may be returned as personalized context data 567). Thereafter, the task generation component 635 and/or the LM shortlister component 640 may continue to process to complete their configured operations. For example, while the personalized context component 665 is processing to determine the additional information, the system 500 may begin processing with respect to a second task associated with the user input. Thereafter, the output of the personalized context component 665 may be sent to the response arbitration component 660 such that once the response arbitration component 660 receives the output of the LM shortlister component 640, the response arbitration component 660 may resolve the ambiguity that resulted in the request for additional information in order to generate the responsive output data 195. For further example, if the input data 105 is generated to include the natural language representation of the user input, but the processing required to determine the corresponding contextual signals (e.g., weather data, time of data, dialog history, device information, etc.) is yet to be completed, the task generation component 635 may begin processing with respect to the natural language representation of the user input. Once the corresponding contextual signals have been generated, the task generation component 635 may begin processing with respect to the contextual signals and may update downstream components with the result of the processing with respect to the contextual signals.

As another example, if the task generation component 635 determines that more than one task is to be completed to perform an action responsive to a user input, and the LM shortlister component 640 processes as described herein above to cause one or more components to generate potential responses with respect to a first task of the more than one tasks, the LM shortlister component 640 may send the potential responses (and a representation of the user input and the current task) to the response arbitration component 660 to process as described herein above with respect to those potential responses while the system 500 (e.g., the task generation component 635 and/or the LM shortlister component 640) completes processing with respect to the remaining tasks of the one or more tasks. Therefore, the response arbitration component 660 may process as described herein to select between the potential responses associated with the first task while the potential responses associated with one or more of the remaining tasks is completed. As such, the response arbitration component 660 may only need to arbitrate between the potential responses associated with the first task that were previously selected by the response arbitration component 660 as being responsive to the first task when the response arbitration component 660 later processes with respect to further potential responses associated with further tasks.

As described above, the LM 160 may be configured to perform processing, for example segmented processing, with regard to tokens representing input speech. In some embodiments, the LM 160 may be further designed to process, understand, and/or generate multi-modal data including audio, text, image, video, and/or other types of data. The LM 160 may thus be built using deep learning techniques, such as neural networks, and may be trained on extensive datasets that include text (or other type of data, such as multi-modal data including text, audio, image, video, etc.) from a broad range of sources, such as old/permitted books, images, videos, websites, etc. for multi-modal/natural language processing. The system 500 may thus operate a variety of generative models including a speech-to-speech model (that may process audio data and generate audio embedding data/audio tokens that can be used to generate synthesized speech), text-to-speech model (that may process text data or other textual representations and generate audio embedding/token data), speech-to-text model (that may process audio data and generate text data or other textual representations), image-to-text model (that may process image (or video) data and generate text data or other textual representations), text-to-image data (that may process text or other textual representations and generate image (or video) data), a multi-modal generative model (that may process one or more types of input data (e.g., text, audio and/or image) and generate one or more types of output data (e.g., text, audio, and/or image)), and other types. Such a multi-modal LM capable of performing segmented processing is shown in FIG. 4A.

FIG. 7A illustrates example operations of prompt generation in the system 100, according to embodiments of the present disclosure. In the example operations shown in FIG. 7A, the LM orchestrator 135 and the LM 160 are processing two different segments on input data; however, the same operations may be extended to more segments and/or to different data modalities. The LM orchestrator 135 may receive command data 303 and other input data 305. The command data 303 may be in the form of tokens $U_1$, $U_2$, $U_3 \ldots U_n$. Similarly, the other input data 305 may be in the form of tokens $I_1$, $I_2$, $I_3 \ldots I_n$. In some cases, the LM orchestrator 135 convert the other input data 305 into another form using one of the input data encoders 230 to generate processed input data $I'_1 \ldots I'_n$. For example, the other input data 305 may represent raw waveform audio data, and the LM orchestrator 135 may send it to an acoustic model 130 for conversion into audio token data $I'_1$, $I'_2$, $I'_3 \ldots I'_n$. Although not shown in the example operations of FIG. 7A, the system 100 may additionally or alternatively convert the command data 303. In some implementations, the LM orchestrator 135 may receive the other input data 305 and determine whether and/or which portion is to be encoded prior to inputting into the LM 160. In some implementations, the acoustic model 130 and/or input data encoder(s) 230 may execute on an upstream component (e.g., on a user device 110) to tokenize and/or encoder the other input data 305 prior to receipt by the LM orchestrator 135.

The LM orchestrator 135 may determine positional data corresponding to each input (e.g., the command data 303, the other input data 305, etc.). The positional data may represent an order in which the data was received. The positional data may represent an order in which the LM 160 may process the inputs; that is, if a first input is used to process a second input, the positional data may reflect that the first input is to be placed first in an input sequence and the second input is to be placed after the first input. For more complex input sequences, such as when the LM 160 processes data in multiple turns, positional data may indicate that data output by the LM 160 in a previous turn should be appended to the end of the input sequence for the next turn. If new data is received between turns, such as when the LM 160 generates a request to an API or another LM, and the API/LM returns a response, the positional data for the request and response may indicate that the request should be appended to the previous sequence, followed by the response.

$A_n$ API is a software interface that allows computer programs or components to communicate with each other. $A_n$ API specification describes how to call the API to access a tool or service of the API. $A_n$ agent may be configured to generate an API call to access a resource such as a tool, service, and/or another agent. Different APIs may have different specifications, so each time a new resource is added to the system or otherwise made available to the agent, the agent may be updated to use the new API's specification and/or the resource may be configured to conform to a standard or preexisting API specification.

The LM orchestrator 135 may combine the command data 303 and processed input data 305 into an LM input data 155. The LM input data 155 may include the command data 303 tokens $U_1 \ldots U_n$ and processed input tokens $I'_1 \ldots I'_n$ separated by a separator token "<M>". The <M> token may indicate that data of a different segment and/or modality follows. The LM 160 may process the LM input data 155 to generate LM output data 165, which may consist of data tokens $O_1 \ldots O_n$. The LM orchestrator 135 may route the LM output data 165 to one or more downstream processes 388, which may include further processing, communication with other components of the system, and/or outputting a response to a user. The downstream processes 388 may include, for example, operations performed by the action plan executor 550, and/or external resources such as one or more delegate agents (e.g., corresponding to a delegate LM 360), and/or tools. In the case of delegated tasks/subtasks, the resources may return data to the agent, and the LM orchestrator 135 may generate a new LM input data 155 for processing by the LM 160.

When performing complex tasks, previous outputs of the LM 160 may be added to the prompt for performing the next subtask. Thus, the LM orchestrator 135 may add to the next LM input data 155 a separator token "<O>" followed by the output tokens $O_1 \ldots O_n$.

In some implementations, the LM orchestrator 135 may create an LM input data 155 containing other various types of data including a representation of a natural language input from a user (e.g., in the form of acoustic and/or content token data), a machine-generated instruction, context data (e.g., from the user device that received the input, from one or more system components, and/or from another user device or devices), previous input and/or output data, previous API calls and/or observations, and/or information in other formats of data that the LM 160 has been configured to process (e.g., gestures represented in video data, a recognizable face or object in image data, a single or time-series measurement taken with a sensor, etc.). The LM orchestrator 135 may combine the prompt tokens, acoustic tokens, and/or any tokens previously predicted by the LM 160, delineated with appropriate separator tokens.

In some implementations, the LM 160 may be a multi-modal LM. A multi-modal LM can process and output data of more than one type at a time. For example, in addition to content data (e.g., representations of words/text), a multi-modal LM may be capable of processing audio data, video data, sensor data, image data, and/or other modalities of data. The data may be tokenized (e.g., encoded into a series of discrete values), encoded into an embedding, and/or in its raw form (e.g., untokenized, unencoded, and/or otherwise in a same or similar format as it was received and/or created). A multi-modal LM may perform speech-to-speech and other operations in which the model processes representations of input audio (e.g., speech) and/or other type(s) content (e.g., text, images, etc.) to generate representations of output audio and/or other type(s) of content. As an extension of such speech-to-speech functions, a multi-modal LM may be capable of performing ASR (in which a multi-modal LM receives representations of speech and outputs representations of text), TTS (in which a multi-modal LM receives representations of text and outputs representations of synthesized speech), machine translation (in which a multi-modal LM receives representations of speech in a first natural language and outputs representations of synthesized speech in a second natural language), and/or other functionalities.

A multi-modal LM may use these speech-to-speech capabilities to perform the functions of a conversational agent or other type of chatbot that can engage in a dialog with a user via speech, text, and/or other data modalities. For example, the user may communicate with the LM using voice and/or text. The user may input images and/or other data and ask the LM to answer questions about the input and/or perform other processing of the input. For example, a user may upload documents and request the LM to provide a summary. In some cases, the LM may translate the document and/or the summary into another language. The user may ask the LM to summarize unread emails (e.g., accumulating during a leave of absence) and describe them to the user in order of urgency and/or importance. Examples of multi-modal operation are described in additional detail below with reference to FIGS. 3D, 4A, 4B, and 7A through 7D.

In some implementations, the LM 160 may be configured to operate in a portion-wise fashion in which it is capable of processing a segment of an input and generate the corresponding segment of the output, prior to receiving a subsequent segment of the input. For example, at runtime/inference, each segment of input acoustic token data (e.g., representing a series of frames of audio data) may be shuttled to the LM 160 and added to the running autoregressive input (e.g., which, in a speech-to-text process, may also contain previously predicted output content tokens). The LM 160 may decode the transcript represented in the portion. The LM 160 may predict word pieces one-by-one until reaching an end-of-segment token. At this point, a decoding algorithm of the LM 160 may halt prediction until the LM 160 receives the next segment of input acoustic token data. Portion-wise processing may be used to improve the latency of certain operations of the LM 160 when processing data received over a period of time that is relatively long compared to the processing time of the LM 160 such a speech received over several seconds.

To enable this functionality, the LM 160 may be trained to include in its vocabulary one or more types of separator tokens (e.g., representing an end-of-segment and/or separations between tokens of different modalities). Several other aspects of the system 100 may be configured to allow portion-wise processing by the LM 160. First, the LM 160 may be trained to predict the end of a portion. The LM 160 may operate in an autoregressive manner in which it receives the input and predicts an output sequence of tokens (or, in the case of multi-modal operation, multiple parallel output sequences) where the LM 160 predicts each successive output token using the input data and previously predicted output tokens. The LM 160 may be trained to determine when it has generated an output sequence that represents all tokens of the current (and preceding) segment of input data. Upon making this determination, the LM 160 may output a token indicating an end-of-segment. The end-of-segment token may serve as (and/or trigger) a request for the next segment of input data.

Second, components upstream from the LM 160 may be configured to generate portions of input data for processing by the LM 160. For example, the LM orchestrator 135 may have input audio data (e.g., command data 303) processed by the acoustic model 130. The acoustic model 130 may process the input audio data in portions (e.g., corresponding to a certain number of audio frames/audio tokens, and/or corresponding to a portion of speech up until a potential endpoint as determined by the acoustic model 130 based on, for example, a pause in speech of a certain length). The acoustic model 130 may be configured to determine a token size and/or a segment size. The token size may correspond to the number of audio frames that a single token represents.

The acoustic model 130 may determine the segment size (e.g., in number of tokens, frames, and/or milliseconds of audio) in various ways. For example, the acoustic model 130 may determine the segment size based on policy data (e.g., stored in a policy data storage component 435). The policy data may specify a segment size for a given task; for example, a first segment size may be used for low-latency tasks such as speech recognition for real-time close captioning, a second segment size larger than the first may be used for natural language command processing and/or chatbot applications, and a third segment size larger than the second segment size may be used for machine translation tasks where more lookahead information may increase the accuracy of the translation. In some cases, the acoustic model 130 may determine an appropriate segment size automatically based on the task (which may, in some cases, include processing some amount of input speech or text to identify the task to be performed). In some cases, the acoustic model 130 may determine an appropriate segment size depending on the modality(ies) involved; for example, depending on whether the modality is speech-to-text, text-to-speech, or speech-to-speech. In some cases, the acoustic model 130 may select an appropriate segment size based on characteristics of the input (e.g., based on the number of speakers, the volume of the speaker(s) and/or background noise, whether a speaker is whispering, etc.). In some cases, the segment size may be specified by the user; for example, for the particular task or as a global preference setting. In some cases, the acoustic model 130 may determine segment size based on a combination of some or all of the above factors. In any case, the acoustic model 130 may generate a segment and return it to the LM orchestrator 135 for prompting the LM 160 prior to an end of the input speech.

Determining an end of speech may be referred to as "speech endpointing." Endpointing may involve waiting for a period of time after the user has finished speaking and/or processing speech received to determine whether such speech likely represents a complete utterance (e.g., includes information sufficient to identify and execute a requested operation) or whether the user has paused mid-sentence (e.g., to think of the right word, due to an interruption, or otherwise) with intent to resume speaking. In some implementations, the endpoint decision may be made the LM 160 based on the content of the speech. In some implementations, the endpoint decision may be made by one or more trained models and/or based on the output of one or more trained models. For example, an endpoint decision model may receive one or more of LM output data, ASR results data, NLU output data, dialog context, skill results, user data, etc. and determine whether an endpoint of speech has likely been reached at any point. The endpoint decision may lead to other actions by the system such as turning off a microphone, changing an indicator (e.g., a light), executing a command, outputting a response, entering a sleep mode, etc.

Third, the LM orchestrator 135 may be configured to generate LM prompts by sequencing together the portions of data generated by the acoustic model 130 and the portions of data generated by the LM 160 (e.g., based on previous portions of data generated by the acoustic model 130).

In implementations where the LM orchestrator 135 and LM 160 process a stream of input data in a portion-wise manner, the LM orchestrator 135 and LM 160 may use a separator token as an indication of an end-of-segment, either as received from the acoustic model 130 or predicted by the LM 160. In some cases, the <M> or <O> token may serve to indicate to the LM orchestrator 135 or the LM 160 that the tokens that follow correspond to the next segment of input. If the LM 160 outputs an end-of-segment token, that may trigger the LM orchestrator 135 to send the next segment of input data for processing. A separator token at the end of the next LM input data 155 may indicate to the LM 160 to begin predicting LM output data 165 corresponding to the new segment of input data, and so on.

In various implementations, the data portions may vary in size from a few frames (e.g., where a frame of audio data represents 10, 20, 30, or 40 ms, etc. of audio) to a few seconds. The LM 160 may be trained using an aligned dataset in which the beginnings and endings of words are precisely labeled. The labels may allow the training to correlate a segment with the word(s) it represents. The training may teach the LM 160 to predict the end of a portion. The end-of-segment prediction may be used to request the next segment of input data. For example, in a speech-to-speech implementation, the end-of-segment prediction may be sent to an audio encoder to request the next segment of audio data. The LM 160 may be trained using portions of random segment length. This may allow the system to be post-configured for whatever segment size is appropriate for the given task. For example, larger segment sizes may improve accuracy while smaller segment sizes may reduce latency.

During inference, segment size may be selected by the user, preset for the requested task, and/or configured dynamically by the system based on context. The system may use different segment sizes depending on the constraints for a given task. For example, performing ASR for real-time closed captioning of audio and/or video may benefit from low-latency transcription. Accordingly, the segment size may be set to a relatively short duration such as 0.5s to 2s. Thus, the system may be able to generate subtitles for a movie or TV show such that the words appear on screen only a short time after being spoken or while being spoken (if audio data buffering is available).

A longer segment size may be appropriate in, for example, a machine translation implementation. Due to rules of grammar and/or common usage, the order of words in one language may be different from the order of words in another language. Accordingly, the segment size may be set to a relatively high duration such as 2s to 10s. This may give the LM 160 adequate "lookahead" information for processing the input and generating an output in which words and/or phrases appear in different positions within the output sequence relative to the positions of corresponding words and/or phrases in the input sequence.

Intermediate segment sizes may be appropriate in, for example, natural language command processing and/or chatbot applications. When the system is acting as a virtual assistant or conversational agent, segment size may be configured to balance accuracy and latency. Accordingly, the segment size may be set to a relatively moderate duration such as 1s to 3s. This may allow the system to effectively extract meaning from the input while keeping latency acceptable for generating replies in a conversational context and/or performing commands for the user without excessive delay.

In some uses cases, the system may dynamically change segment sizes to process different portions of an input and/or successive inputs from a multi-turn interaction. For example, the system may default to an intermediate segment length suitable for natural language processing. A user may speak to a device of the system and request a task for which a different segment size may be better suited. For example, the user may say, "Alexa, please provide live transcription of the following speech." The system may process this segment of the input using the intermediate segment size and then switch to a smaller segment size to reduce the user-perceived latency associated with the live transcription. In another example, the user may say, "Alexa, please translate the following speech into English." The system may again begin with the default segment size before switching to a larger segment size that may provide a more accurate translation.

The LM orchestrator 135 may receive the LM output data 165 and route it to one or more downstream processes 388, which may include further processing, communication with other components of the system, and/or outputting a response to a user. The downstream processes 388 may include, for example, operations performed by the action plan executor 550, a large action model (LAM) 764, and/or external resources such as other agents, and/or tools.

$A_n$ agent may have tools available to it. Similar to cooperating agents, an agent may leverage such tools may allow the agent to augment its capabilities and perform a wider variety of tasks for the user, and perform them more accurately and/or completely than it may otherwise be capable of. The tools may include an API tool 752, a math tool 754, a routines tool 756, a database (DB) tool 758, and/or a knowledge graph (KG) tool 762. The API tool 752 may include software and/or hardware configured to facilitate communication between the agent and one or more APIs. In some implementations, the API tool 752 may translate or convert messages that include natural language portions into API calls for the appropriate API. Similarly, the API tool 752 may translate or convert API responses into a format usable by the agent. The API tool 752 may present an interface through which the agent can leverage various functions including, for example, audio functions of a media playback device, environmental settings of a smart-home thermostat, etc. These functions may themselves be an abstraction of multiple operations; for example, the audio API may handle the commands Play, Next, and Stop; and the thermostat API may handle the commands GetState, SetTemp, SetMode, etc.

The math tool 754 may include software and/or hardware configured to implement calculator functions such as described above in the powers-of-two example. The math tool 754 may receive mathematical exercises, problems, formulae, etc., from an agent and perform the calculation accurately.

The routines tool 756 may include software and/or hardware configured to detect and/or periodically check for the occurrence of an event or presence of a condition. Upon detecting the condition or occurrence, the routines tool 756 may perform a predefined action and/or send a notification to an agent. The routines tool 756 may facilitate an agent's ability to perform tasks that involve the passage of time (e.g., between the user inputs the command and when the action is to be performed). The Robot/Alexa light switch example above is an example use of such a routines tool 756.

The DB tool 758 may include software and/or hardware configured to provide a mechanism by which the agent may query and/or update a database (e.g., using structured query language (SQL) or the like). In some implementations, the DB tool 758 may facilitate other database operations. Similarly, the KG tool 762 may include software and/or hardware configured to facilitate the identification and retrieval of information from a structured knowledge graph. This may allow the agent to answer factual questions more accurately than using a LM-based approach alone.

The LAM 764 may include software and/or hardware configured to provide the agent with a means of interacting with certain resources in a manner similar and/or analogous to the way a human would, and without the use of an API. The LAM 764 may include one or more machine learning models configured to interact with computing resources, such as websites, apps, applications, etc., via a GUI and/or VUI. The LAM 764 may "read" and process text, symbols, and/or images displayed in the GUI. The LAM 764 may determine how to use the GUI to perform the action requested by the user. The LAM 764 may generate or obtain data to input via the GUI. The LAM 764 may select links, menu items, settings, etc., via the GUI. The LAM 764 may obtain outputs from the GUI and convey them to the user. In some cases, the LAM 764 and/or LM 160 may convert and/or translate the data; for example, by converting text to speech, translating from one language to another, etc. In various use cases, the LAM 764 may interact with a GUI on behalf of an individual who is visually impaired, operating a motor vehicle, and/or otherwise wishes to interact with the resource using speech. In some cases, the user may configure the LM 160 and/or LAM 764 to perform 155 automated tasks; for example, purchasing concert tickets immediately upon release or entering a last-minute or last-second bid in one or more online auctions.

Figure 7B:
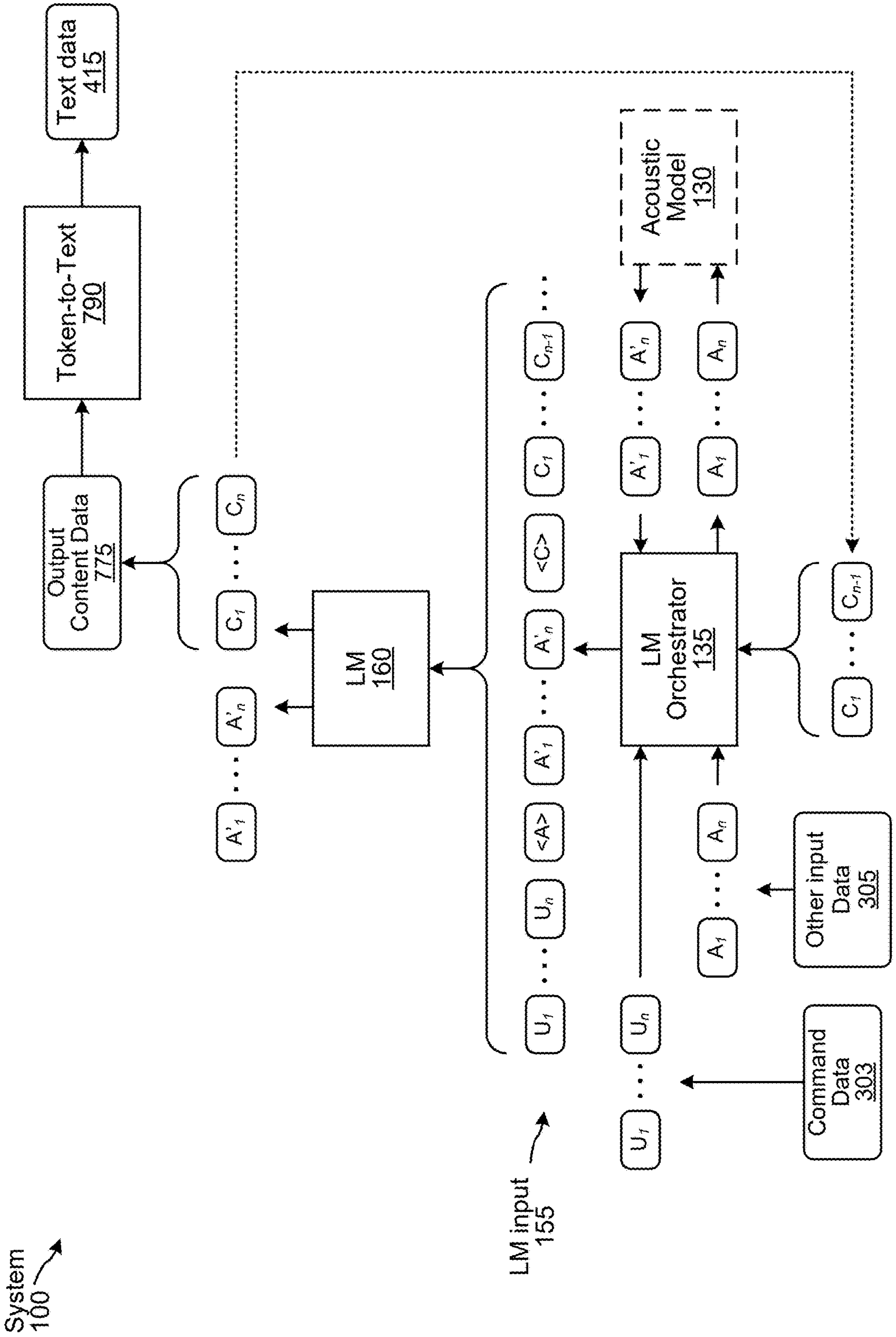
FIG. 7B illustrates example operations of prompt generation in a multi-modal LM system performing speech recognition, according to embodiments of the present disclosure.
Figure 7C:
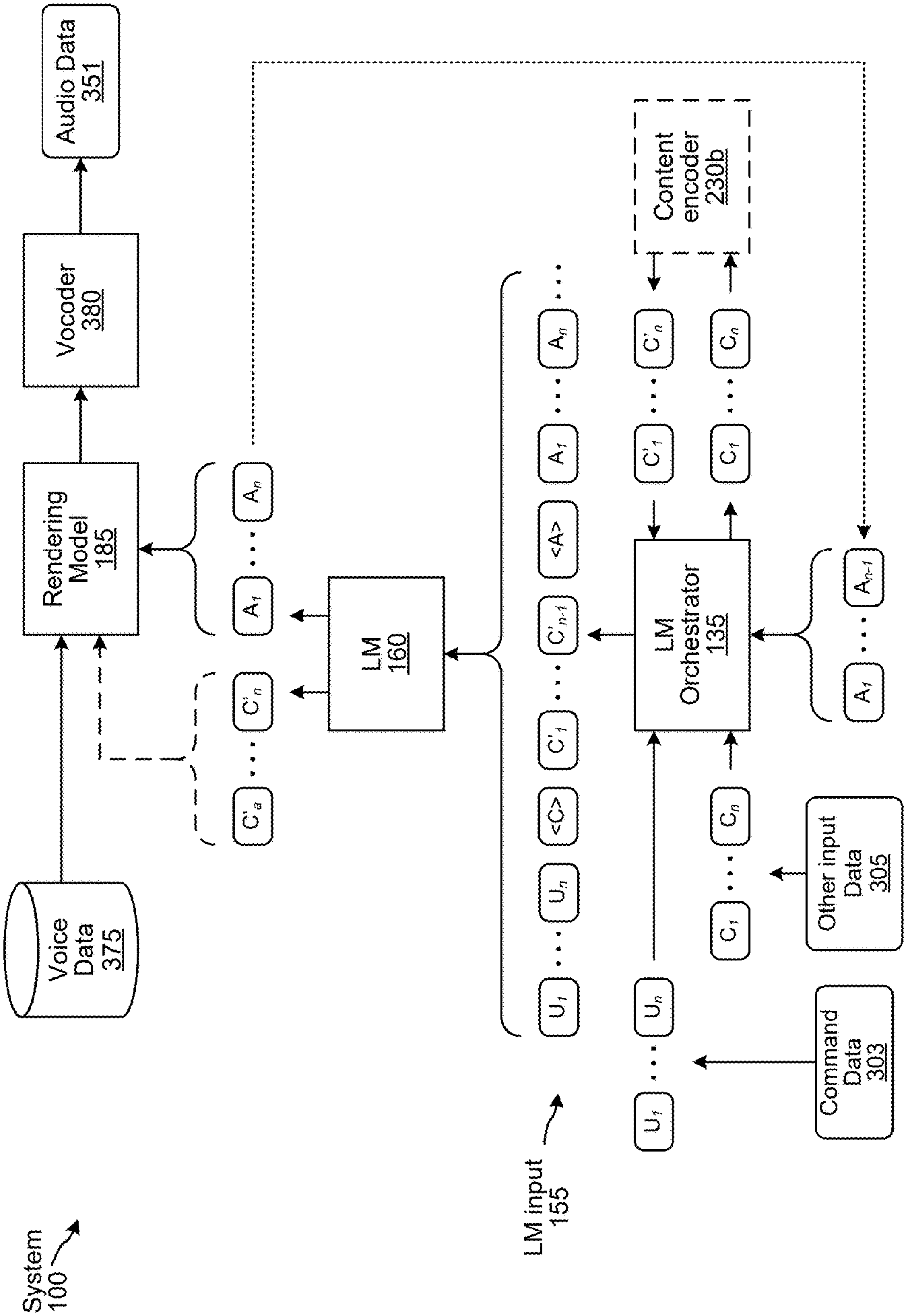
FIG. 7C illustrates example operations of prompt generation in a multi-modal LM system performing speech synthesis, according to embodiments of the present disclosure.
Figure 7D:
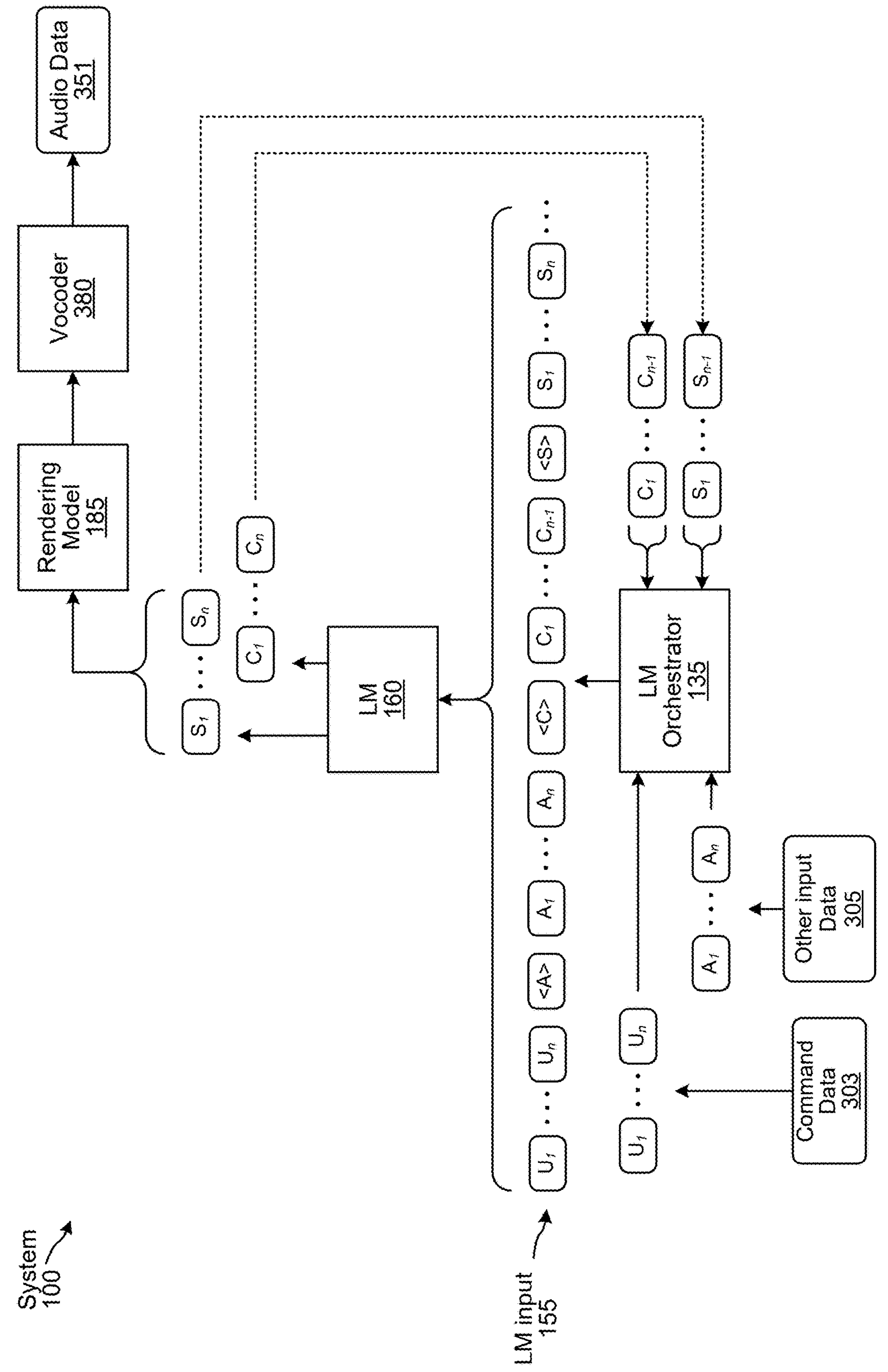
FIG. 7D illustrates example operations of the prompt generation component in a multi-modal LM system performing speech-to-speech functions, according to embodiments of the present disclosure.

FIGS. 7B through 7D illustrate three different speech-to-speech operations performed using the system 100. FIG. 7B illustrates example operations of prompt generation in a multi-modal LM system performing speech recognition, according to embodiments of the present disclosure. While the example operations shown in FIG. 7B can be used for speech recognition (e.g., receiving audio and outputting a textual transcription), the same or similar operations may be used to output content for other purposes, such as generating a prompt for a delegate LM 360. The system 100 may receive command data 303 indicating a request to transcribe other input data 305 representing target audio. The other input data 305 may include frames of audio data $A_1$ through $A_n$. In some implementations, the LM orchestrator 135 may send the frames of audio data to the acoustic model 130. The acoustic model 130 may convert the frames of audio data into acoustic tokens $A'_1$ through $A'_n$. The LM 160 may consumer fewer resources when processing acoustic token data versus audio-frame level data; however, in some implementations, the LM 160 may process frame-level audio data (e.g., spectrogram data). In some implementations, the acoustic model 130 (and/or input data encoder(s) 230) may execute on an upstream component (e.g., on a user device 110) to tokenize and/or encoder the other input data 305 prior to receipt by the LM orchestrator 135. The LM orchestrator 135 may create an LM input data 155 using the command data 303 $U_1$ through $U_n$ and audio tokens $A'_1$ through $A'_n$. The LM orchestrator 135 may separate the command data 303 and acoustic tokens using a "<A>" separator token (e.g., indicating a beginning of a segment of acoustic tokens).

The LM 160 may process the LM input data 155 to predict output acoustic tokens $A'_1$ through $A'_n$ and content tokens $C_1$ through $C_n$. The content tokens $C_1$ through $C_n$ may make up the output content data 775, which may be consumed by one or more downstream processes 388. The LM 160 may operate in an autoregressive manner. Thus, the LM 160 may predict each successive content token $C_n$ based on the previously predicted content tokens $C_1$ through $C_{n-1}$. In some cases, the LM 160 may output the separator token "<A>" to indicate an end-of-segment (e.g., of content tokens). The <A> separator token can indicate to the acoustic model 130 and/or the LM orchestrator 135 that the next segment of acoustic tokens should begin there. In some cases, the LM 160 may output a start-of-speech token (e.g., "<SOS>") indicating the beginning of a transcription of input speech. The LM 160 may generate output acoustic tokens and/or output content tokens. The LM orchestrator 135 may receive the generated tokens and add them to the LM input data 155 for subsequent steps of the task. When the LM 160 predicts an end-of-segment, the LM 160 may request the next segment of input content token data from the LM orchestrator 135.

In some implementations, the system 100 may convert the output content data 775 (which may consist of content tokens) to text. The system 100 may include a token-to-text component 790. The token-to-text component 790 may convert the output content data 775 to text data 415 for further processing and/or output as human-readable text. For example, the output content data 775 may be in the form of tokens useful for processing by the LM 160, while text or some other character data may be usable by downstream processes (e.g., API calls, LM prompts, etc.) and/or users 5 (e.g., transcripts, textual responses, etc.). In some implementations, the token-to-text component 790 may be, for example, a combination of software and/or logic configured to convert teach token and/or segments of tokens into a corresponding text word (and/or individual characters, subwords, phrases, etc.). In some implementations, the token-to-text component 790 may include a machine learning model such as a recurrent neural network (RNN) trained to process the output content data 775 to determine corresponding text data 415. The LM orchestrator 135 may route the output content data 775 and/or the text data 415 to one or more downstream processes 388 for further processing/output.

In addition to speech-to-text (e.g., ASR), the configuration shown in FIG. 7B may also be used (or modified for use) in related tasks such as speaker-attributed ASR, in which the system 100 transcribes speech and identifies the speaker of each utterance, and/or speech-to-API, in which input speech is converted to an API call. The operations shown in FIG. 7B may be extended to include speaker-attributed ASR. A user may provide additional input data 305 representing a voice sample (and perhaps additional voice samples). The LM orchestrator 135 may leverage a reference encoder 230*c* to generate a speaker embedding, which the LM 160 may use to determine which portions of the speech in the target audio correspond to which voice sample.

In some cases, these speech-to-text functions may be performed as part of a complex task; for example, speaker-attributed ASR. The system 100 may receive a speech sample and audio data representing a speech dialog, generate a transcript of the speech, and attribute various portions of the transcript to a speaker whose voice characteristics match the speech sample. The system 100 may receive the inputs as follows:

User: "Decode the speech of each of the speakers and assign labels."

User: "Here's the audio of speaker Mike"<user uploads Mike's vocal sample>

User: "Here's the audio of speaker Eddie"<user uploads Eddie's vocal sample>

User: "Here's the target audio."<user uploads target audio containing conversation>

The LM orchestrator 135 may create the prompt sequence using the command data 303 ("Decode the speech . . . ") and various pieces of input data 305 including Mike's vocal sample, Eddie's vocal sample, and the target audio to be transcribed. The LM orchestrator 135 may separate each segment of data using a separator token. The LM orchestrator 135 may include a separator token at the end of the target audio (e.g., the end of the prompt) to indicate to the LM 160 that it is to begin generating an output. The LM orchestrator 135 may send the prompt to the LM 160. The LM 160 may generate the following response:

LM 160: <spoken words of speaker 1> {"speaker": "Mike"}<spoken words of speaker 2>{"speaker": "Eddie"}

The system 100 may output this response to the user in the form of a transcript with indications of the speaker corresponding to each portion.

In the above example, the system 100 receives various audio data inputs (e.g., the command data 303, the other input data 305, etc.); however, the command data 303 may indicate that different inputs are to be processed differently. For example, while the command data 303 indicates that the target audio is to be transcribed, the first and second audio data are not. Rather, the command data 303 indicates that the first and second data are to have voice characteristics extracted to allow the LM 160 to determine which segment of the target audio data corresponds to which speaker.

The LM orchestrator 135 may include an input data handler that can have input data processed according to the data type and/or for the purpose for which the data was provided. In the speaker-attributed ASR example, the command data 303 and target audio may be tokenized (e.g., using an audio encoder) for processing as natural language by the LM 160. The vocal samples may be encoded (e.g., using a reference encoder) to generate a speaker embedding representing voice characteristics that the LM 160 may use to correlate portions of the transcript to the corresponding speaker. Thus, the system 100 may include one or more input data encoders 230*a*, 230*b*, 230*c*, etc. (collectively "input data encoders 230"). The input data handler can send various items of input data to the appropriate input data encoder 230 for conversion, feature extraction, and/or other processing.

FIG. 7C illustrates example operations of prompt generation in a multi-modal LM system performing speech synthesis, according to embodiments of the present disclosure. In text-to-speech operations, the system 100 may receive command data 303 indicating a request to process other input data 305 representing content for output as synthesized speech. The LM orchestrator 135 may receive the other input data in the form of content data $C_1$ through $C_n$. The LM orchestrator 135 may leverage a content encoder 230*b* to process the other input data to determine content tokens $C'_1$ through $C'_n$. In some implementations, the content encoder 230*b* may execute on an upstream component (e.g., on a user device 110) to tokenize the other input data 305 prior to receipt by the LM orchestrator 135.

The text-to-speech operations may be similar to the speech-to-text operations illustrated in FIG. 7B; however, rather than predict each output content token autoregressively based on previously predicted output content tokens, the LM 160 may predict output acoustic tokens autoregressively based on previously predicted output acoustic tokens. For example, the LM 160 may each output acoustic token $A_n$ based on the previously predicted output acoustic tokens Az through $A_{n-1}$. At each step, the LM orchestrator 135 may add the newly predicted output acoustic token to the LM input data 155, and the LM 160 may predict the next output acoustic token.

The LM 160 may send the output acoustic token data Az through $A_n$ to the rendering model 185 for upsampling to high-fidelity audio token data, which the vocoder 380 may convert to waveform audio data (e.g., the output audio data 351). The system 100 may send the output audio data 351 to a user device 110 for output to a user.

The LM 160 may output acoustic tokens representing the various sounds of speech. The rendering model 185 may process the acoustic tokens produce a speech output (e.g., output audio data 351 representing synthesized speech). The rendering model 185 may be a neural network configured to upsample the relatively "coarse" acoustic tokens (e.g., as output by the acoustic model 130 and/or LM 160) into higher-fidelity audio tokens, which may be used for high-quality rendering. In some implementations, the rendering model 185 may receive speaker profile information representing speaker-dependent voice characteristics, and use it to generate output speech having the desired voice. The rendering model 185 may retrieve the speaker profile information from, for example, a voice data storage component 375. The speaker profile information may include an embedding generated by an audio encoder, such as a neural network encoder, trained to identify different speakers (e.g., by using contrastive learning to extract unique voice characteristics from speech samples corresponding to different speakers). In some implementations, the rendering model 185 may additionally use the content tokens generated by the LM 160 to produce the output speech.

In some implementations, the system 100 may include a vocoder 380 such as a neural vocoder configured to process the rendered audio tokens to determine the output audio data 351 (e.g., representing synthesized speech). The vocoder 380 may be, for example, a universal neural vocoder based on Parallel WaveNet or other model(s). The vocoder 380 may take as input audio data in the form of, for example, a Mel-spectrogram with 80 coefficients and frequencies ranging from 50 Hz to 12 kHz. The vocoder 380 may process the spectrogram data and convert it to a time-domain audio format (e.g., pulse-code modulation (PCM), waveform audio format (WAV), u-law, etc.) that may be readily converted to an analog signal for amplification and output by a loudspeaker. The resulting audio data may consist of, for example, 8-, 16-, or 24-bit audio having a sample rate of 16 kHz, 24 kHz, 44.1 kHz, etc. In some implementations, other bit and/or sample rates may be used. A digital-to-analog convertor (DAC) may convert the audio data to an analog signal suitable for amplification and output as audio by the loudspeaker 812.

FIG. 7D illustrates example operations of the prompt generation component in a multi-modal LM system performing speech-to-speech functions, according to embodiments of the present disclosure. The operations shown in FIG. 7D may be used to perform, for example, machine translation of speech, voice conversion (e.g., receiving speech and generating output having different voice characteristics), anonymization, etc. In some implementations, although not shown in FIG. 7D, the LM orchestrator 135 may encode the command data 303 and/or the other input data 305 using an input data encoder 230 (e.g., as shown in FIG. 7A). The LM orchestrator 135 may combine the encoded command data 303 (e.g., Uy through $U_n$) and other input data 305 (e.g., $A_1$ through $A_n$) into an LM input data 155. The LM orchestrator 135 may then feed the LM input data 155 into the LM 160.

In speech-to-speech operations, the LM 160 may predict both output acoustic tokens and output content tokens autoregressively. For example, the LM 160 may, as a speech recognition function, predict the output content token data from the input acoustic token data. Similarly, the LM 160 may, as a speech generation function, predict the output acoustic token data from the predicted output content token data. The output acoustic token data may be upsampled by the rendering model 185 to generate high-fidelity audio token data. In some implementations, the rendering model 185 may also receive the output content token data and process it with the output acoustic token data (e.g., as shown in FIG. 7C). The vocoder 380 may convert the audio token data to waveform audio data (e.g., the output audio data 351).

Figure 8:
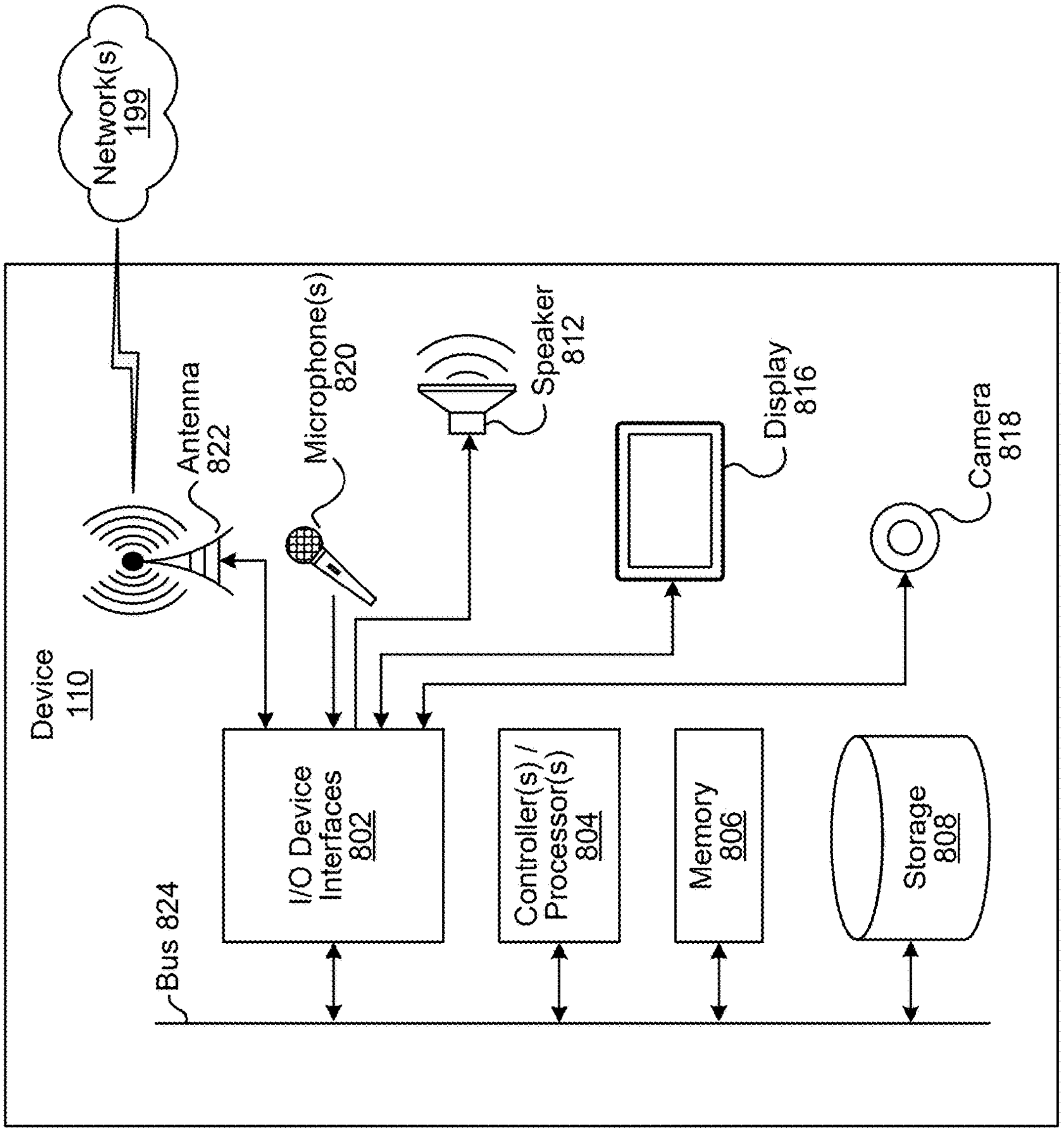
FIG. 8 is a block diagram conceptually illustrating example components of a device, according to embodiments of the present disclosure.
Figure 9:
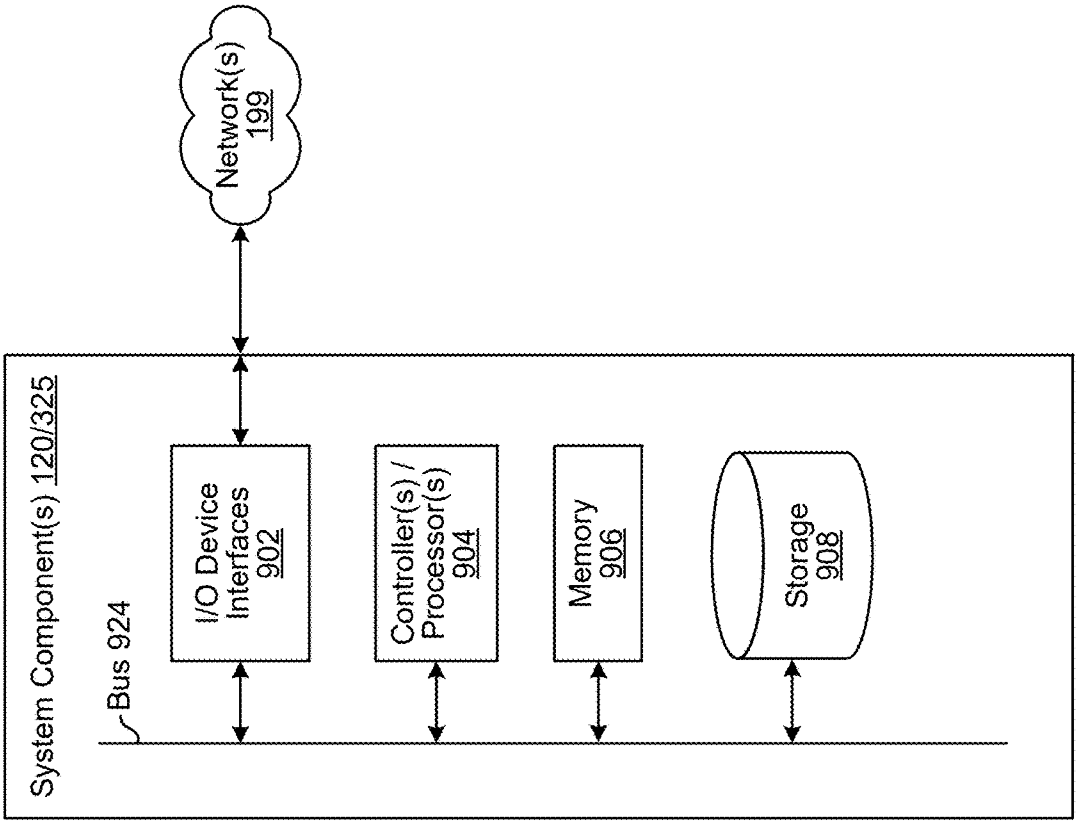
FIG. 9 is a block diagram conceptually illustrating example components of a system, according to embodiments of the present disclosure.

FIG. 8 is a block diagram conceptually illustrating a device 110 that may be used with the system 100 or 500. FIG. 9 is a block diagram conceptually illustrating example components of a system component 120 and/or skill system component 525 of the system 100 or 500. A system (120/525) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/system component(s) may be located remotely from the device 110 as its operations may not require proximity to the user. The server/system component(s) may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). A system component 120 may also be a version of a user device 110 that includes different (e.g., more) processing capabilities than other user device(s) 110 in a home/office. One benefit to the server/system component(s) being in a user's home/business is that data used to process a command/return a response may be kept within the user's home, thus reducing potential privacy concerns.

Multiple system components (120/525) may be included in the system 100 of the present disclosure, such as one or more natural language processing system component(s) 120 for performing ASR processing, one or more natural language processing system component(s) 120 for performing NLU processing, one or more skill system component(s) 525, etc. In operation, each of these systems may include computer-readable and computer-executable instructions that reside on the respective device (120/525), as will be discussed further below.

Each of these devices (110/120/525) may include one or more controllers/processors (804/904), which may each include a central processing unit (CPU) for processing data and computer-readable instructions, and a memory (806/906) for storing data and instructions of the respective device. The memories (806/906) may individually include volatile random-access memory (RAM), non-volatile read only memory (ROM), non-volatile magnetoresistive memory (MRAM), and/or other types of memory. Each device (110/120/525) may also include a data storage component (808/908) for storing data and controller/processor-executable instructions. Each data storage component (808/908) may individually include one or more non-volatile storage types such as magnetic storage, optical storage, solid-state storage, etc. Each device (110/120/525) may also be connected to removable or external non-volatile memory and/or storage (such as a removable memory card, memory key drive, networked storage, etc.) through respective input/output device interfaces (802/902).

Computer instructions for operating each device (110/120/525) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120/525) includes input/output device interfaces (802/902). A variety of components may be connected through the input/output device interfaces (802/902), as will be discussed further below. Additionally, each device (110/120/525) may include an address/data bus (824/924) for conveying data among components of the respective device. Each component within a device (110/120/525) may also be directly connected to other components in addition to (or instead of) being connected to other components across the bus (824/924).

Referring to FIG. 9, the device 110 may include input/output device interfaces 802 that connect to a variety of components such as an audio output component such as a loudspeaker 812, a wired headset or a wireless headset (not illustrated), or other component capable of outputting audio. The device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 816 for displaying content. The device 110 may further include a camera 818.

Via antenna(s) 822, the input/output device interfaces 802 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device(s) 110, the natural language command processing system component(s), or a skill system component(s) 525 may include their own dedicated processors, memory, and/or storage. Alternatively, one or more of the components of the device(s) 110, the natural language command processing system component(s), or a skill system component(s) 525 may utilize the I/O interfaces (802/902), processor(s) (804/904), memory (806/906), and/or storage (808/908) of the device(s) 110, natural language command processing system component(s), or the skill system component(s) 525, respectively. Thus, the ASR component may have its own I/O interface(s), processor(s), memory, and/or storage; the NLU component may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system component(s), and a skill system component(s) 525, as described herein, are illustrative, and may be located as a stand-alone device or may be included, in whole or in part, as a component of a larger device or system. As can be appreciated, a number of components may exist either on a system component(s) and/or on device 110.

Figure 10:
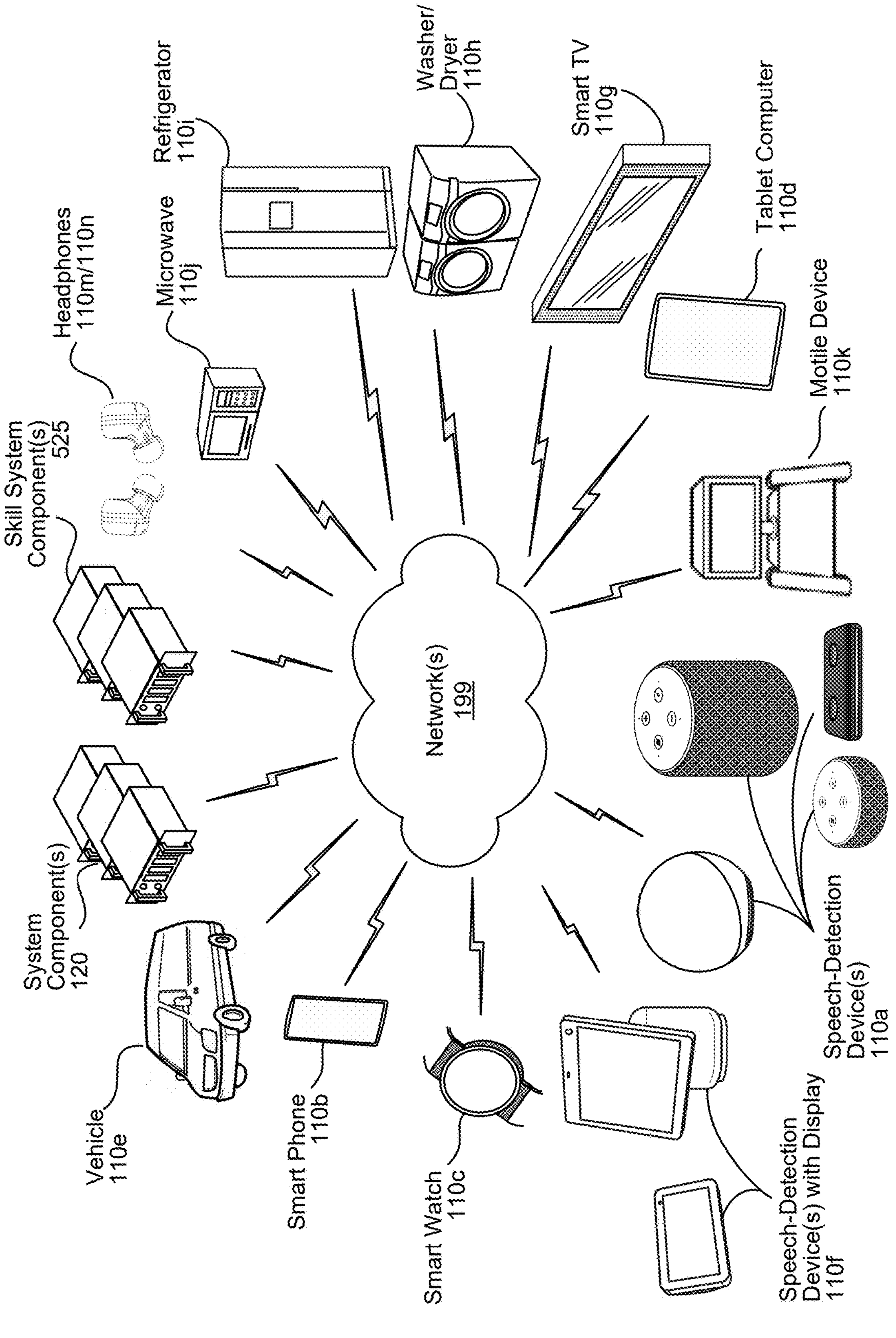
FIG. 10 illustrates an example of a network for use with the overall system, according to embodiments of the present disclosure.

As illustrated in FIG. 10, multiple devices (110*a*-110*n*, 120, 525) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110*a*, a smart phone 110*b*, a smart watch 110*c*, a tablet computer 110*d*, a vehicle 110*e*, a speech-detection device with display 110*f*, a display/smart television 110*g*, a washer/dryer 110*h*, a refrigerator 110*i*, a microwave 110*j*, autonomously motile device 110*k* (e.g., a robot), etc., may be connected to the network(s) 199 through a wireless service provider, over a Wi-Fi or cellular network connection, or the like. Other devices are included as network-connected support devices, such as the natural language command processing system component(s) 120, the skill system component(s) 525, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component, the NLU component, etc. of the natural language command processing system component(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer-implemented method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:

generating, using a first language model (LM), first LM output data representing a first portion of first synthesized speech;

causing a user device to present first output audio corresponding to the first LM output data;

receiving first input audio data;

determining that at least a first plurality of frames of the first input audio data represent human speech;

in response to determining that at least the first plurality of frames of the first input audio data represent human speech, processing the first input audio data using the first LM;

after beginning processing of the first input audio data using the first LM, generating, using the first LM, second LM output data representing a second portion of the first synthesized speech; and after beginning generating of the second LM output data, determining, based on processing of the first input audio data using the first LM, to perform a first action comprising at least one of continuing to process input audio data using the first LM or continuing to generate LM output data representing the first synthesized speech.

2. The computer-implemented method of claim 1, further comprising:

determining, based on processing of the first input audio data using the first LM, that the first input audio data represents backchannel speech; and in response to determining that the first input audio data represents backchannel speech, causing the user device to present second output audio data corresponding to the second LM output data.

3. The computer-implemented method of claim 2, further comprising:

determining LM input data using at least the first LM output data, the second LM output data, and the first input audio data; and processing the LM input data using the first LM to generate third LM output data representing a third portion of the first synthesized speech.

4. The computer-implemented method of claim 1, further comprising:

determining, based on processing of the first input audio data using the first LM, that the first input audio data indicates an intent to interrupt output of the first synthesized speech; and in response to determining that the first input audio data indicates an intent to interrupt output of the first synthesized speech:

halting generation of LM output data representing the first synthesized speech, and halting presentation of output audio corresponding to the first synthesized speech.

5. The computer-implemented method of claim 4, further comprising:

determining LM input data using the first LM output data and the first input audio data; and generating, by the first LM based on processing of the LM input data, third LM output data responsive to the first input audio data.

6. The computer-implemented method of claim 1, further comprising:

receiving second input audio data;

processing a first portion of the second input audio data using the first LM to generate third LM output data;

determining that the third LM output data represents system backchannel speech;

in response to determining that the third LM output data represents system backchannel speech, causing the user device to present second output audio corresponding to the third LM output data; and processing a second portion of the second input audio data using the first LM to generate fourth LM output data, the second portion of the second input audio data following the first portion of the second input audio data.

7. The computer-implemented method of claim 1, further comprising:

receiving second input audio data;

processing the second input audio data using the first LM to generate third LM output data indicating that the second input audio data likely represents a complete utterance;

processing the second input audio data and the third LM output data using the first LM to generate fourth LM output data representing a second action to perform in response to the second input audio data; and causing performance of the second action.

8. The computer-implemented method of claim 1, further comprising:

receiving second input audio data;

processing the second input audio data using the first LM to generate third LM output data representing an LM prompt corresponding to speech represented in the second input audio data;

processing the third LM output data using a second LM different from the first LM to generate fourth LM output data responsive to the speech; and processing the fourth LM output data using the first LM to fifth fourth LM output data representing second synthesized speech responsive to the speech.

9. A system, comprising:

at least one processor; and at least one memory comprising instructions that, when executed by the at least one processor, cause the system to:

generate, using a first language model (LM), first LM output data representing a first portion of first synthesized speech;

cause a user device to present first output audio corresponding to the first LM output data;

receive first input audio data;

determine that at least a first plurality of frames of the first input audio data represent human speech;

in response to determining that at least the first plurality of frames of the first input audio data represent human speech, process the first input audio data using the first LM;

after beginning processing of the first input audio data using the first LM, generate, using the first LM, second LM output data representing a second portion of the first synthesized speech; and after beginning generating of the second LM output data, determine, based on processing of the first input audio data using the first LM, to perform a first action comprising at least one of continuing to process input audio data using the first LM or continuing to generate LM output data representing the first synthesized speech.

10. The system of claim 9, wherein the at least one memory further comprises instructions that, when executed by the at least one processor, further cause the system to:

determine, based on processing of the first input audio data using the first LM, that the first input audio data represents backchannel speech; and in response to determining that the first input audio data represents backchannel speech, cause the user device to present second output audio data corresponding to the second LM output data.

11. The system of claim 10, wherein the at least one memory further comprises instructions that, when executed by the at least one processor, further cause the system to:

determine LM input data using at least the first LM output data, the second LM output data, and the first input audio data; and process the LM input data using the first LM to generate third LM output data representing a third portion of the first synthesized speech.

12. The system of claim 9, wherein the at least one memory further comprises instructions that, when executed by the at least one processor, further cause the system to:

determine, based on processing of the first input audio data using the first LM, that the first input audio data indicates an intent to interrupt output of the first synthesized speech; and in response to determining that the first input audio data indicates an intent to interrupt output of the first synthesized speech:

halt generation of LM output data representing the first synthesized speech, and halt presentation of output audio corresponding to the first synthesized speech.

13. The system of claim 12, wherein the at least one memory further comprises instructions that, when executed by the at least one processor, further cause the system to:

determine LM input data using the first LM output data and the first input audio data; and generate, by the first LM based on processing of the LM input data, third LM output data responsive to the first input audio data.

14. The system of claim 9, wherein the at least one memory further comprises instructions that, when executed by the at least one processor, further cause the system to:

receive second input audio data;

process a first portion of the second input audio data using the first LM to generate third LM output data;

determine that the third LM output data represents system backchannel speech;

in response to determining that the third LM output data represents system backchannel speech, cause the user device to present second output audio corresponding to the third LM output data; and process a second portion of the second input audio data using the first LM to generate fourth LM output data, the second portion of the second input audio data following the first portion of the second input audio data.

15. The system of claim 9, wherein the at least one memory further comprises instructions that, when executed by the at least one processor, further cause the system to:

receive second input audio data;

process the second input audio data using the first LM to generate third LM output data indicating that the second input audio data likely represents a complete utterance;

process the second input audio data and the third LM output data using the first LM to generate fourth LM output data representing a second action to perform in response to the second input audio data; and cause performance of the second action.

16. The system of claim 9, wherein the at least one memory further comprises instructions that, when executed by the at least one processor, further cause the system to:

receive second input audio data;

process the second input audio data using the first LM to generate third LM output data representing an LM prompt corresponding to speech represented in the second input audio data;

process the third LM output data using a second LM different from the first LM to generate fourth LM output data responsive to the speech; and process the fourth LM output data using the first LM to fifth fourth LM output data representing second synthesized speech responsive to the speech.

17. A computer-implemented method comprising:

generating, using a first language model (LM), first LM output data representing a first portion of first synthesized speech;

causing a user device to present first output audio corresponding to the first LM output data;

receiving first input audio data;

processing the first input audio data using a neural network acoustic model to determine first acoustic embedding data;

determining, using a voice activity detector, that the first acoustic embedding data likely represents human speech;

in response to determining that the first acoustic embedding data likely represents human speech, processing the first acoustic embedding data using the first LM;

after beginning processing of the first acoustic embedding data using the first LM, generating, using the first LM, second LM output data representing a second portion of the first synthesized speech;

after beginning generating of the second LM output data, determining, based on processing of the first acoustic embedding data using the first LM, that the first acoustic embedding data represents user backchannel speech; and in response to determining that the first acoustic embedding data represents user backchannel speech, causing the user device to present second output audio corresponding to the second portion of the first LM output data.

18. The computer-implemented method of claim 17, further comprising:

receiving second input audio data during presentation of a first portion of second synthesized speech;

determining, using the first LM, that the second input audio data indicates an intent to interrupt output of the second synthesized speech;

in response to determining that the second input audio data indicates an intent to interrupt output of the second synthesized speech, halting generation, by the first LM, of LM output data representing the second synthesized speech;

determining LM input data using at least the second input audio data and a first portion of third LM output data corresponding to the first portion of the second synthesized speech, wherein a second portion of the third LM output data corresponding to the second portion of the second synthesized speech is excluded from the LM input data; and generating, by the first LM based on processing of the LM input data, fourth LM output data representing an action to perform in response to the second input audio data.

19. The computer-implemented method of claim 17, further comprising:

receiving second input audio data;

processing a first portion of the second input audio data using the neural network acoustic model to determine second acoustic embedding data;

identifying, in the second acoustic embedding data, an opportunity for system action;

determining first LM input data representing the second acoustic embedding data;

processing the first LM input data using the first LM to generate third LM output data representing system backchannel speech;

causing the user device to present, during the receiving of the second input audio data, third output audio corresponding to the third LM output data;

processing a second portion of the second input audio data using the neural network acoustic model to determine third acoustic embedding data, the second portion of the second input audio data following the first portion of the second input audio data;

determining second LM input data using at least the first LM input data and the third acoustic embedding data; and processing the second LM input data using the first LM to generate fourth LM output data representing an action to perform in response to the second input audio data.

20. The computer-implemented method of claim 17, further comprising:

receiving second input audio data representing a user utterance;

processing the second input audio data using the first LM to generate third LM output data representing an LM prompt corresponding to the user utterance;

processing the third LM output data using a second LM different from the first LM to generate fourth LM output data responsive to the LM prompt;

processing the fourth LM output data using the first LM to generate fifth LM output data representing second synthesized speech responsive to the user utterance; and causing the user device to present second output audio corresponding to the fifth LM output data.

* * * * *